US012607834B2

(12) United States Patent
Yeh et al.

(10) Patent No.: US 12,607,834 B2
(45) Date of Patent: Apr. 21, 2026

(54) OPTICAL PHOTOGRAPHING LENS, IMAGE CAPTURING UNIT AND ELECTRONIC DEVICE

(71) Applicant: LARGAN PRECISION CO., LTD., Taichung City (TW)

(72) Inventors: Kuan-Ting Yeh, Taichung City (TW); Tzu-Chieh Kuo, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 328 days.

(21) Appl. No.: 18/225,636

(22) Filed: Jul. 24, 2023

(65) Prior Publication Data

US 2024/0411117 A1      Dec. 12, 2024

(30) Foreign Application Priority Data

Jun. 9, 2023      (TW) .................................. 112121631

(51) Int. Cl.
G02B 15/14          (2006.01)
G02B 13/00          (2006.01)

(52) U.S. Cl.
CPC ....... G02B 15/142 (2019.08); G02B 13/0045 (2013.01); G02B 15/1421 (2019.08)

(58) Field of Classification Search
None
See application file for complete search history.

(56) References Cited

U.S. PATENT DOCUMENTS

| | | | | | |
|---|---|---|---|---|---|
| 4,514,049 | A | * | 4/1985 | Hirano | G02B 15/1425 |
| | | | | | 359/732 |
| 4,911,539 | A | * | 3/1990 | Tsunashima | G02B 15/142 |
| | | | | | 359/676 |
| 5,313,330 | A | * | 5/1994 | Betensky | G02B 15/143105 |
| | | | | | 359/740 |
| 5,864,435 | A | * | 1/1999 | Toyama | G02B 15/142 |
| | | | | | 359/795 |
| 6,154,322 | A | | 11/2000 | Nakayama | |

(Continued)

FOREIGN PATENT DOCUMENTS

| | | |
|---|---|---|
| CN | 107957623 A | 4/2018 |
| CN | 114660786 A | 6/2022 |

(Continued)

OTHER PUBLICATIONS

TW Office Action dated Aug. 1, 2024 in application 112121631.

*Primary Examiner* — Darryl J Collins
(74) *Attorney, Agent, or Firm* — Maschoff Brennan

(57) ABSTRACT

An optical photographing lens includes two lens groups including six lens elements. The two lens groups are, in order from an object side to an image side, a first and a second lens groups. The six lens elements are, in order from the object side to the image side, a first lens element through a sixth lens element. A focal length adjusting process is performed by changing an axial distance between the lens groups for varying a focal length of the optical photographing lens. The second lens group moves relative to the first lens group during the focal length adjusting process. At least one lens surface of the optical photographing lens has at least one inflection point always located within an optically effective area during the focal length adjusting process. The second lens element has negative refractive power.

25 Claims, 35 Drawing Sheets

(56)         References Cited

U.S. PATENT DOCUMENTS

| | | | |
|---|---|---|---|
| 8,736,974 B2 | 5/2014 | Kim | |
| 2008/0252991 A1* | 10/2008 | Wang | G02B 15/1425 |
| | | | 359/676 |
| 2011/0292522 A1* | 12/2011 | Kodaira | G02B 15/17 |
| | | | 359/691 |
| 2022/0075163 A1* | 3/2022 | Tang | G02B 15/143 |
| 2023/0168466 A1 | 6/2023 | Kim et al. | |

FOREIGN PATENT DOCUMENTS

| | | |
|---|---|---|
| CN | 217060613 U | 7/2022 |
| CN | 115047607 A | 9/2022 |
| CN | 115755342 A | 3/2023 |
| CN | 115951476 A | 4/2023 |
| JP | H03-180808 A | 8/1991 |
| JP | H07-84183 A | 3/1995 |
| KR | 100878544 B1 | 1/2009 |
| TW | I526712 B | 3/2016 |
| TW | M634897 U | 12/2022 |
| TW | M638524 U | 3/2023 |
| WO | 2022/058807 A1 | 3/2022 |
| WO | 2024084436 A2 | 4/2024 |

* cited by examiner

OPTICAL PHOTOGRAPHING LENS, IMAGE CAPTURING UNIT AND ELECTRONIC DEVICE

RELATED APPLICATIONS

This application claims priority to Taiwan Application 112121631, filed on Jun. 9, 2023, which is incorporated by reference herein in its entirety.

BACKGROUND

Technical Field

The present disclosure relates to an optical photographing lens, an image capturing unit and an electronic device, more particularly to an optical photographing lens and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical photographing lens includes two lens groups, and the two lens groups includes six lens elements. The two lens groups are, in order from an object side to an image side along an optical path, a first lens group and a second lens group. The six lens elements are, in order from the object side to the image side along the optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, a focal length adjusting process is performed by changing an axial distance between the two lens groups so as to vary a focal length of the optical photographing lens. Preferably, the optical photographing lens has a long focal length state and a short focal length state during the focal length adjusting process. Preferably, the second lens group moves along an optical axis relative to the first lens group during the focal length adjusting process. Preferably, at least one lens surface of at least one lens element of the optical photographing lens has at least one inflection point always located within an optically effective area of the at least one lens surface during the focal length adjusting process.

Preferably, the first lens group includes the first lens element, the second lens element and the third lens element, and the second lens group includes the fourth lens element, the fifth lens element and the sixth lens element. Preferably, the second lens element has negative refractive power.

When a focal length of the second lens element is f2, a central thickness of the second lens element is CT2, a central thickness of the fourth lens element is CT4, a central thickness of the fifth lens element is CT5, a central thickness of the sixth lens element is CT6, an axial distance between the fourth lens element and the fifth lens element is T45, and an axial distance between the fifth lens element and the sixth lens element is T56, the following conditions are preferably satisfied:

$$-12.0 < f2/CT2 < -1.00; \text{ and}$$

$$1.6 < (CT4 + CT5 + CT6)/(T45 + T56) < 15.$$

According to another aspect of the present disclosure, an optical photographing lens includes two lens groups, and the two lens groups includes six lens elements. The two lens groups are, in order from an object side to an image side along an optical path, a first lens group and a second lens group. The six lens elements are, in order from the object side to the image side along the optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, a focal length adjusting process is performed by changing an axial distance between the two lens groups so as to vary a focal length of the optical photographing lens. Preferably, the optical photographing lens has a long focal length state and a short focal length state during the focal length adjusting process. Preferably, the second lens group moves along an optical axis relative to the first lens group during the focal length adjusting process. Preferably, at least one lens surface of at least one lens element of the optical photographing lens has at least one inflection point always located within an optically effective area of the at least one lens surface during the focal length adjusting process.

Preferably, the first lens group includes the first lens element, the second lens element and the third lens element, and the second lens group includes the fourth lens element, the fifth lens element and the sixth lens element. Preferably, the first lens element has positive refractive power. Preferably, the second lens element has negative refractive power. Preferably, the object-side surface of the third lens element is convex in a paraxial region thereof.

When a focal length of the second lens element is f2, a central thickness of the second lens element is CT2, a central thickness of the third lens element is CT3, and a curvature radius of the object-side surface of the third lens element is R5, the following conditions are preferably satisfied:

$$-12.0 < f2/CT2 < -1.00; \text{ and}$$

$$0 < R5/CT3 < 12.0.$$

According to another aspect of the present disclosure, an optical photographing lens includes two lens groups, and the two lens groups includes six lens elements. The two lens groups are, in order from an object side to an image side along an optical path, a first lens group and a second lens group. The six lens elements are, in order from the object side to the image side along the optical path, a first lens element, a second lens element, a third lens element, a fourth lens element, a fifth lens element and a sixth lens element. Each of the six lens elements has an object-side surface facing toward the object side and an image-side surface facing toward the image side.

Preferably, a focal length adjusting process is performed by changing an axial distance between the two lens groups so as to vary a focal length of the optical photographing lens. Preferably, the optical photographing lens has a long focal length state and a short focal length state during the focal length adjusting process. Preferably, the second lens group moves along an optical axis relative to the first lens group during the focal length adjusting process. Preferably, at least one lens surface of at least one lens element of the optical photographing lens has at least one inflection point always located within an optically effective area of the at least one lens surface during the focal length adjusting process.

Preferably, the first lens group includes the first lens element, the second lens element and the third lens element, and the second lens group includes the fourth lens element, the fifth lens element and the sixth lens element. Preferably, the second lens element has negative refractive power.

When a focal length of the second lens element is f2, a central thickness of the second lens element is CT2, an axial distance between the object-side surface of the first lens element and the image-side surface of the third lens element is TG1, and an axial distance between the object-side surface of the fourth lens element and the image-side surface of the sixth lens element is TG2, the following conditions are preferably satisfied:

$$-12.0 < f2/CT2 < -1.00; \text{ and}$$

$$1.4 < TG1/TG2 < 4.0.$$

According to another aspect of the present disclosure, an image capturing unit includes one of the aforementioned optical photographing lenses and an image sensor, wherein the image sensor is disposed on an image surface of the optical photographing lens.

According to another aspect of the present disclosure, an electronic device includes at least two image capturing units located on the same side of the electronic device. The at least two image capturing units include a first image capturing unit and a second image capturing unit. The first image capturing unit includes one of the aforementioned optical photographing lenses and an image sensor disposed on an image surface of the optical photographing lens. The second image capturing unit includes an optical lens assembly and an image sensor disposed on an image surface of the optical lens assembly. Preferably, half of a maximum field of view of the second image capturing unit ranges from 30 degrees to 60 degrees.

BRIEF DESCRIPTION OF THE DRAWINGS

The disclosure can be better understood by reading the following detailed description of the embodiments, with reference made to the accompanying drawings as follows.

5

Figure 20:
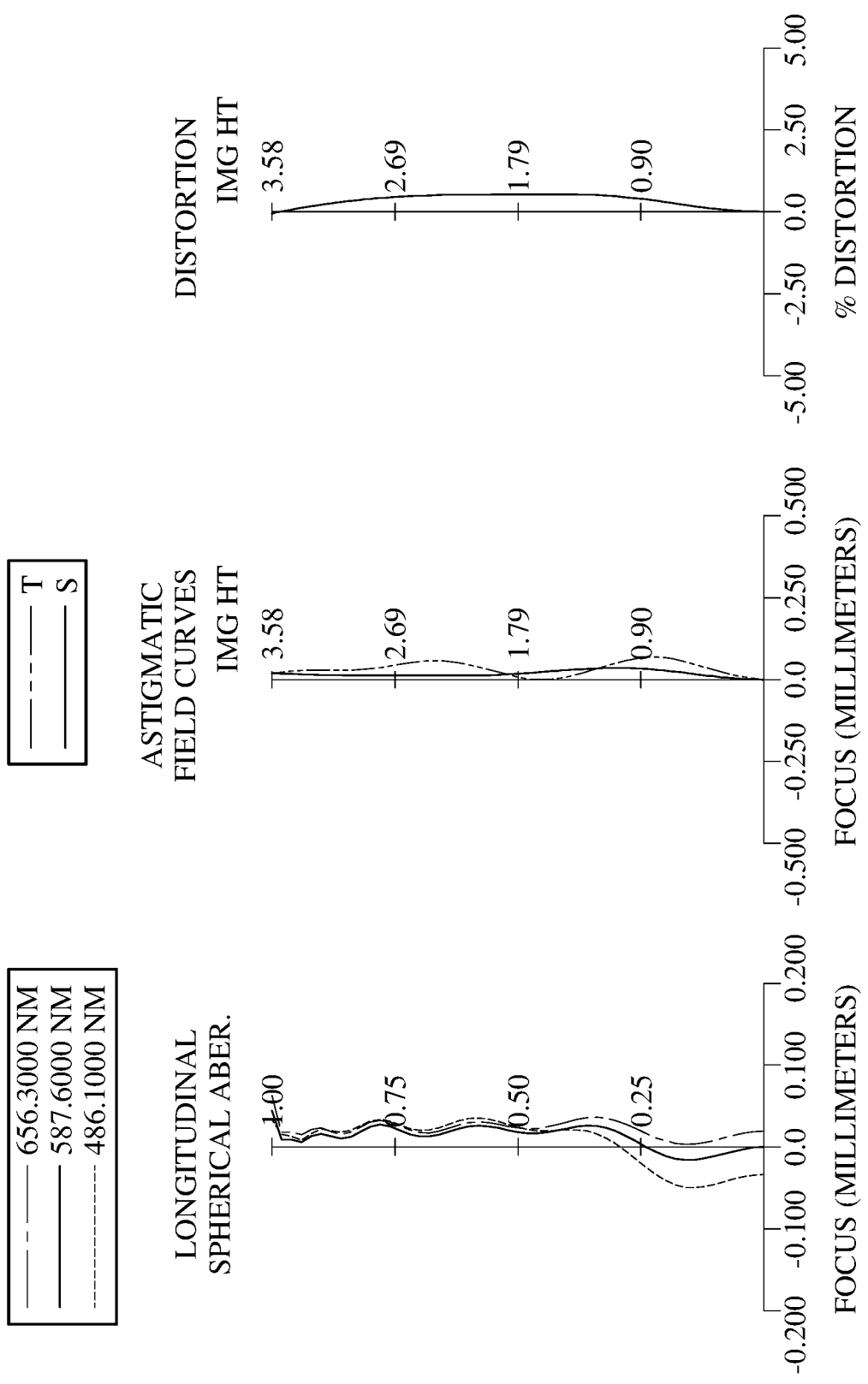
Figure 21:
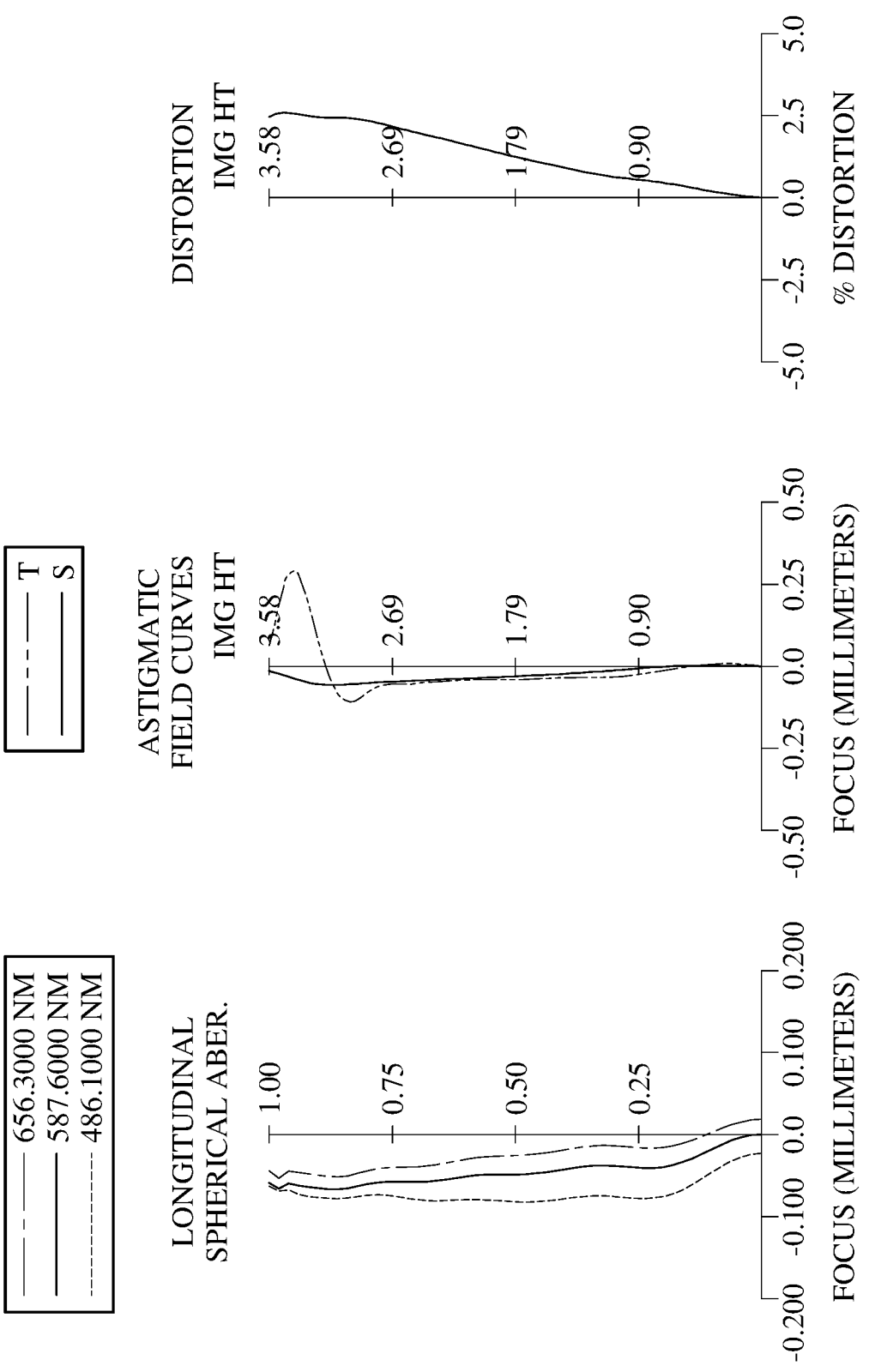
Figure 22:
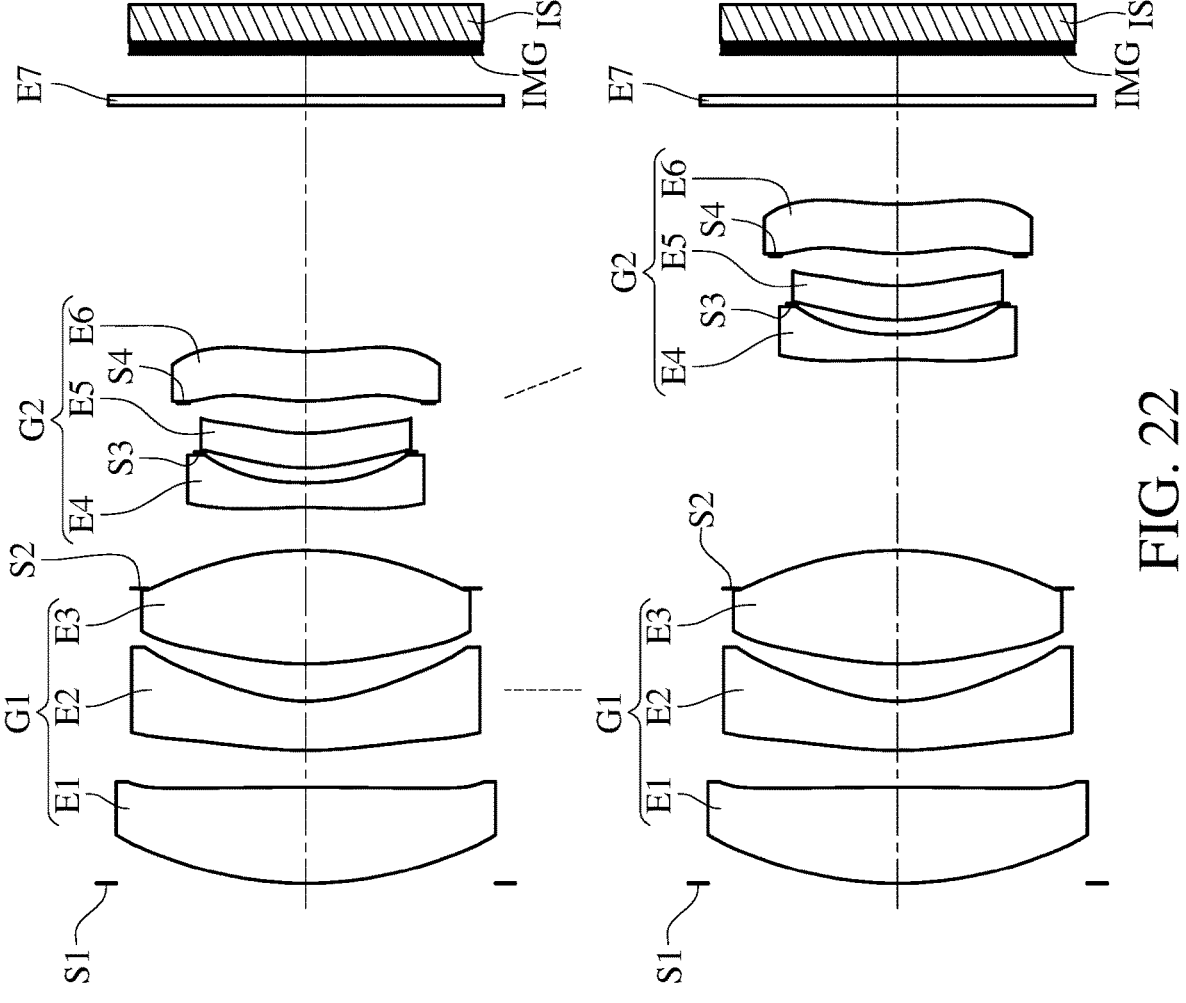
Figure 23:
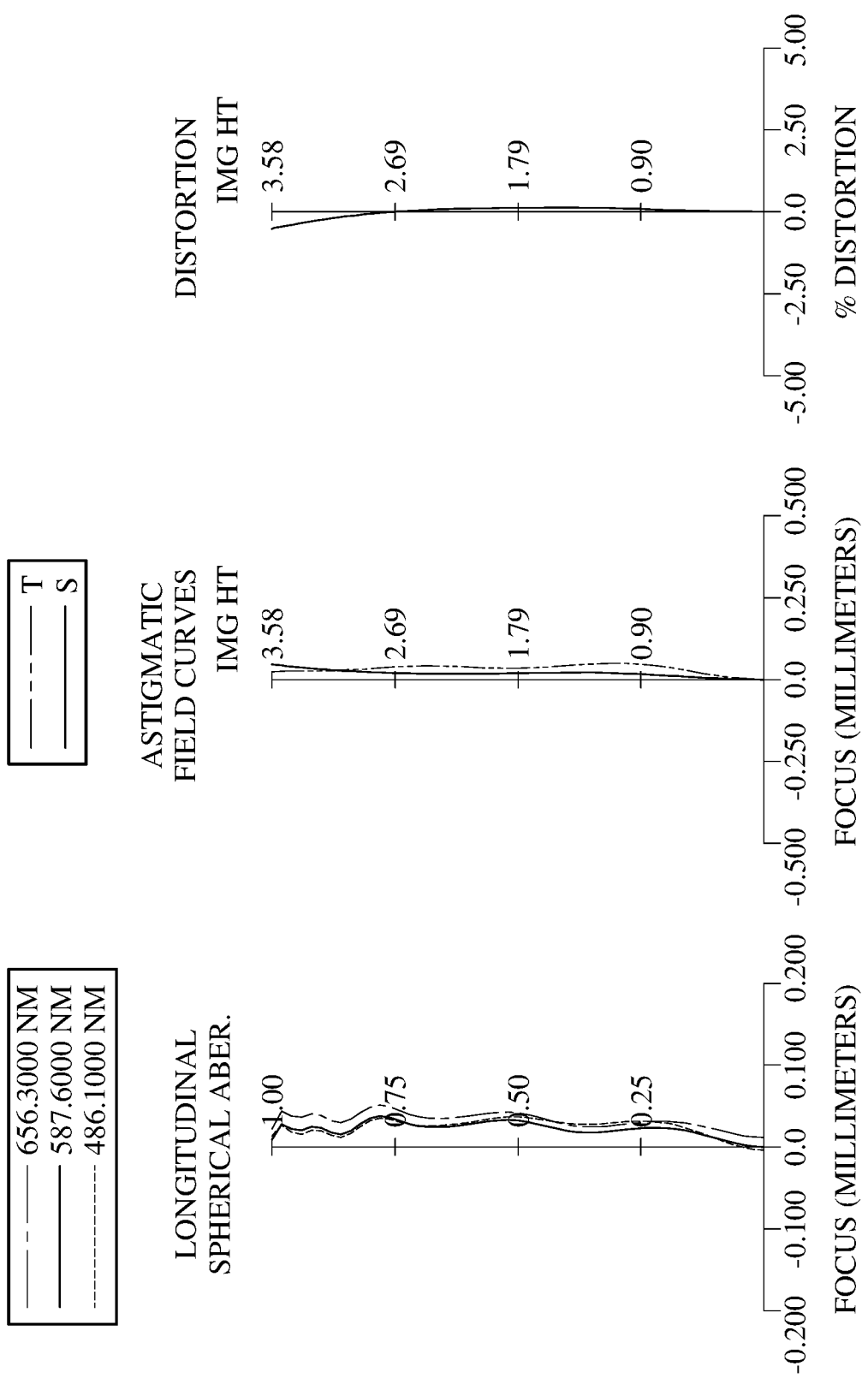
Figure 24:
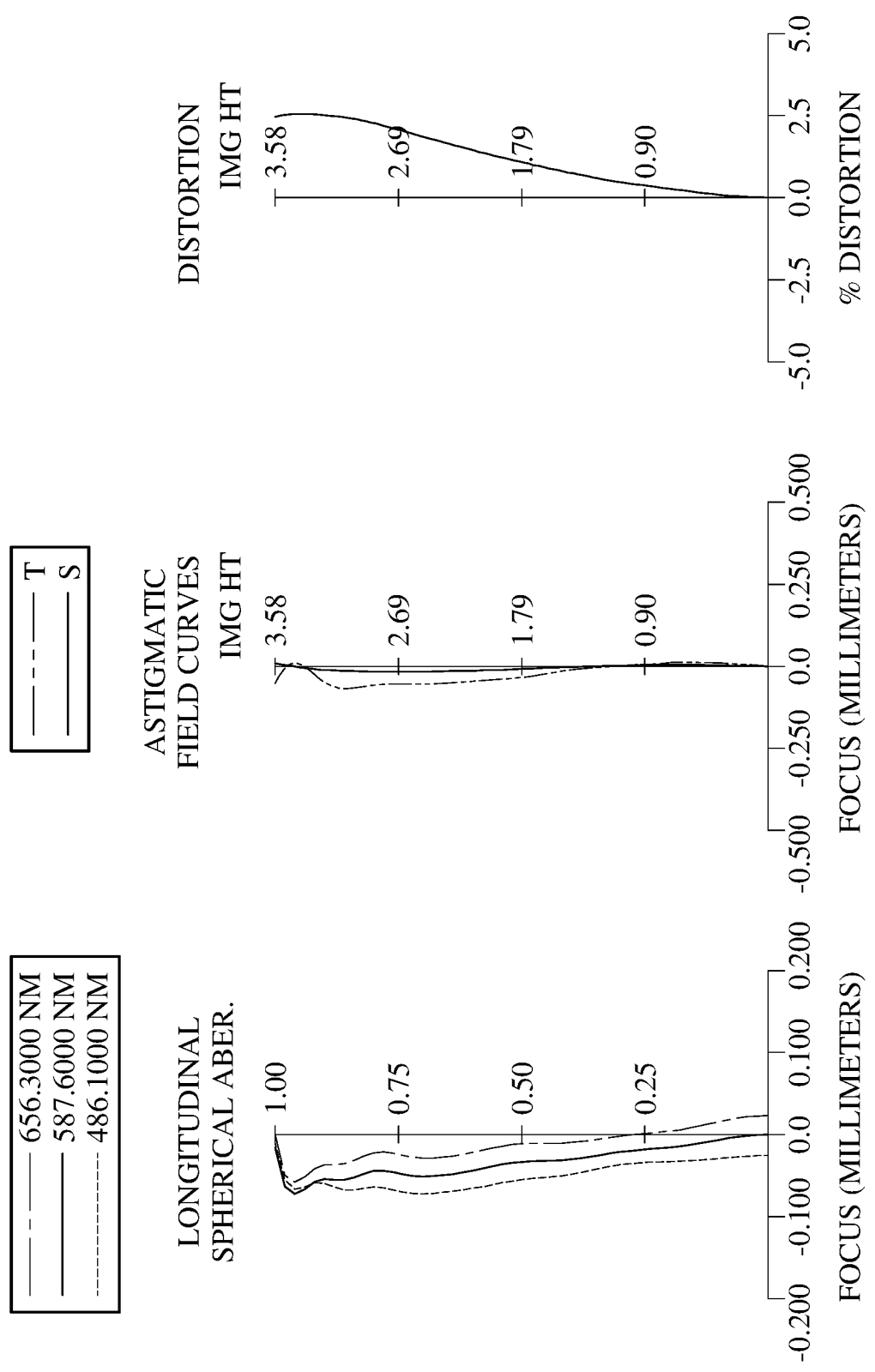
Figure 25:
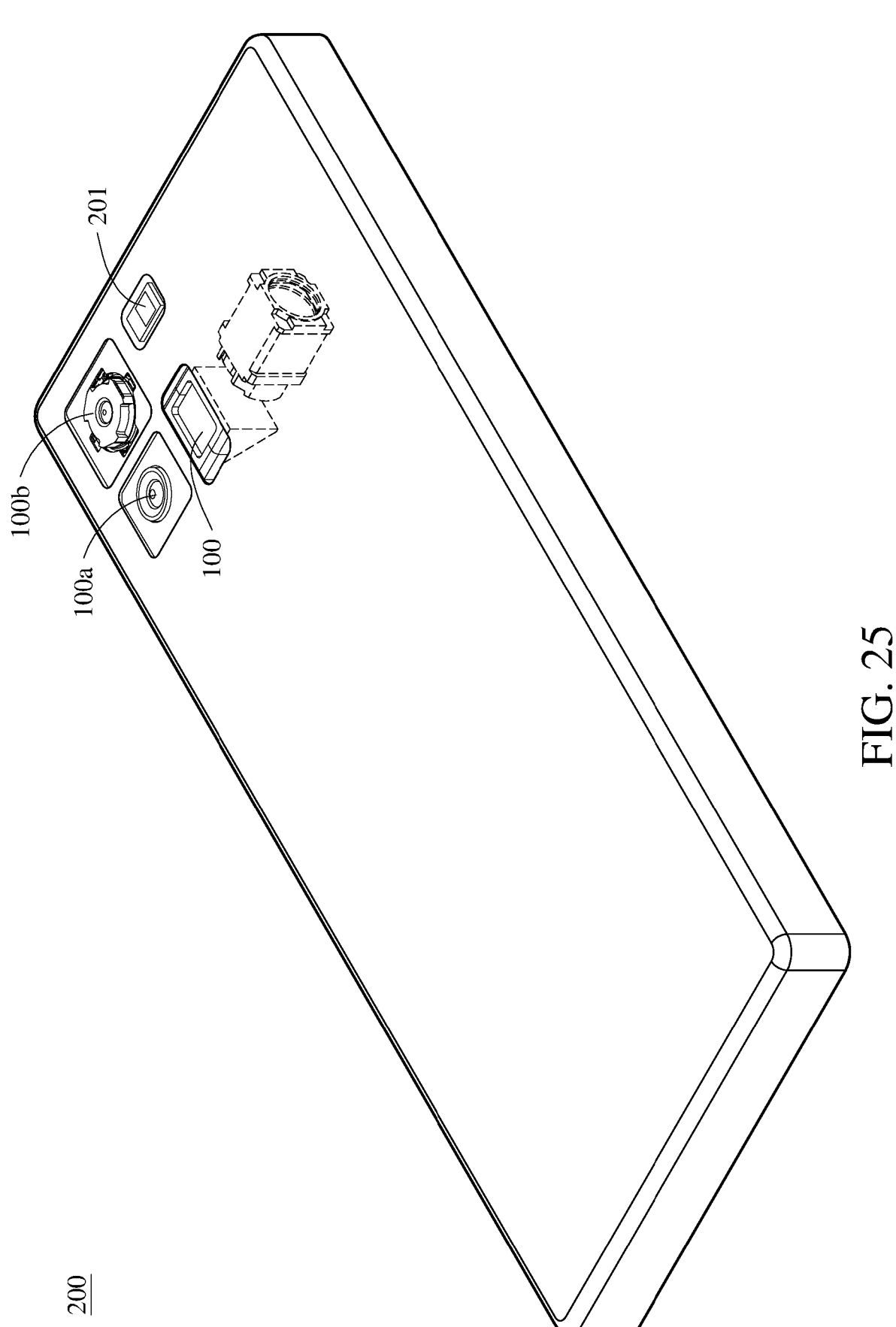
Figure 26:
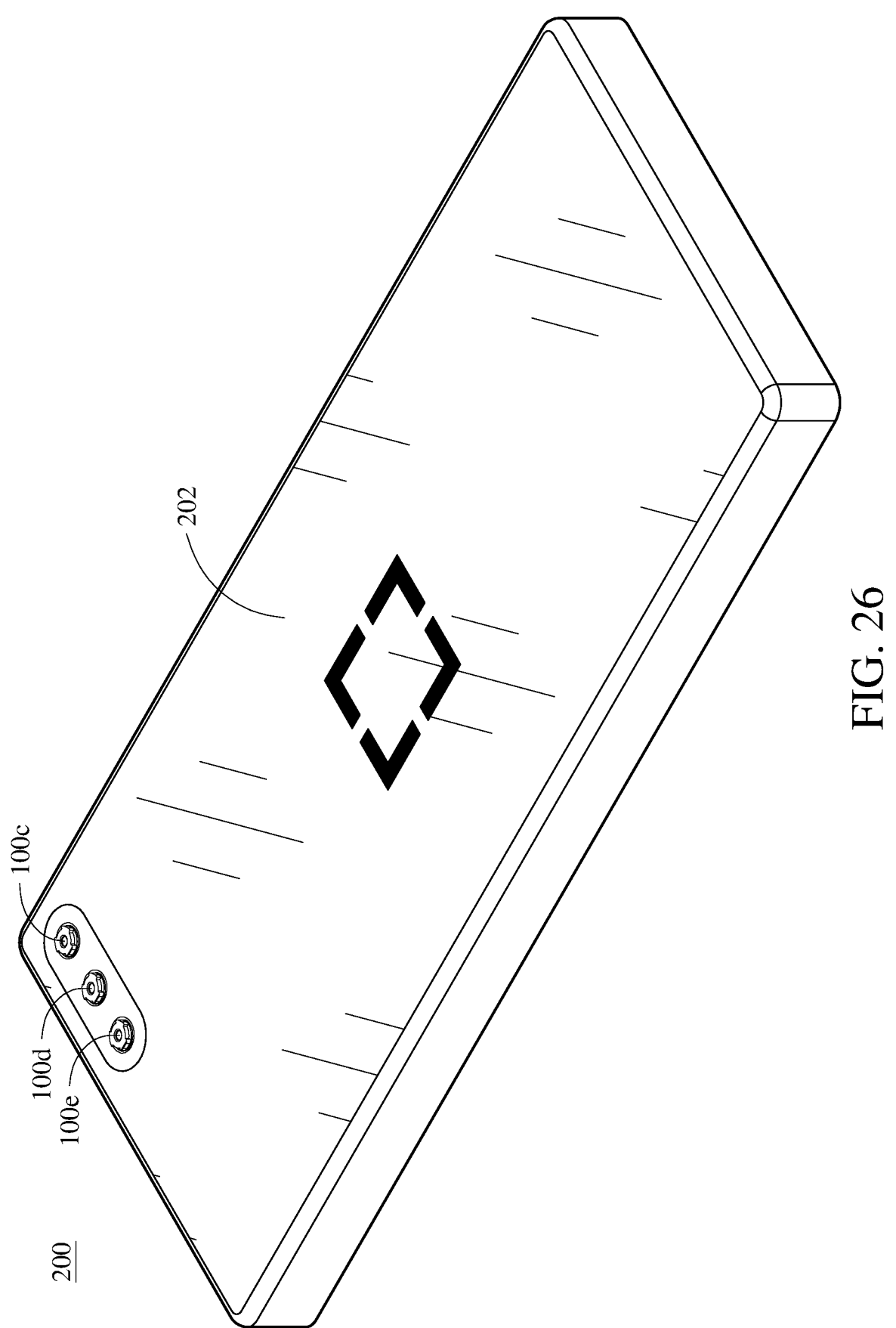
Figure 27:
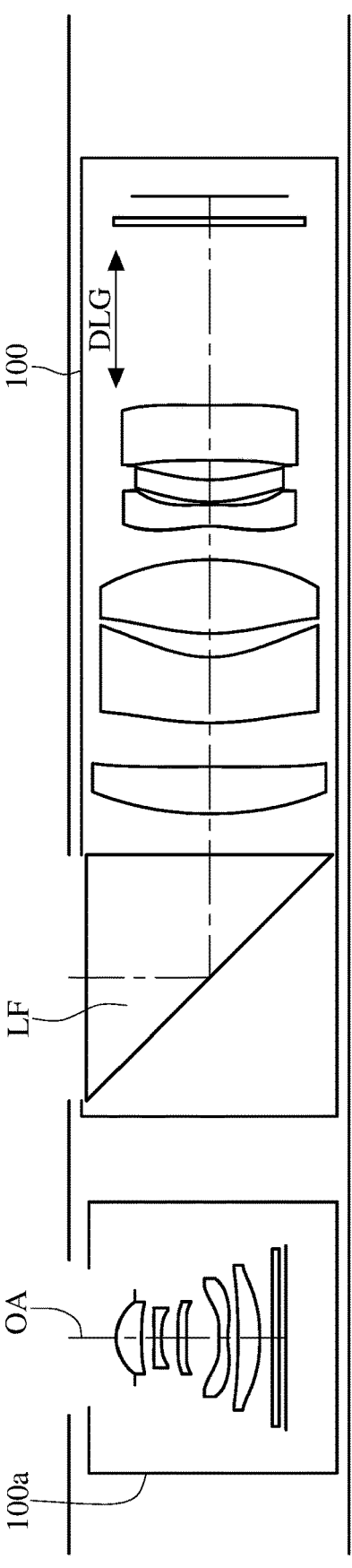
Figure 28:
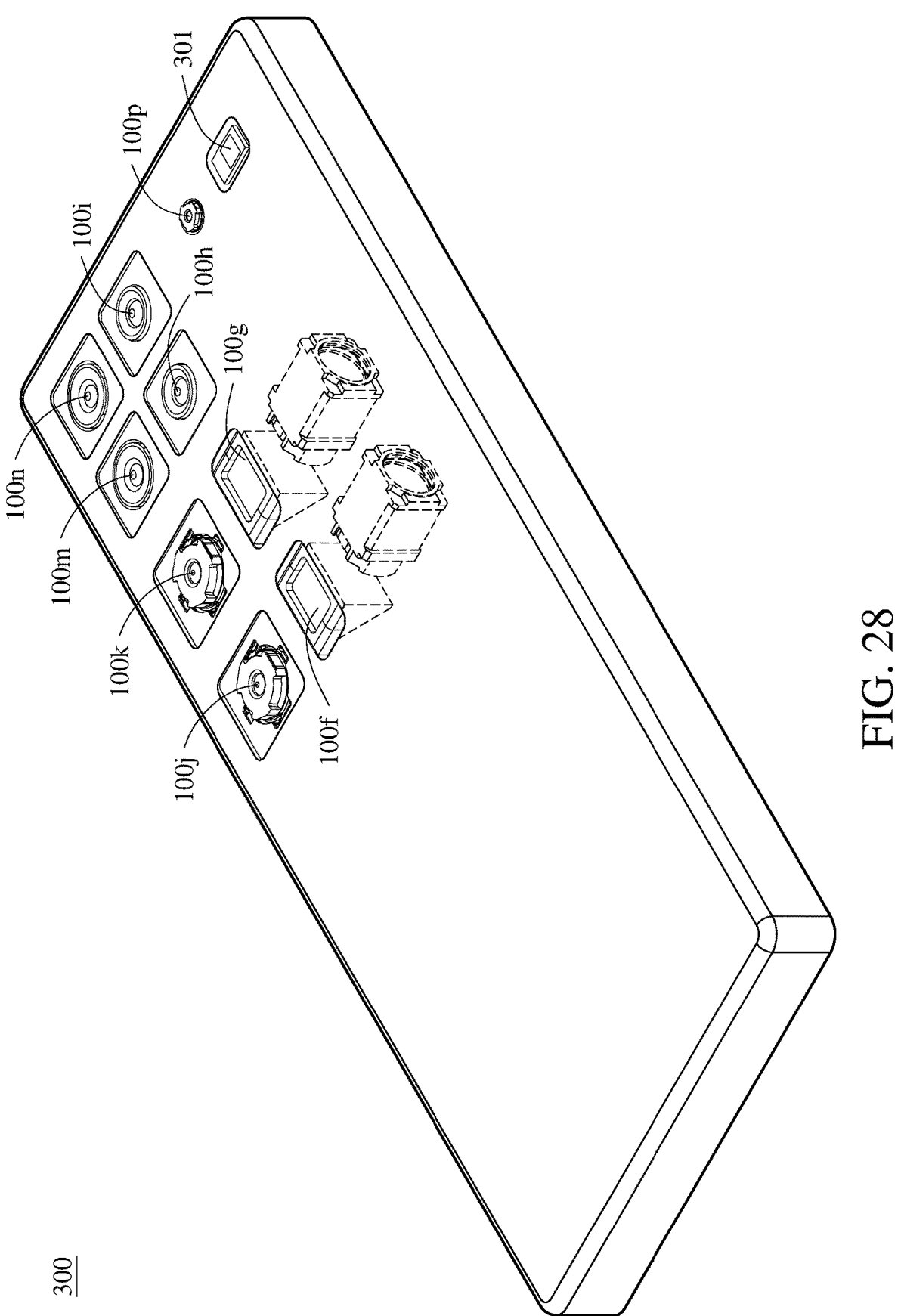
Figure 29:
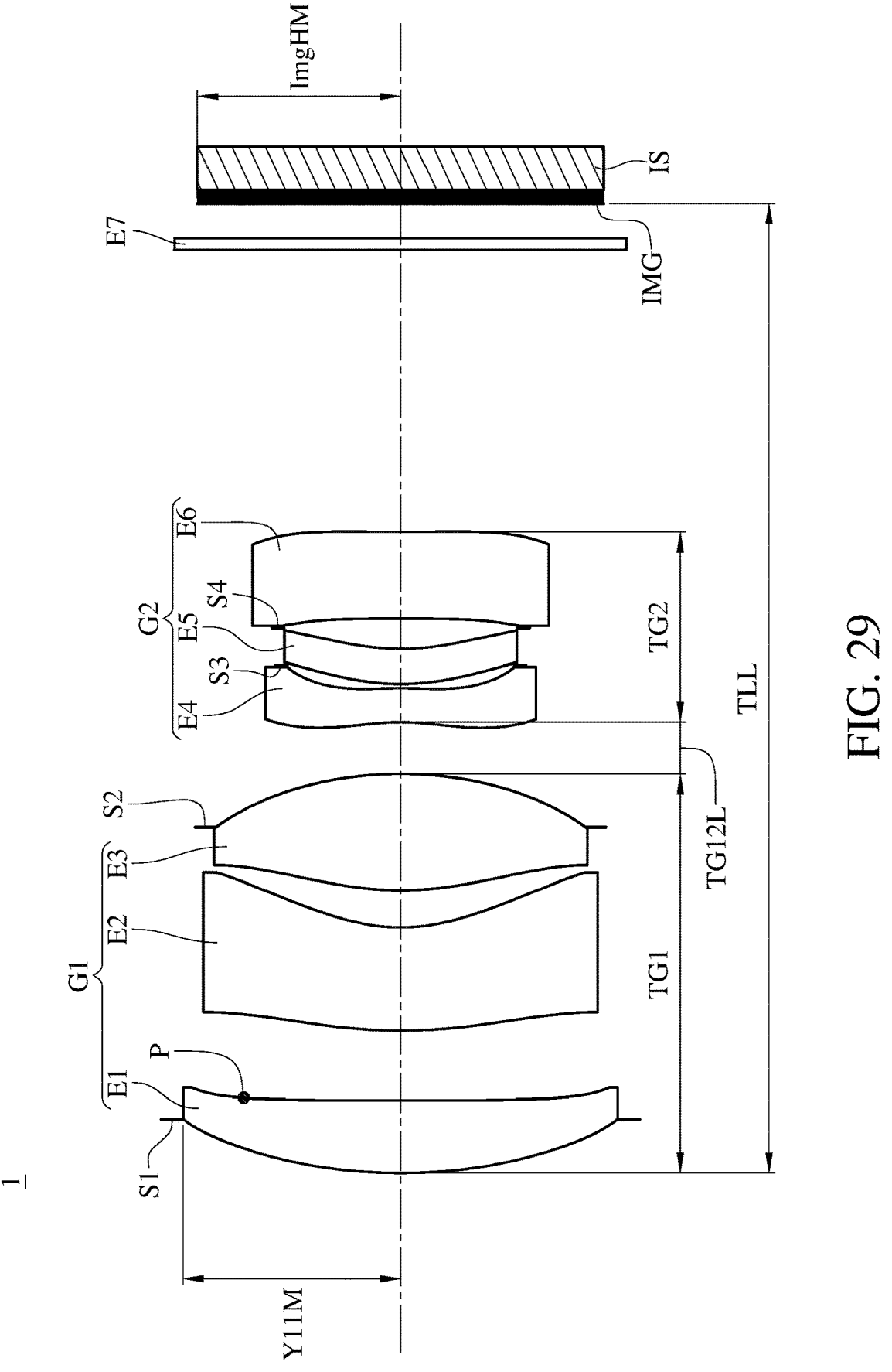
Figure 30:
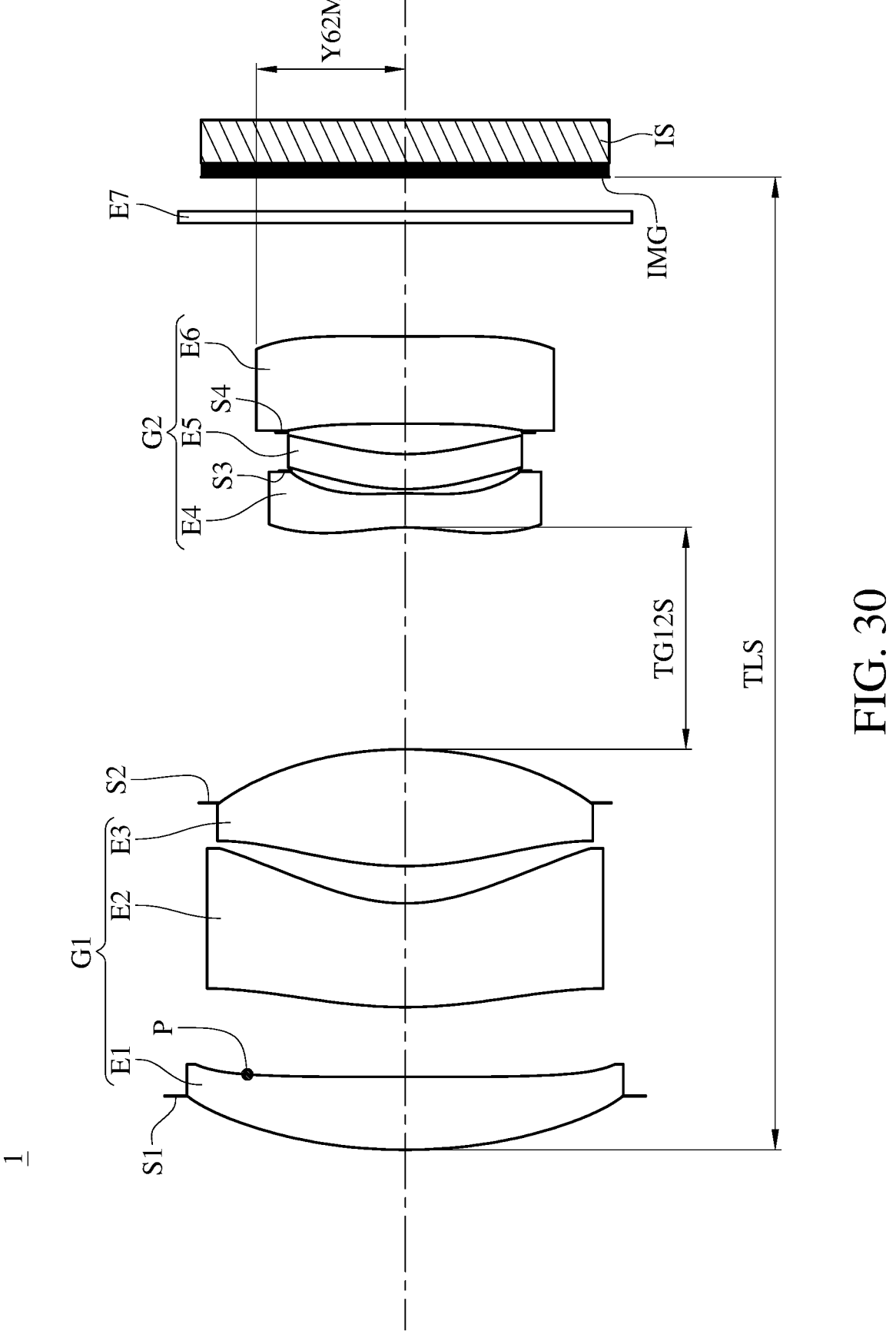
Figure 31:
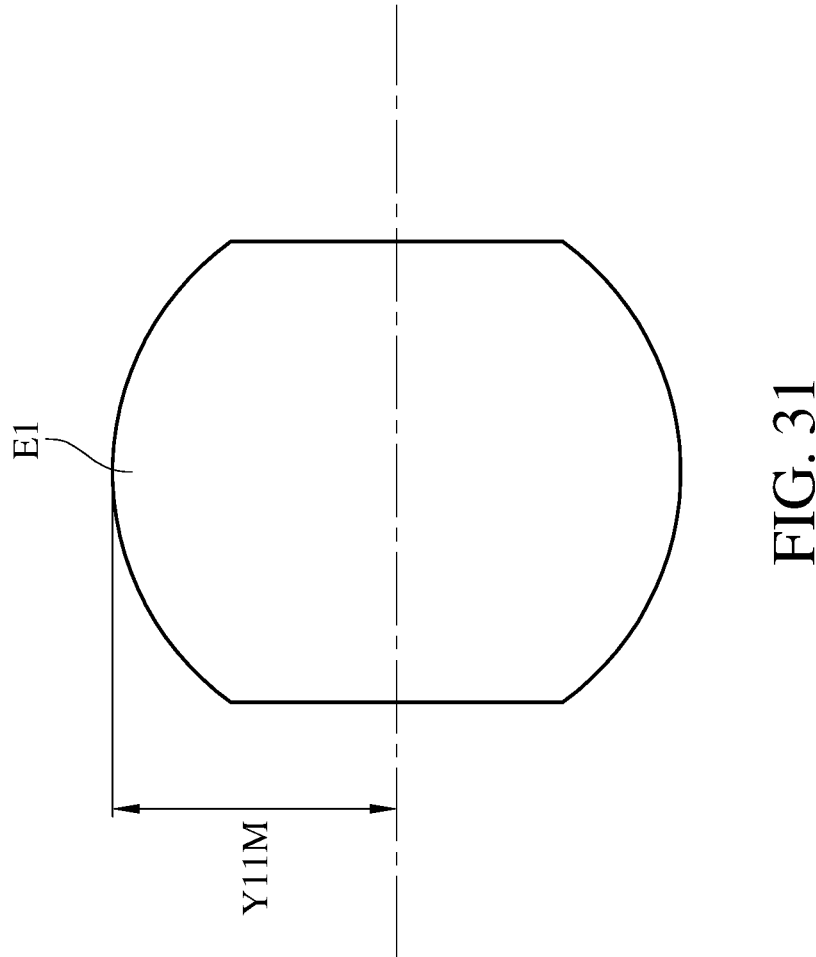
Figure 32:
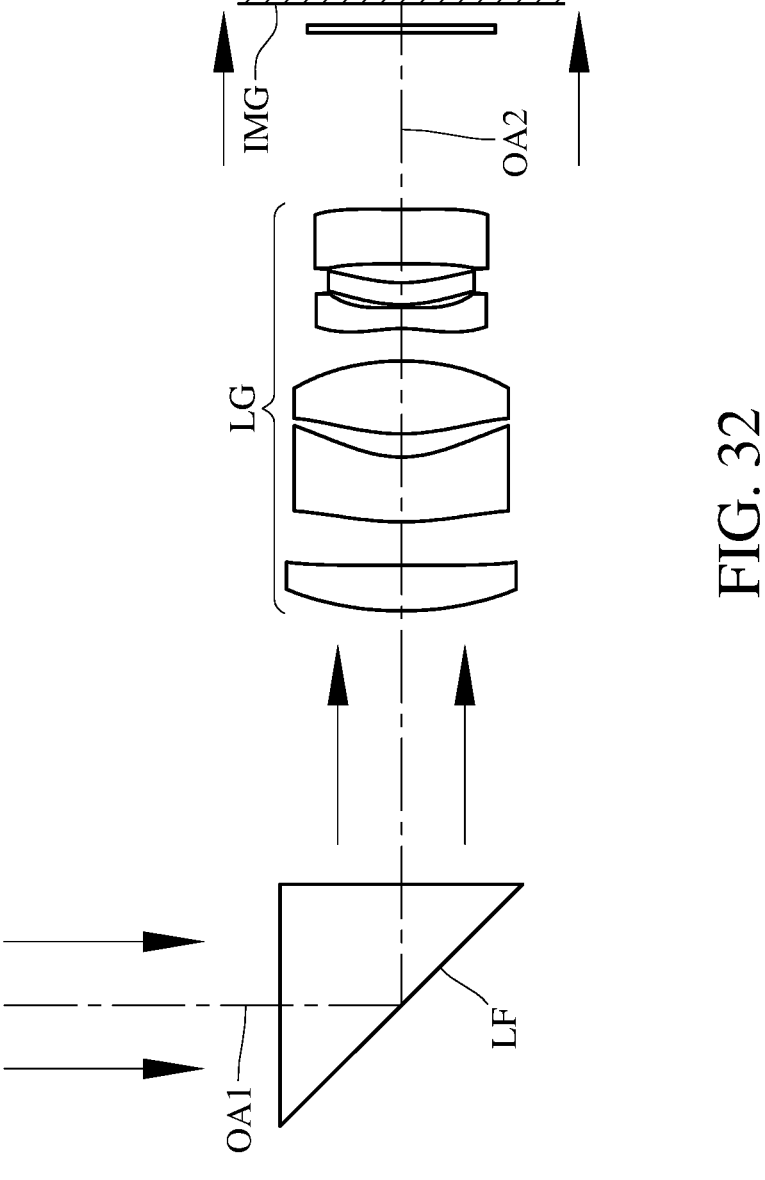
Figure 33:
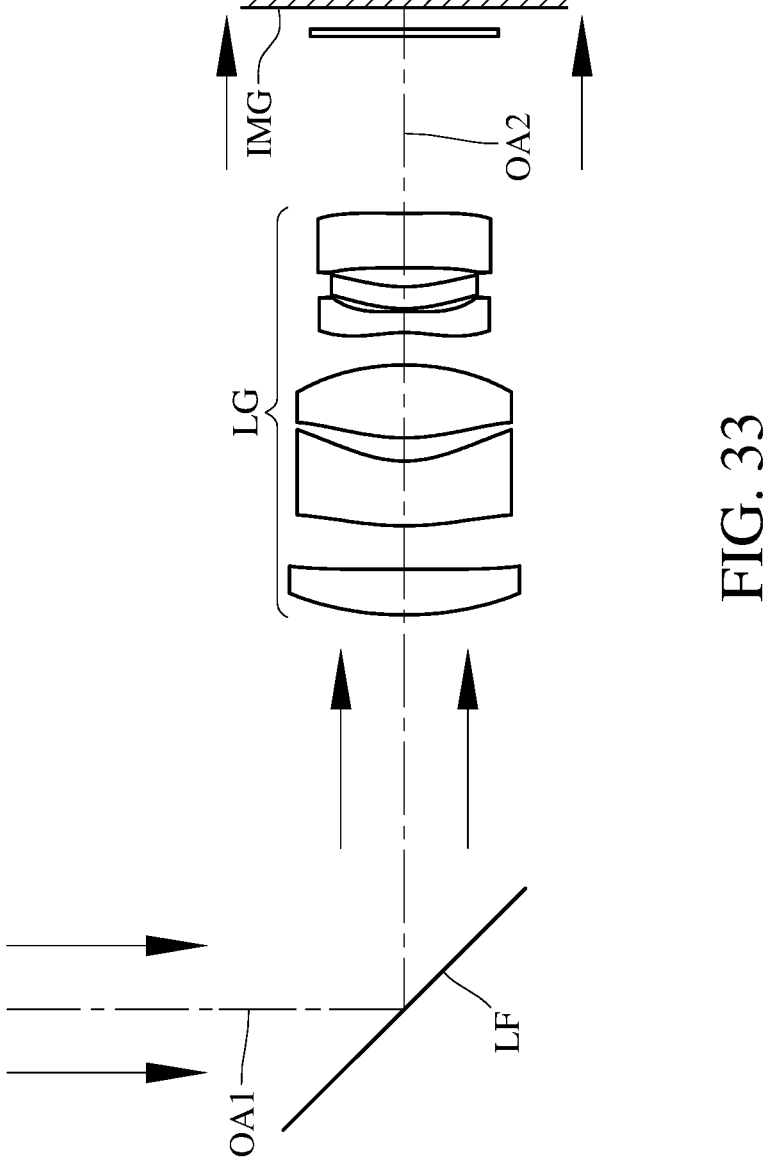
Figure 34:
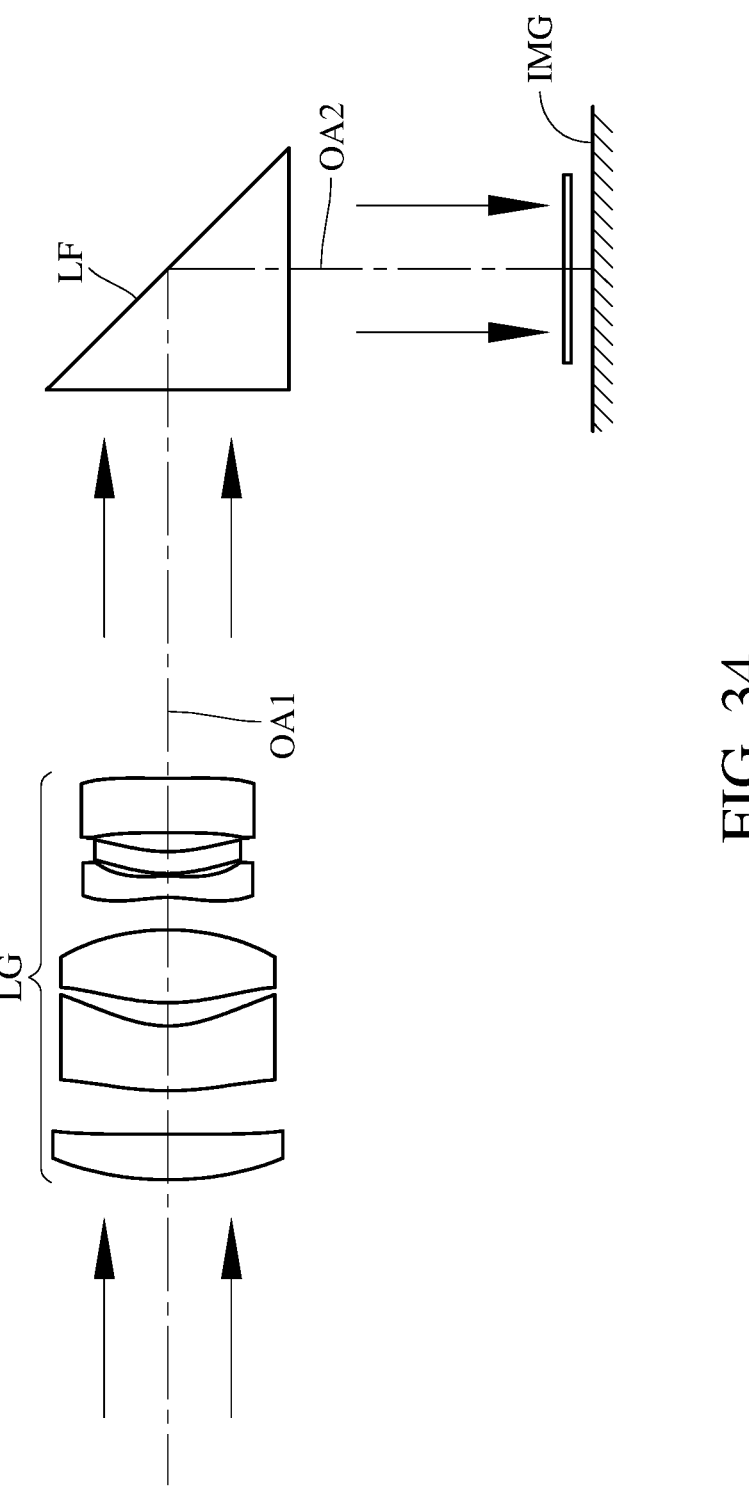
Figure 35:
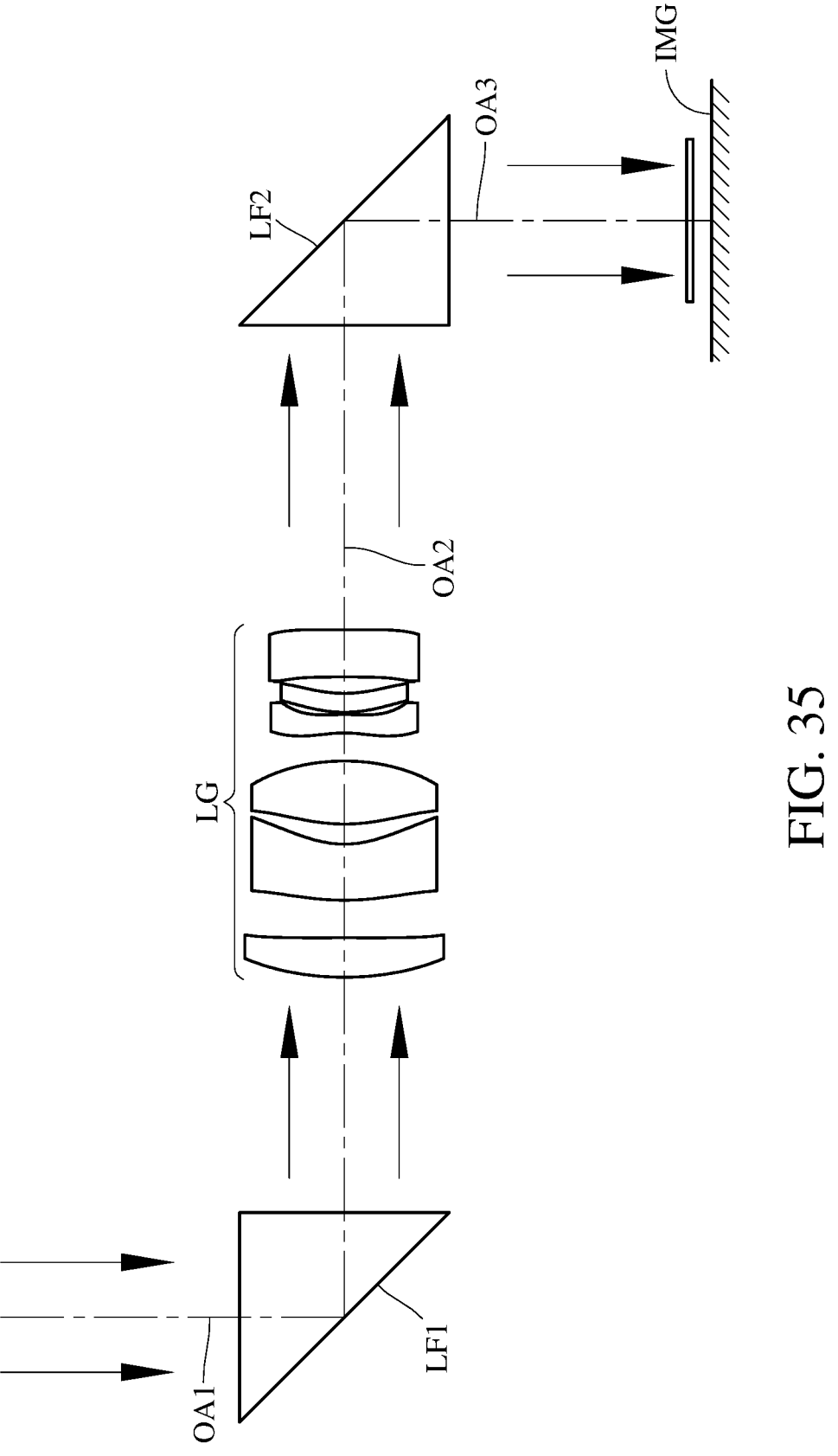

FIG. 20 shows spherical aberration curves, astigmatic field curves and a distortion curve of the image capturing unit at the long focal length state according to the 7th embodiment;

FIG. 21 shows spherical aberration curves, astigmatic field curves and a distortion curve of the image capturing unit at the short focal length state according to the 7th embodiment;

FIG. 22 is a schematic view of an image capturing unit respectively at the long focal length state and the short focal length state according to the 8th embodiment of the present disclosure;

FIG. 23 shows spherical aberration curves, astigmatic field curves and a distortion curve of the image capturing unit at the long focal length state according to the 8th embodiment;

FIG. 24 shows spherical aberration curves, astigmatic field curves and a distortion curve of the image capturing unit at the short focal length state according to the 8th embodiment;

FIG. 25 is one perspective view of an electronic device according to the 9th embodiment of the present disclosure;

FIG. 26 is another perspective view of the electronic device in FIG. 25;

FIG. 27 is a cross-sectional view of two image capturing units of the electronic device in FIG. 25;

FIG. 28 is a perspective view of an electronic device according to the 10th embodiment of the present disclosure;

FIG. 29 shows a schematic view of the image capturing unit at the long focal length state, TG1, TG2, TG12L, TLL, Y11M, ImgHM and an inflection point of the first lens element according to the 1st embodiment of the present disclosure;

FIG. 30 shows a schematic view of the image capturing unit at the short focal length state, TG12S, TLS, Y62M and the inflection point of the first lens element according to the 1st embodiment of the present disclosure;

FIG. 31 shows a schematic view of an optically effective area of the object-side surface of the first lens element in a non-circular-symmetrical shape when the optical photographing lens is at at least one state thereof according to one embodiment of the present disclosure;

FIG. 32 shows a schematic view of a configuration of one light-folding element in an optical photographing lens according to one embodiment of the present disclosure;

FIG. 33 shows a schematic view of another configuration of one light-folding element in an optical photographing lens according to one embodiment of the present disclosure;

FIG. 34 shows a schematic view of further another configuration of one light-folding element in an optical photographing lens according to one embodiment of the present disclosure; and FIG. 35 shows a schematic view of a configuration of two light-folding elements in an optical photographing lens according to one embodiment of the present disclosure.

DETAILED DESCRIPTION

According to one aspect of the present disclosure, an optical photographing lens includes two lens groups, and the two lens groups includes six lens elements. The two lens groups are, in order from an object side to an image side along an optical path, a first lens group and a second lens group. The six lens elements are, in order from the object side to the image side along the optical path, a first lens element, a second lens element, a third lens element, a fourth lens element, a fifth lens element and a sixth lens element. Each of the six lens elements has an object-side surface facing toward the object side and an image-side surface facing toward the image side. With the arrangement of the two lens groups and the six lens elements, the optical photographing lens disclosed in the present disclosure is able to obtain a proper balance between the overall size, the focal length adjustment range, image quality and assembly difficulty.

In the optical photographing lens disclosed in the present disclosure, a focal length adjusting process can be performed by changing an axial distance between the two lens groups for varying a focal length of the optical photographing lens. It can also be considered that the optical photographing lens can perform the focal length adjusting process to change inner state thereof according to an object distance for correspondingly varying the focal length of the optical photographing lens. Therefore, it is favorable for increasing the application range of the optical photographing lens. Moreover, the optical photographing lens can have a plurality of states during the focal length adjusting process. The state where the optical photographing lens has the longest focal length corresponds to a long focal length state of the optical photographing lens, and the state where the optical photographing lens has the shortest focal length corresponds to a short focal length state of the optical photographing lens. Please refer to FIG. 1, which is a schematic view divided into an upper part and a lower part for respectively showing an image capturing unit at the long focal length state and at the short focal length state according to the 1st embodiment of the present disclosure.

In the optical photographing lens disclosed in the present disclosure, the second lens group moves along an optical axis relative to the first lens group during the focal length adjusting process. Therefore, it is favorable for simplifying the mechanism. Moreover, the second lens group can move towards the image side along the optical axis relative to the first lens group when the focal length of the optical photographing lens is gradually reduced during the focal length adjusting process. Conversely, the second lens group can move towards the object side along the optical axis relative to the first lens group when the focal length of the optical photographing lens is gradually increased during the focal length adjusting process. Therefore, it is favorable for minimizing the position change of the image surface during the focal length adjusting process so as to maintain image quality. From another point of view, the second lens group can move towards the image side along the optical axis relative to the first lens group when the object distance is gradually reduced during the focal length adjusting process. Conversely, the second lens group can move towards the object side along the optical axis relative to the first lens group when the object distance is gradually increased during the focal length adjusting process. Therefore, it is favorable for minimizing the position change of the image surface during the focal length adjusting process so as to maintain image quality. Moreover, the first lens group includes the first lens element, the second lens element and the third lens element. Therefore, it is favorable for improving image quality of the optical photographing lens. Moreover, the second lens group includes the fourth lens element, the fifth lens element and the sixth lens element. Therefore, it is favorable for obtaining a proper balance between the overall size, the focal length adjustment range and image quality.

In the optical photographing lens disclosed in the present disclosure, there can be no relative motion between lens elements of one lens group during the focal length adjusting process. Therefore, it is favorable for simplifying the mechanism. For example, there is no relative motion between the any two of the first lens element, the second lens element and the third lens element of the first lens group during the focal length adjusting process.

According to the present disclosure, at least one lens element of the optical photographing lens can be made of plastic material. Therefore, it is favorable for reducing the overall size and weight and increasing image quality and mass production capacity.

According to the present disclosure, at least one lens surface of at least one lens element of the optical photographing lens can have at least one inflection point always located within an optically effective area of the at least one lens surface during the focal length adjusting process. Therefore, it is favorable for increasing variety of the lens shape, thereby reducing the lens size and improving image quality. Moreover, at least one lens surface of at least one lens element of the second lens group can have at least one inflection point always located within an optically effective area of the at least one lens surface during the focal length adjusting process. Moreover, the object-side surface of the fourth lens element can have at least one inflection point always located within an optically effective area of the object-side surface of the fourth lens element during the focal length adjusting process. Please be noted that the said at least one lens surface of the at least one lens element refers to at least one of the object-side surface and the image-side surface of the said at least one lens element. Please be noted that the optically effective area of any one lens surface may have different size when the optical photographing lens is at different state. That is, the range of the optically effective area may be changed during the focal length adjusting process. Please refer to FIG. 29 and FIG. 30, which are schematic views showing an inflection point P on the image-side surface of the first lens element E1 according to the 1st embodiment of the present disclosure, and the inflection point P is always located within the optically effective area of the image-side surface of the first lens element no matter how the range of the optically effective area of the image-side surface of the first lens element is changed. Please be noted the long focal length state and the short focal length state of the optical photographing lens in FIG. 29 and FIG. 30 are two exemplary states for illustrating the position of the inflection point P only, and the optical photographing lens has different focal lengths at different states. Please be noted that the inflection point P on the image-side surface of the first lens element E1 according to the 1st embodiment of the present disclosure in FIG. 29 and FIG. 30 is exemplary, and each of the object-side surfaces and the image-side surfaces of the lens elements in the 1st and other embodiments of the present disclosure can also have at least one inflection point always located within an optically effective area thereof during the focal length adjusting process.

According to the present disclosure, an optically effective area of at least one lens surface of at least one lens element of the optical photographing lens can be in a non-circular-symmetrical shape at at least one state of the optical photographing lens during the focal length adjusting process. Therefore, it is favorable for reducing the size of the optical photographing lens so as to enlarge application range. Moreover, an optically effective area of at least one lens surface of at least one lens element of the first lens group can be in a non-circular-symmetrical shape at at least one state of the optical photographing lens during the focal length adjusting process. Moreover, an optically effective area of each lens surface of the first lens element, the second lens element and the third lens element can be in a non-circular-symmetrical shape at at least one state of the optical photographing lens during the focal length adjusting process. Moreover, an optically effective area of the image-side surface of the sixth lens element can be in a non-circular-symmetrical shape at at least one state of the optical photographing lens during the focal length adjusting process. Please refer to FIG. 31, which is a schematic view showing the optically effective area of the object-side surface of the first lens element E1 in a non-circular-symmetrical shape at one state of the optical photographing lens according to the 1st embodiment of the present disclosure. Please be noted that the non-circular-symmetrically shape of the optically effective area of the object-side surface of the first lens element E1 according to the 1st embodiment of the present disclosure is only exemplary. The optically effective area may be in other non-circular-symmetrical shapes in different type based on actual requirements. Further, each of the object-side surfaces and the image-side surfaces of the lens elements in the 1st and other embodiments of the present disclosure can also have an optically effective area with a non-circular-symmetrically shape.

According to the present disclosure, the optical photographing lens can further include a light-folding element. Therefore, it is favorable for adjusting space arrangement so as to eliminate design restriction. Moreover, the light-folding element can be located at an object side of the first lens element. Moreover, the light-folding element can include at least one prism. Therefore, it is favorable for increasing assembly yield rate of the optical photographing lens.

The first lens group can have positive refractive power. Therefore, it is favorable for reducing the size of the optical photographing lens at the object side.

The second lens group can have negative refractive power. Therefore, it is favorable for reducing aberrations generated during the focal length adjusting process.

The first lens element can have positive refractive power. Therefore, it is favorable for reducing the size of the optical photographing lens at the object side. The object-side surface of the first lens element can be convex in a paraxial region thereof. Therefore, it is favorable for reducing the outer diameter of the optical photographing lens at the object side.

The second lens element has negative refractive power. Therefore, it is favorable for correcting aberrations such as spherical aberration generated due to size reduction. The object-side surface of the second lens element can be convex in a paraxial region thereof. Therefore, it is favorable for adjusting the travelling direction of light, thereby reducing the outer diameter of the optical photographing lens at the object side. The image-side surface of the second lens element can be concave in a paraxial region thereof. Therefore, it is favorable for correcting aberrations such as astigmatism.

The third lens element can have positive refractive power. Therefore, it is favorable for reducing the size and sensitivity of the optical photographing lens. The object-side surface of the third lens element can be convex in a paraxial region thereof. Therefore, it is favorable for adjusting the travelling direction of light, thereby reducing the outer diameter of the first lens group. The image-side surface of the third lens element can be convex in a paraxial region thereof. Therefore, it is favorable for adjusting the travelling direction of light, thereby reducing incident angle of light on the second lens group.

The object-side surface of the fourth lens element can be concave in a paraxial region thereof. Therefore, it is favorable for adjusting the lens shape and refractive power of the fourth lens element, thereby maintaining image quality during the focal length adjusting process.

When a focal length of the second lens element is f2, and a central thickness of the second lens element is CT2, the following condition is satisfied: $-12.0 < f2/CT2 < -1.00$. Therefore, it is favorable for adjusting the lens shape and refractive power of the second lens element so as to correct aberrations. Moreover, the following condition can also be satisfied: $-10.0 < f2/CT2 < -2.00$. Moreover, the following condition can also be satisfied: $-8.00 < f2/CT2 < -3.00$. Moreover, the following condition can also be satisfied: $6.02 \leq f2/CT2 \leq -4.10$.

When a central thickness of the fourth lens element is CT4, a central thickness of the fifth lens element is CT5, a central thickness of the sixth lens element is CT6, an axial distance between the fourth lens element and the fifth lens element is T45, and an axial distance between the fifth lens element and the sixth lens element is T56, the following condition can be satisfied: $1.6 < (CT4+CT5+CT6)/(T45+T56) < 15$. Therefore, it is favorable for adjusting lens distribution of the second lens group so as to reduce the overall size thereof. Moreover, the following condition can also be satisfied: $1.9 < (CT4+CT5+CT6)/(T45+T56) < 13$. Moreover, the following condition can also be satisfied: $2.3 < (CT4+CT5+CT6)/(T45+T56) < 11$. Moreover, the following condition can also be satisfied: $3.2 < (CT4+CT5+CT6)/(T45+T56) < 9.0$. Moreover, the following condition can also be satisfied: $4.0 < (CT4+CT5+CT6)/(T45+T56) < 7.0$. Moreover, the following condition can also be satisfied: $4.51 \leq (CT4+CT5+CT6)/(T45+T56) \leq 5.76$.

When a curvature radius of the object-side surface of the third lens element is R5, and a central thickness of the third lens element is CT3, the following condition can be satisfied: $0 < R5/CT3 < 12.0$. Therefore, it is favorable for adjusting the lens shape of the third lens element, thereby reducing the size of the first lens group. Moreover, the following condition can also be satisfied: $1.00 < R5/CT3 < 9.50$. Moreover, the following condition can also be satisfied: $1.65 < R5/CT3 < 7.50$. Moreover, the following condition can also be satisfied: $2.25 < R5/CT3 < 5.60$. Moreover, the following condition can also be satisfied: $2.39 \leq R5/CT3 \leq 4.53$.

When an axial distance between the object-side surface of the first lens element and the image-side surface of the third lens element is TG1, and an axial distance between the object-side surface of the fourth lens element and the image-side surface of the sixth lens element is TG2, the following condition can be satisfied: $1.4 < TG1/TG2 < 4.0$. Therefore, it is favorable for adjusting the distribution of the first lens group and the second lens group, thereby reducing the overall size of the optical photographing lens. Moreover, the following condition can also be satisfied: $1.6 < TG1/TG2 < 3.0$. Moreover, the following condition can also be satisfied: $1.85 \leq TG1/TG2 \leq 2.39$. Please refer to FIG. 29, which is a schematic view showing TG1 and TG2 according to the 1st embodiment of the present disclosure. In some situation, TG1 can be considered as an axial thickness of the first lens group, and TG2 can be considered as an axial thickness of the second lens group.

When a central thickness of the first lens element is CT1, the central thickness of the second lens element is CT2, the central thickness of the third lens element is CT3, an axial distance between the first lens element and the second lens element is T12, and an axial distance between the second lens element and the third lens element is T23, the following condition can be satisfied: $0.50 < (CT1+CT2+CT3)/(T12+T23) < 6.8$. Therefore, it is favorable for adjusting lens distribution of the first lens group so as to reduce the overall size thereof. Moreover, the following condition can also be satisfied: $1.1 < (CT1+CT2+CT3)/(T12+T23) < 5.6$. Moreover, the following condition can also be satisfied: $1.7 < (CT1+CT2+CT3)/(T12+T23) < 4.4$. Moreover, the following condition can also be satisfied: $2.0 < (CT1+CT2+CT3)/(T12+T23) < 3.8$.

When the curvature radius of the object-side surface of the third lens element is R5, a curvature radius of the image-side surface of the third lens element is R6, and the central thickness of the third lens element is CT3, the following condition can be satisfied: $1.0 < (R5-R6)/CT3 < 10$. Therefore, it is favorable for adjusting the lens shape of the third lens element, thereby reducing the size of the first lens group. Moreover, the following condition can also be satisfied: $4.2 < (R5-R6)/CT3 < 7.8$.

When a focal length of the first lens element is f1, and the focal length of the second lens element is f2, the following condition can be satisfied: $-2.3 < f1/f2 < -0.95$. Therefore, it is favorable for combining the first lens element and the second lens element so as to correct aberrations such as spherical aberration.

When a maximum distance between an optically effective area of the object-side surface of the first lens element and the optical axis during the focal length adjusting process is Y11M, and a maximum distance between an optically effective area of the image-side surface of the sixth lens element and the optical axis during the focal length adjusting process is Y62M, the following condition can be satisfied: $0.50 < Y11M/Y62M < 2.0$. Therefore, it is favorable for adjusting the travelling direction of light, thereby obtaining a proper balance between the field of view, size distribution, adjusting range of the focal length and image quality. Moreover, the following condition can also be satisfied: $0.55 < Y11M/Y62M < 1.8$. Moreover, the following condition can also be satisfied: $0.65 < Y11M/Y62M < 1.6$. In some situation, an optically effective area of a lens surface may be changed during the focal length adjusting process, and a distance between the optically effective area of the lens surface and the optical axis is correspondingly changed. Therefore, the maximum distance between an optically effective area of each lens surface and the optical axis may be appeared in different states of the optical photographing lens. Please refer to FIG. 29 and FIG. 31, which are schematic views showing Y11M of the 1st embodiment of the present disclosure. The optical photographing lens in FIG. 29 is at the long focal length state, and Y11M is appeared when the optical photographing lens is at the long focal length state. Please refer to FIG. 30, which is a schematic view showing Y62M of the 1st embodiment of the present disclosure. The optical photographing lens in FIG. 30 is at the short focal length state, and Y62M is appeared when the optical photographing lens is at the short focal length state.

When a curvature radius of the object-side surface of the second lens element is R3, and the central thickness of the second lens element is CT2, the following condition can be satisfied: $1.0 < R3/CT2 < 10$. Therefore, it is favorable for adjusting the lens shape of the second lens element, thereby reducing the outer diameter of the first lens group. Moreover, the following condition can also be satisfied: $2.0 < R3/CT2 < 8.0$. Moreover, the following condition can also be satisfied: $3.0 < R3/CT2 < 6.0$.

When a focal length of the optical photographing lens at the long focal length state is fL, and a focal length of the optical photographing lens at the short focal length state is fS, the following condition can be satisfied: $1.20 < fL/$ fS<2.30. Therefore, it is favorable for taking the overall size and image quality into account when adjusting the focal length. Moreover, the following condition can also be satisfied: 1.35<fL/fS<1.70.

When a curvature radius of the image-side surface of the second lens element is R4, and the central thickness of the second lens element is CT2, the following condition can be satisfied: 0<R4/CT2<3.7. Therefore, it is favorable for adjusting the lens shape of the second lens element, thereby reducing the overall size and correcting aberrations. Moreover, the following condition can also be satisfied: 1.0<R4/CT2<3.3.

When a focal length of the third lens element is f3, and the central thickness of the third lens element is CT3, the following condition can be satisfied: 1.0<f3/CT3<6.5. Therefore, it is favorable for adjusting the lens shape and refractive power for the third lens element, thereby reducing the overall size of the first lens group. Moreover, the following condition can also be satisfied: 2.1<f3/CT3<4.9.

When the curvature radius of the image-side surface of the third lens element is R6, and a curvature radius of the object-side surface of the fourth lens element is R7, the following condition can be satisfied: 0.65<R6/R7<3.0. Therefore, it is favorable for collaborating the lens shapes of the third lens element and the fourth lens element so as to correct aberrations.

When an axial distance between the object-side surface of the first lens element and the image surface when the optical photographing lens is at the long focal length state is TLL, and an axial distance between the object-side surface of the first lens element and the image surface when the optical photographing lens is at the short focal length state is TLS, the following condition can be satisfied: |1−TLL/TLS|<1.0 E−2. Therefore, it is favorable for minimizing the position change of the image surface during the focal length adjusting process, thereby simplifying mechanism. Moreover, the following condition can also be satisfied: |1−TLL/TLS|<5.0 E−3. Moreover, the following condition can also be satisfied: |1−TLL/TLS|<2.5 E−3. Moreover, the following condition can also be satisfied: |1−TLL/TLS|<1.2 E−3. Please refer to FIG. 29 and FIG. 30, which are schematic views respectively showing TLL and TLS according to the 1st embodiment of the present disclosure.

When a composite focal length of the first lens element, the second lens element and the third lens element is fG1, and a composite focal length of the fourth lens element, the fifth lens element and the sixth lens element is fG2, the following condition can be satisfied: −1.50<fG2/fG1<−1.00. Therefore, it is favorable for combining the first lens group and the second lens group to enlarge the adjusting range of the focal length while maintaining good image quality. Moreover, the following condition can also be satisfied: −1.35<fG2/fG1<−1.10. In some situation, fG1 can be considered as a focal length of the first lens group, and fG2 can be considered as a focal length of the second lens group. The focal length of any said lens group refers to a composite focal length of all lens elements in the said lens group.

When the maximum distance between the optically effective area of the object-side surface of the first lens element and the optical axis during the focal length adjusting process is Y11M, and a maximum image height of the optical photographing lens during the focal length adjusting process (which can be half of a diagonal length of an effective photosensitive area of an image sensor) is ImgHM, the following condition can be satisfied: 0.70<Y11M/ImgHM<1.4. Therefore, it is favorable for adjusting the travelling direction of light, thereby reducing the outer diameter and enlarging the image surface. In some situation, an image height of the optical photographing lens may be changed during the focal length adjusting process, and ImgHM is the maximum value within the changing range of the image height of the optical photographing lens. In some other situation, the image height of the optical photographing lens may be the same during the focal length adjusting process. Please refer to FIG. 29, which is a schematic view showing Y11M and ImgHM according to the 1st embodiment of the present disclosure, and the image height of the optical photographing lens in the 1st embodiment remains the same during the focal length adjusting process.

When the curvature radius of the object-side surface of the third lens element is R5, the curvature radius of the image-side surface of the third lens element is R6, and the central thickness of the third lens element is CT3, the following condition can be satisfied: |R5+R6|/CT3<2.3. Therefore, it is favorable for adjusting the lens shape of the third lens element, thereby reducing the size of the first lens group. Moreover, the following condition can also be satisfied: |R5+R6|/CT3<1.7.

When an Abbe number of the first lens element is V1, an Abbe number of the second lens element is V2, and an Abbe number of the third lens element is V3, the following condition can be satisfied: 4.0<(V1+V3)/V2<6.0. Therefore, it is favorable for adjusting material distribution of lens elements to correct chromatic aberration.

When half of a maximum field of view of the optical photographing lens at the long focal length state is HFOVL, the following condition can be satisfied: 9.0 [deg.] <HFOVL<16.0 [deg.]. Therefore, it is favorable for adjusting the field of view at the long focal length state for application.

When an f-number of the optical photographing lens at the long focal length state is FnoL, the following condition can be satisfied: 1.6<FnoL<2.2. Therefore, it is favorable for obtaining a proper balance between the depth of view and illuminance when at the long focal length state.

When a curvature radius of the object-side surface of the first lens element is R1, and the focal length of the first lens element is f1, the following condition can be satisfied: 0.50<R1/f1<5.0. Therefore, it is favorable for adjusting the lens shape and refractive power of the first lens element, thereby reducing the size of the optical photographing lens at the object side.

When the composite focal length of the fourth lens element, the fifth lens element and the sixth lens element is fG2, an axial distance between the image-side surface of the third lens element and the object-side surface of the fourth lens element when the optical photographing lens is at the long focal length state is TG12L, and an axial distance between the image-side surface of the third lens element and the object-side surface of the fourth lens element when the optical photographing lens is at the short focal length state is TG12S, the following condition can be satisfied: 1.0<fG2/(TG12L−TG12S)<6.0. Therefore, it is favorable for adjusting refractive powers and movement manner of the lens groups, thereby balancing image quality and minimizing the position change of the image surface during the focal length adjusting process. Moreover, the following condition can also be satisfied: 2.0<fG2/(TG12L−TG12S)<5.0. Moreover, the following condition can also be satisfied: 3.0<fG2/(TG12L−TG12S)<3.9. Please refer to FIG. 29 and FIG. 30, which are schematic views respectively showing TG12L and TG12S according to the 1st embodiment of the present disclosure. In some situation, TG12L can be considered as an axial distance between the first lens group and the second lens group when the optical photographing lens is at the long focal length state, and TG12S can be considered as an axial distance between the first lens group and the second lens group when the optical photographing lens is at the short focal length state.

According to the present disclosure, the aforementioned features and conditions can be utilized in numerous combinations so as to achieve corresponding effects.

According to the present disclosure, the lens elements of the optical photographing lens can be made of either glass or plastic material. When the lens elements are made of glass material, the refractive power distribution of the optical photographing lens may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical photographing lens can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, the image surface of the optical photographing lens, based on the corresponding image sensor, can be flat or curved, especially a curved surface being concave facing towards the object side of the optical photographing lens.

According to the present disclosure, an image correction unit, such as a field flattener, can be optionally disposed between the lens element closest to the image side of the optical photographing lens along the optical path and the image surface for correction of aberrations such as field curvature. The optical characteristics of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, at least one light-folding element with an optical path folding function can be optionally disposed between an imaged object and the image surface on the imaging optical path, such that the optical photographing lens can be more flexible in space arrangement, and therefore the dimensions of an electronic device is not restricted by the total track length of the optical photographing lens. Moreover, the at least one light-folding element can include at least one prism or at least one mirror. Moreover, the surface of the prism or the mirror can be a planar surface, a spherical surface, an aspheric surface, or a freeform surface, but the present disclosure is not limited thereto. Moreover, the at least one light-folding element can be disposed at an object side of the first lens element. Specifically, please refer to FIG. 32 and FIG. 33. FIG. 32 shows a schematic view of a configuration of one light-folding element in an optical photographing lens according to one embodiment of the present disclosure, and FIG. 33 shows a schematic view of another configuration of one light-folding element in an optical photographing lens according to one embodiment of the present disclosure. In FIG. 32 and FIG. 33, the optical photographing lens can have, in order from an imaged object (not shown in the figures) to an image surface IMG along an optical path, a first optical axis OA1, a light-folding element LF and a second optical axis OA2. The light-folding element LF can be a prism disposed between the imaged object and a lens group LG of the optical photographing lens as shown in FIG. 32 or a mirror disposed between the imaged object and a lens group LG of the optical photographing lens as shown in FIG. 33. Further, please refer to FIG. 34, which shows a schematic view of further another configuration of one light-folding element in an optical photographing lens according to one embodiment of the present disclosure. In FIG. 34, the optical photographing lens can have, in order from an imaged object (not shown in the figures) to an image surface IMG along an optical path, a first optical axis OA1, a light-folding element LF and a second optical axis OA2. The light-folding element LF can be disposed between a lens group LG of the optical photographing lens and the image surface IMG as shown in FIG. 34. Furthermore, please refer to FIG. 35, which shows a schematic view of a configuration of two light-folding elements in an optical photographing lens according to one embodiment of the present disclosure. In FIG. 35, the optical photographing lens can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical photographing lens, the second light-folding element LF2 is disposed between the lens group LG of the optical photographing lens and the image surface IMG, and the travelling direction of light on the first optical axis OA1 can be the same direction as the travelling direction of light on the third optical axis OA3 as shown in FIG. 35. The light-folding element LF in FIG. 34, the first light-folding element LF1 and the second light-folding element LF2 in FIG. 35 are shown as prisms. However, the present disclosure is not limited thereto, and each of them can be alternatively replaced by a mirror. The optical photographing lens can be optionally provided with three or more light-folding elements, and the present disclosure is not limited to the type, amount and position of the light-folding elements of the embodiments disclosed in the aforementioned figures.

According to the present disclosure, the optical photographing lens can include at least one stop, such as an aperture stop, a glare stop or a field stop. Said glare stop or said field stop can be disposed between an imaged object and the first lens element, between adjacent lens elements, or between the last lens element and the image surface, and is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical photographing lens and the image surface to produce a telecentric effect, and thereby improves the image-sensing efficiency of an image sensor (for example, CCD or CMOS). A middle stop disposed between the first lens element and the image surface is favorable for enlarging the viewing angle of the optical photographing lens and thereby provides a wider field of view for the same.

According to the present disclosure, the optical photographing lens can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical photographing lens can include one or more optical elements for limiting the form of light passing through the optical photographing lens. Each optical element can be, but not limited to, a filter, a polarizer, etc., and each optical element can be, but not limited to, a single-piece element, a composite component, a thin film, etc. The optical element can be located at the object side or the image side of the optical photographing lens or between any two adjacent lens elements so as to allow light in a specific form to pass through, thereby meeting application requirements.

According to the present disclosure, the optical photographing lens can include at least one optical lens element, an optical element, or a carrier, which has at least one surface with a low reflection layer. The low reflection layer can effectively reduce stray light generated due to light reflection at the interface. The low reflection layer can be disposed in an optical non-effective area of an object-side surface or an image-side surface of the said optical lens element, or a connection surface between the object-side surface and the image-side surface. The said optical element can be a light-blocking element, an annular spacer, a barrel element, a cover glass, a blue glass, a filter, a color filter, an optical path folding element, a prism, a mirror, etc. The said carrier can be a base for supporting a lens assembly, a micro lens disposed on an image sensor, a substrate surrounding the image sensor, a glass plate for protecting the image sensor, etc.

According to the present disclosure, the optical photographing lens can further include a light-blocking element. The light-blocking element can have a non-circular opening, and the non-circular opening can have different effective radii in different directions which are perpendicular to the optical axis. Therefore, it is favorable for coordinating with the shape of non-circular lens elements or aperture stop so as to effectively save the space and make full use of the light passing through said non-circular lens elements or aperture stop, thereby reducing stray light. Moreover, the light-blocking element can be provided with a wavy structure or a jagged structure at a periphery of an inner hole portion thereof.

According to the present disclosure, the object side and image side are defined in accordance with the direction of the optical axis, and the axial optical data are calculated along the optical axis. Furthermore, if the optical axis is folded by a light-folding element, the axial optical data are also calculated along the folded optical axis.

According to the above description of the present disclosure, the following specific embodiments are provided for further explanation.

1st Embodiment

Figure 1:
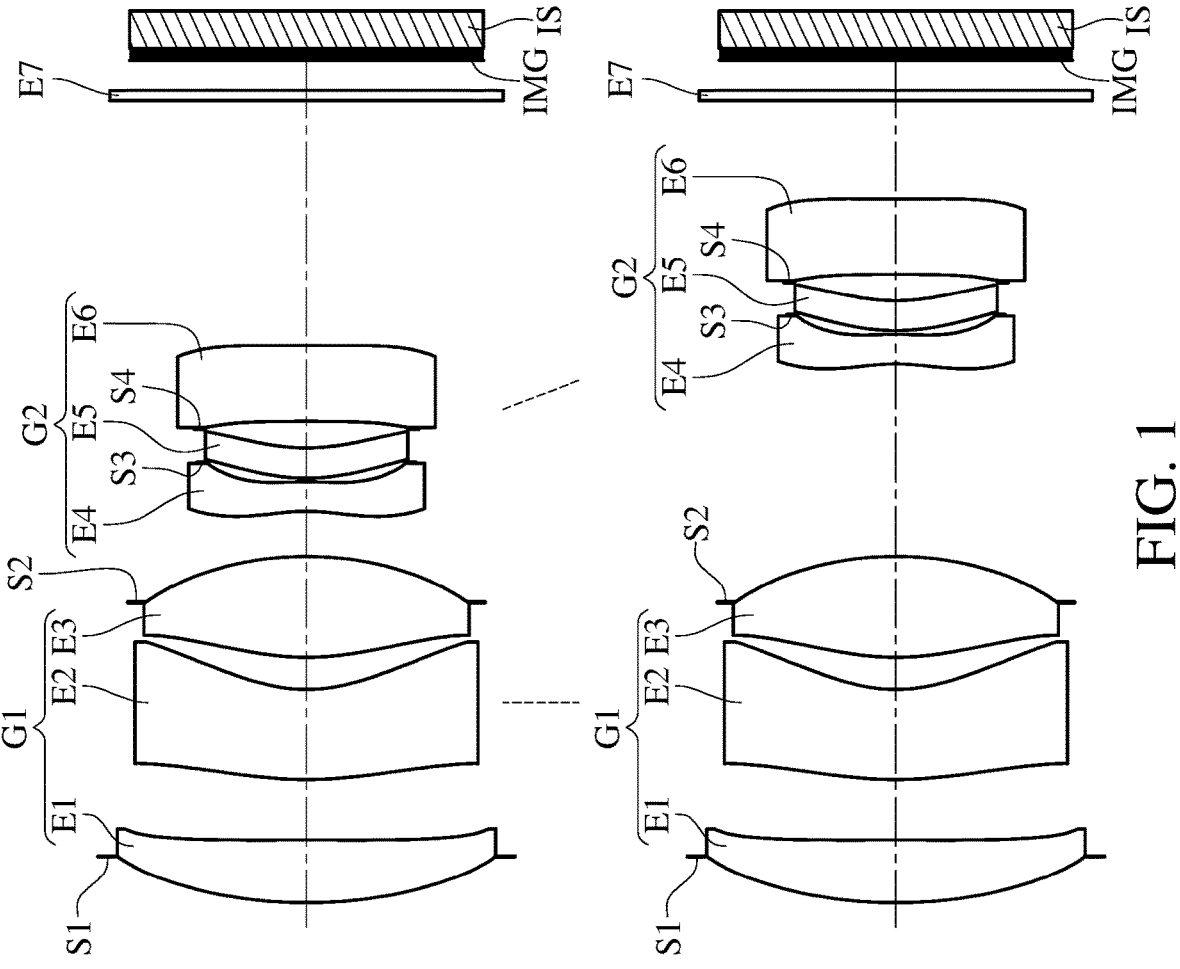
FIG. 1 is a schematic view of an image capturing unit respectively at the long focal length state and the short focal length state according to the 1st embodiment of the present disclosure.
Figure 2:
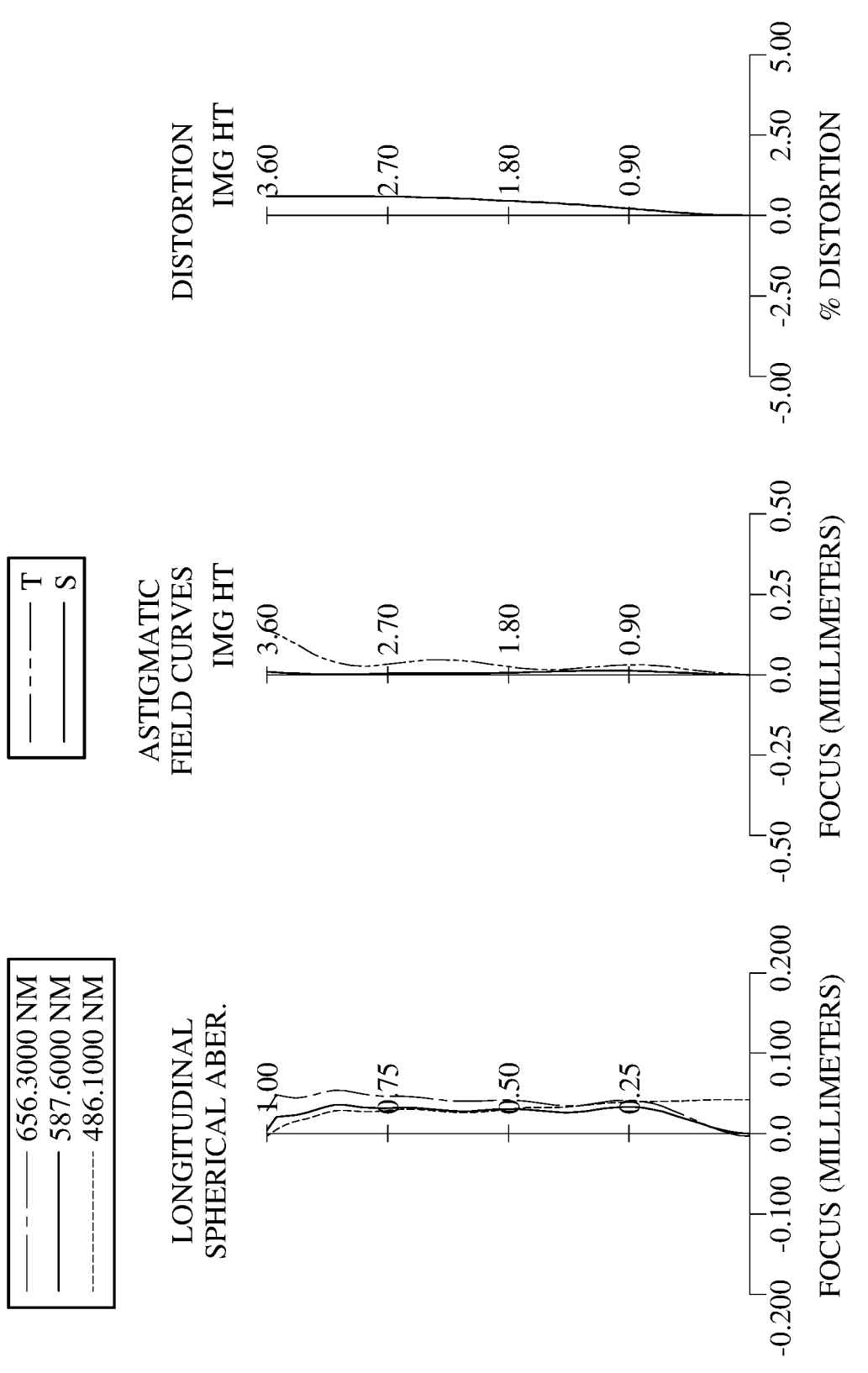
FIG. 2 shows spherical aberration curves, astigmatic field curves and a distortion curve of the image capturing unit at the long focal length state according to the 1st embodiment.
Figure 3:
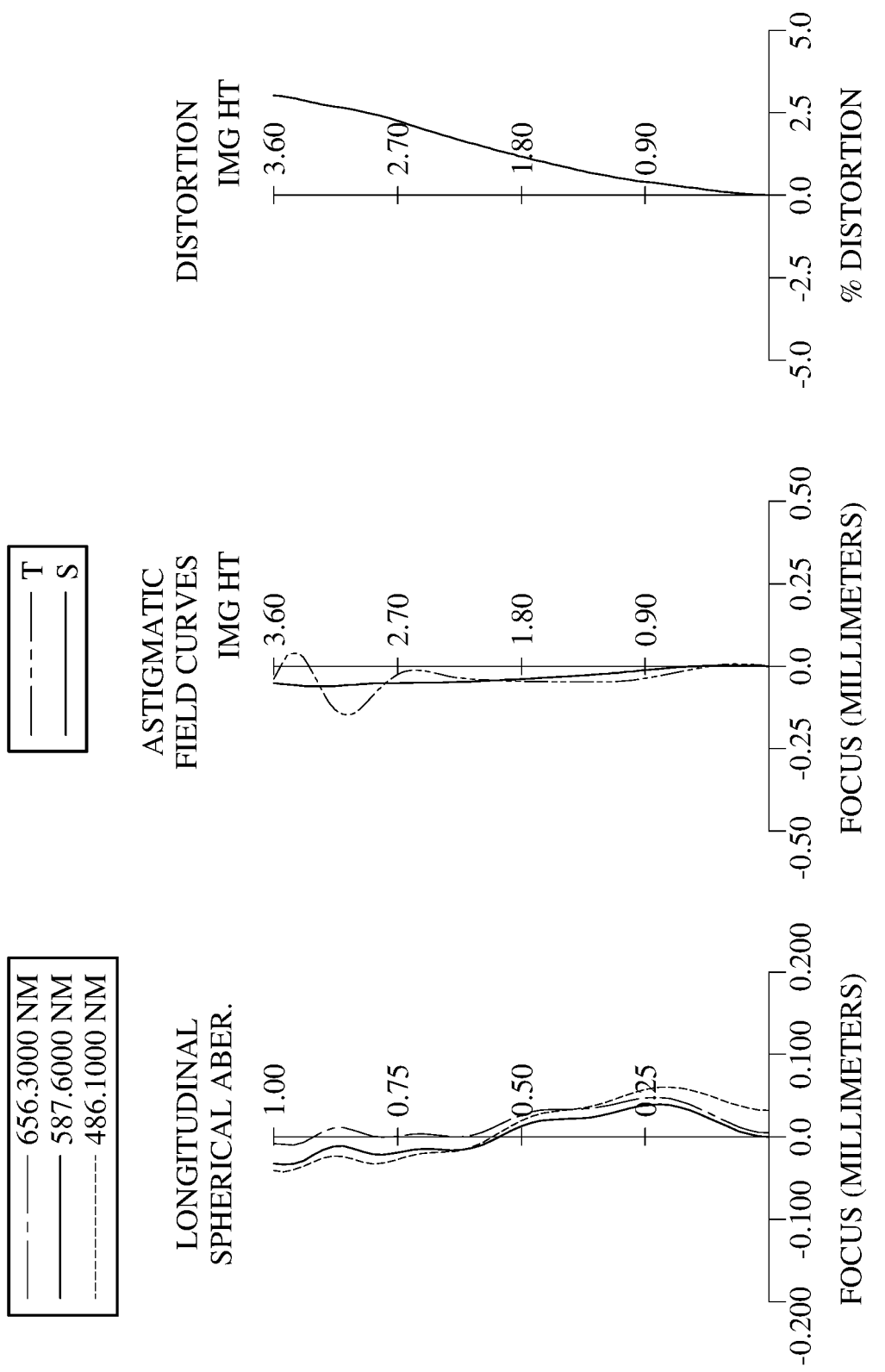
FIG. 3 shows spherical aberration curves, astigmatic field curves and a distortion curve of the image capturing unit at the short focal length state according to the 1st embodiment.

FIG. 1 is a schematic view of an image capturing unit respectively at the long focal length state and the short focal length state according to the 1st embodiment of the present disclosure. FIG. 2 shows, in order from left to right, spherical aberration curves, astigmatic field curves and a distortion curve of the image capturing unit at the long focal length state according to the 1st embodiment. FIG. 3 shows, in order from left to right, spherical aberration curves, astigmatic field curves and a distortion curve of the image capturing unit at the short focal length state according to the 1st embodiment. The upper part of FIG. 1 shows the optical photographing lens at the long focal length state, and the lower part of FIG. 1 shows the optical photographing lens at the short focal length state. In FIG. 1, the image capturing unit 1 includes the optical photographing lens (its reference numeral is omitted) of the present disclosure and an image sensor IS. The optical photographing lens includes, in order from an object side to an image side along an optical path, a light-folding element, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 1, the second lens group G2 moves along an optical axis relative to the first lens group G1 during the focal length adjusting process. Furthermore, through the focal length adjusting process, the optical photographing lens has a long focal length state as shown in the upper part of FIG. 1 and a short focal length state as shown in the lower part of FIG. 1. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

The light-folding element is a prism made of glass material and having an optical path folding function. The related illustration of the light-folding element can refer to the abovementioned description referring to FIG. 32 to FIG. 35, and will not be repeated herein. Also, for simplicity, the light-folding element and the deflection effect of the optical path in FIG. 1 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric. The object-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with negative refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has at least one inflection point always located within an optically effective area thereof during the focal length adjusting process. The image-side surface of the sixth lens element E6 has the optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i)$$

where,

X is the displacement in parallel with the optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18, 20, 22, 24, 26, and 28.

In the optical photographing lens of the image capturing unit 1 according to the 1st embodiment, a focal length of the optical photographing lens is f, an f-number of the optical photographing lens is Fno, and half of a maximum field of view of the optical photographing lens is HFOV.

The abovementioned parameters may have different values when the optical photographing lens is at different states through the focal length adjusting process. Specifically, when a focal length of the optical photographing lens at the long focal length state is fL, a focal length of the optical photographing lens at the short focal length state is fS, an f-number of the optical photographing lens at the long focal length state is FnoL, an f-number of the optical photographing lens at the short focal length state is FnoS, half of a maximum field of view of the optical photographing lens at the long focal length state is HFOVL, and half of a maximum field of view of the optical photographing lens at the short focal length state is HFOVS, the following conditions are satisfied: fL=14.89 [mm]; fS=9.88 [mm]; FnoL=1.95; FnoS=1.97; HFOVL=13.5 [deg.]; and HFOVS=12.6 [deg.].

In this embodiment, DO is an axial distance between an imaged object and the light-folding element and can also be considered as the object distance, D1 is an axial distance between the stop S2 and the object-side surface of the fourth lens element E4, and D2 is an axial distance between the image-side surface of the sixth lens element E6 and the filter E7. When the optical photographing lens is at the long focal length state and the short focal length state through the focal length adjusting process, the values of DO to D2 may be different. When the optical photographing lens is at the long focal length state, the following conditions are satisfied: D0=∞(infinity); D1=1.866 [mm]; and D2=5.000 [mm]. When the optical photographing lens is at the short focal length state, the following conditions are satisfied: D0=42.050 [mm]; D1=4.866 [mm]; and D2=2.000 [mm].

When a composite focal length of the first lens element E1, the second lens element E2 and the third lens element E3 is fG1, and a composite focal length of the fourth lens element E4, the fifth lens element E5 and the sixth lens element E6 is fG2, the following conditions are satisfied: fG1=8.68 [mm]; and fG2=−10.16 [mm]. In this embodiment, fG1 can also be considered as a focal length of the first lens group G1, and fG2 can also be considered as a focal length of the second lens group G2.

When an Abbe number of the first lens element E1 is V1, an Abbe number of the second lens element E2 is V2, and an Abbe number of the third lens element E3 is V3, the following condition is satisfied: (V1+V3)/V2=5.22.

When a central thickness of the first lens element E1 is CT1, a central thickness of the second lens element E2 is CT2, a central thickness of the third lens element E3 is CT3, an axial distance between the first lens element E1 and the second lens element E2 is T12, and an axial distance between the second lens element E2 and the third lens element E3 is T23, the following condition is satisfied: (CT1+CT2+CT3)/(T12+T23)=2.75. In this embodiment, an axial distance between two adjacent lens elements is a distance in a paraxial region between two adjacent lens surfaces of the two adjacent lens elements.

When a central thickness of the fourth lens element E4 is CT4, a central thickness of the fifth lens element E5 is CT5, a central thickness of the sixth lens element E6 is CT6, an axial distance between the fourth lens element E4 and the fifth lens element E5 is T45, and an axial distance between the fifth lens element E5 and the sixth lens element E6 is T56, the following condition is satisfied:

$$(CT4 + CT5 + CT6)/(T45 + T56) = 4.51.$$

When an axial distance between the object-side surface of the first lens element E1 and the image surface IMG when the optical photographing lens is at the long focal length state is TLL, and an axial distance between the object-side surface of the first lens element E1 and the image surface IMG when the optical photographing lens is at the short focal length state is TLS, the following condition is satisfied: |1−TLL/TLS|=0.00 E+00.

When an axial distance between the object-side surface of the first lens element E1 and the image-side surface of the third lens element E3 is TG1, and an axial distance between the object-side surface of the fourth lens element E4 and the image-side surface of the sixth lens element E6 is TG2, the following condition is satisfied: TG1/TG2=2.10. In this embodiment, TG1 can also be considered as an axial thickness of the first lens group G1, and TG2 can also be considered as an axial thickness of the second lens group G2.

When a curvature radius of the object-side surface of the third lens element E3 is R5, a curvature radius of the image-side surface of the third lens element E3 is R6, and the central thickness of the third lens element E3 is CT3, the following condition is satisfied: (R5−R6)/CT3=6.14.

When the curvature radius of the object-side surface of the third lens element E3 is R5, the curvature radius of the image-side surface of the third lens element E3 is R6, and the central thickness of the third lens element E3 is CT3, the following condition is satisfied: |R5+R6|/CT3=0.46.

When a curvature radius of the object-side surface of the first lens element E1 is R1, and a focal length of the first lens element E1 is f1, the following condition is satisfied: R1/f1=0.62.

When a curvature radius of the object-side surface of the second lens element E2 is R3, and the central thickness of the second lens element E2 is CT2, the following condition is satisfied: R3/CT2=4.78.

When a curvature radius of the image-side surface of the second lens element E2 is R4, and the central thickness of the second lens element E2 is CT2, the following condition is satisfied: R4/CT2=1.79.

When the curvature radius of the object-side surface of the third lens element E3 is R5, and the central thickness of the third lens element E3 is CT3, the following condition is satisfied: R5/CT3=2.84.

When the curvature radius of the image-side surface of the third lens element E3 is R6, and a curvature radius of the object-side surface of the fourth lens element E4 is R7, the following condition is satisfied: R6/R7=1.81.

When the focal length of the first lens element E1 is f1, and a focal length of the second lens element E2 is f2, the following condition is satisfied: f1/f2=−1.74.

When the focal length of the second lens element E2 is f2, and the central thickness of the second lens element E2 is CT2, the following condition is satisfied: f2/CT2=−5.11.

When a focal length of the third lens element E3 is f3, and the central thickness of the third lens element E3 is CT3, the following condition is satisfied: f3/CT3=2.76.

When the composite focal length of the fourth lens element E4, the fifth lens element E5 and the sixth lens element E6 is fG2, an axial distance between the image-side surface of the third lens element E3 and the object-side surface of the fourth lens element E4 when the optical photographing lens is at the long focal length state is TG12L, and an axial distance between the image-side surface of the third lens element E3 and the object-side surface of the fourth lens element E4 when the optical photographing lens is at the short focal length state is TG12S, the following condition is satisfied: fG2/(TG12L−TG12S)=3.39. In this embodiment, TG12L can also be considered as an axial distance between the first lens group G1 and the second lens group G2 when the optical photographing lens is at the long focal length state, and TG12S can also be considered as an axial distance between the first lens group G1 and the second lens group G2 when the optical photographing lens is at the short focal length state.

When the composite focal length of the first lens element E1, the second lens element E2 and the third lens element E3 is fG1, and the composite focal length of the fourth lens element E4, the fifth lens element E5 and the sixth lens element E6 is fG2, the following condition is satisfied: fG2/fG1=−1.17.

When the focal length of the optical photographing lens at the long focal length state is fL, and the focal length of the optical photographing lens at the short focal length state is fS, the following condition is satisfied: fL/fS=1.51.

When a maximum distance between the optically effective area of the object-side surface of the first lens element E1 and the optical axis during the focal length adjusting process is Y11M, and a maximum image height of the optical photographing lens during the focal length adjusting process is ImgHM, the following condition is satisfied: Y11M/ImgHM=1.07.

When the maximum distance between the optically effective area of the object-side surface of the first lens element E1 and the optical axis during the focal length adjusting process is Y11M, and a maximum distance between the optically effective area of the image-side surface of the sixth lens element E6 and the optical axis during the focal length adjusting process is Y62M, the following condition is satisfied: Y11M/Y62M=1.47.

The detailed optical data of the 1st embodiment are shown in Table 1A and Table 1B, and the aspheric surface data are shown in Table 1C below.

TABLE 1A

| | | | | | | |
|---|---|---|---|---|---|---|
| 1st Embodiment | | | | | | |
| Surface # | | Curvature Radius | Thickness | Material | Index | Abbe # | Focal Length |

| Surface # | | Curvature Radius | | Thickness | Material | Index | Abbe # | Focal Length |
|---|---|---|---|---|---|---|---|---|
| 0 | Object | Plano | | D0 | | | | |
| 1 | Light-folding element | Plano | | 6.850 | Glass | 1.847 | 23.8 | — |
| 2 | | Plano | | 2.096 | | | | |
| 3 | Stop | Plano | | −0.951 | | | | |
| 4 | Lens 1 | 10.0795 | (ASP) | 1.290 | Plastic | 1.545 | 56.1 | 16.27 |
| 5 | | −70.2636 | (ASP) | 1.228 | | | | |
| 6 | Lens 2 | 8.7631 | (ASP) | 1.833 | Plastic | 1.642 | 22.5 | −9.37 |
| 7 | | 3.2733 | (ASP) | 0.657 | | | | |
| 8 | Lens 3 | 5.8610 | (ASP) | 2.062 | Glass | 1.589 | 61.2 | 5.69 |
| 9 | | −6.8080 | (ASP) | −0.947 | | | | |
| 10 | Stop | Plano | | D1 | | | | |
| 11 | Lens 4 | −3.7662 | (ASP) | 0.600 | Plastic | 1.544 | 56.0 | −13.61 |
| 12 | | −8.0981 | (ASP) | 0.398 | | | | |
| 13 | Stop | Plano | | −0.323 | | | | |
| 14 | Lens 5 | 4.2507 | (ASP) | 0.618 | Plastic | 1.713 | 12.4 | −719.01 |
| 15 | | 3.9606 | (ASP) | 0.380 | | | | |
| 16 | Stop | Plano | | 0.157 | | | | |
| 17 | Lens 6 | −96.2661 | (ASP) | 1.540 | Plastic | 1.534 | 56.0 | −59.89 |
| 18 | | 48.1927 | (ASP) | D2 | | | | |
| 19 | Filter | Plano | | 0.210 | Glass | 1.517 | 64.2 | — |
| 20 | | Plano | | 0.606 | | | | |
| 21 | Image | Plano | | — | | | | |

Note:
Reference wavelength is 587.6 nm (d-line).
An effective radius of the stop S1 (Surface 3) is 3.850 mm.
An effective radius of the stop S2 (Surface 10) is 3.300 mm.
An effective radius of the stop S3 (Surface 13) is 2.014 mm.
An effective radius of the stop S4 (Surface 16) is 2.072 mm.

In Table 1A, the curvature radius, the thickness and the focal length are shown in millimeters (mm). Surface numbers 0-21 represent the surfaces sequentially arranged from the object side to the image side along the optical axis.

TABLE 1B

| | Long focal length state | Intermediate focal length state | Short focal length state |
|---|---|---|---|
| | Optical data at different states | | |
| f [mm] | 14.89 | 14.00 | 9.88 |
| Fno | 1.95 | 1.97 | 1.97 |
| HFOV [deg.] | 13.5 | 13.3 | 12.6 |
| D0 [mm] | ∞ | 300.000 | 42.050 |
| D1 [mm] | 1.866 | 2.243 | 4.866 |
| D2 [mm] | 5.000 | 4.623 | 2.000 |

Table 1B shows optical data of three states of the optical photographing lens among various focusing states. Specifically, the focal length of the optical photographing lens adjusted to an intermediate focal length state between the long focal length state and the short focal length state of the optical photographing lens through the focal length adjusting process and several corresponding optical data are also disclosed in this embodiment. It should be understood that only three states (i.e., the long focal length state, the short focal length state and the intermediate focal length state between them) are disclosed in this embodiment, but the present disclosure is not limited to the disclosed states. Moreover, besides the long focal length state, the short focal length state and said intermediate focal length state, the optical photographing lens of this embodiment can further have other states with other focal lengths ranging from the long focal length state and the short focal length state. Further, the object distance (DO) in Table 1B is only exemplary, and the present disclosure is not limited thereto. The optical photographing lens of the present disclosure has various focusing states corresponding to various object distances. For example, the object distance corresponding to the short focal length state may be infinite.

It can be known from Table 1B that the optical photographing lens performs the focal length adjusting process according to the object distance, and the second lens group G2 moves along the optical axis relative to the first lens group G1 during the focal length adjusting process. In specific, when the object distance DO is changed to 300.000 millimeters from infinity, the optical photographing lens is changed to the intermediate focal length state from the long focal length state, the axial distance D1 between the stop S2 and the object-side surface of the fourth lens element E4 is increased to 2.243 millimeters from 1.866 millimeters, and the axial distance D2 between the image-side surface of the sixth lens element E6 and the filter E7 is reduced to 4.623 millimeters from 5.000 millimeters. When the object distance DO is changed to 42.050 millimeters from 300.000, the optical photographing lens is changed to the short focal length state from the intermediate focal length state, the axial distance D1 between the stop S2 and the object-side surface of the fourth lens element E4 is increased to 4.866 millimeters from 2.243 millimeters, and the axial distance D2 between the image-side surface of the sixth lens element E6 and the filter E7 is reduced to 2.000 millimeters from 4.623 millimeters. That is, when the focal length of the optical photographing lens is gradually reduced during the focal length adjusting process, the second lens group G2 moves towards the image side along the optical axis relative to the first lens group G1. That is, when the object distance is gradually reduced during the focal length adjusting process, the second lens group G2 moves towards the image side along the optical axis relative to the first lens group G1.

TABLE 1C

| | | | | |
|---|---|---|---|---|
| | Aspheric Coefficients | | | |
| Surface # | 4 | 5 | 6 | 7 |
| k= | 0.00000E+00 | 0.00000E+00 | 0.00000E+00 | −9.15683E−01 |
| A4= | 3.14461799E−03 | 7.74003156E−03 | 2.94018545E−03 | −3.40451026E−04 |
| A6= | −1.61153909E−03 | −4.63834493E−03 | −6.01050643E−03 | −1.18870186E−02 |
| A8= | 6.12216645E−04 | 2.08213069E−03 | 3.50911805E−03 | 9.09601897E−03 |
| A10= | −1.52481807E−04 | −6.38020658E−04 | −1.42195095E−03 | −4.42673778E−03 |
| A12= | 2.51574247E−05 | 1.36230797E−04 | 4.22985888E−04 | 1.49761970E−03 |
| A14= | −2.74407587E−06 | −2.06043417E−05 | −9.41288658E−05 | −3.62695440E−04 |
| A16= | 1.89451442E−07 | 2.21876788E−06 | 1.57182051E−05 | 6.38885000E−05 |
| A18= | −6.94738107E−09 | −1.68620098E−07 | −1.95272430E−06 | −8.23592644E−06 |
| A20= | 8.95173864E−13 | 8.81399578E−09 | 1.77033483E−07 | 7.72742289E−07 |
| A22= | 1.16718438E−11 | −3.00574102E−10 | −1.13299781E−08 | −5.16136758E−08 |
| A24= | −4.61399070E−13 | 5.99655481E−12 | 4.83332569E−10 | 2.33467804E−09 |
| A26= | 6.13804073E−15 | −5.27913949E−14 | −1.23017687E−11 | −6.42705596E−11 |
| A28= | — | — | 1.41046620E−13 | 8.13954199E−13 |

| | | | | |
|---|---|---|---|---|
| Surface # | 8 | 9 | 11 | 12 |
| k= | 0.00000E+00 | 0.00000E+00 | 0.00000E+00 | 0.00000E+00 |
| A4= | −4.21639269E−06 | 1.93900286E−03 | 8.12571762E−02 | 1.20274651E−01 |
| A6= | −6.24739444E−03 | −3.84430588E−03 | −4.89969104E−02 | −1.18010857E−01 |
| A8= | 4.16361516E−03 | 3.34223220E−03 | 3.81356424E−02 | 7.51431318E−02 |
| A10= | −1.78276319E−03 | −1.88570401E−03 | −2.18497513E−02 | 5.09946764E−02 |
| A12= | 5.13486519E−04 | 7.17273242E−04 | 6.21194899E−03 | −1.51596494E−01 |
| A14= | −1.01116142E−04 | −1.89730602E−04 | 9.58477630E−04 | 1.49128266E−01 |
| A16= | 1.37516402E−05 | 3.56058607E−05 | −1.67611455E−03 | −8.70111739E−02 |
| A18= | −1.30933985E−06 | −4.78091998E−06 | 7.52481473E−04 | 3.36131172E−02 |
| A20= | 9.05751717E−08 | 4.57166014E−07 | −1.94157475E−04 | −8.86903620E−03 |
| A22= | −4.95176767E−09 | −3.04609402E−08 | 3.16992506E−05 | 1.58930389E−03 |
| A24= | 2.29793409E−10 | 1.34657383E−09 | −3.24553340E−06 | −1.85709734E−04 |
| A26= | −8.00540989E−12 | −3.55576192E−11 | 1.91020067E−07 | 1.28009906E−05 |
| A28= | 1.39402579E−13 | 4.25149787E−13 | −4.94541566E−09 | −3.95762581E−07 |

TABLE 1C-continued

| Surface # | Aspheric Coefficients | | | |
| --- | --- | --- | --- | --- |
| | 14 | 15 | 17 | 18 |
| k= | 0.00000E+00 | 0.00000E+00 | 0.00000E+00 | 0.00000E+00 |
| A4= | 1.45786188E-02 | -3.02737542E-02 | -1.08113844E-02 | -5.16651126E-03 |
| A6= | -4.31295868E-02 | 3.71101589E-02 | 3.31032620E-02 | -1.10089221E-03 |
| A8= | -9.54271809E-03 | -1.02376074E-01 | -1.00827962E-01 | 1.80299018E-03 |
| A10= | 1.35141126E-01 | 2.02610244E-01 | 1.85022152E-01 | -1.76659107E-03 |
| A12= | -2.17214516E-01 | -2.52706745E-01 | -2.19273732E-01 | 9.87525791E-04 |
| A14= | 1.88977107E-01 | 2.07190815E-01 | 1.75551863E-01 | -3.13281397E-04 |
| A16= | -1.05795749E-01 | -1.16190478E-01 | -9.76995244E-02 | 4.52057366E-05 |
| A18= | 4.03587260E-02 | 4.54726943E-02 | 3.82747162E-02 | 3.95997348E-06 |
| A20= | -1.06579184E-02 | -1.24362294E-02 | -1.05232346E-02 | -3.09814238E-06 |
| A22= | 1.92517503E-03 | 2.33252867E-03 | 1.98781329E-03 | 6.28597203E-07 |
| A24= | -2.27652740E-04 | -2.86113984E-04 | -2.45677428E-04 | -6.70480053E-08 |
| A26= | 1.59121734E-05 | 2.06812949E-05 | 1.78874423E-05 | 3.81122839E-09 |
| A28= | -4.99199037E-07 | -6.68104758E-07 | -5.81657441E-07 | -9.13087837E-11 |

In Table 1C, k represents the conic coefficient of the equation of the aspheric surface profiles. A4-A28 represent the aspheric coefficients ranging from the 4th order to the 28th order.

The tables presented below for each embodiment are the corresponding schematic parameter and aberration curves, and the definitions of the tables are the same as Table 1A to Table 1C of the 1st embodiment. Therefore, an explanation in this regard will not be provided again.

2nd Embodiment

Figure 4:
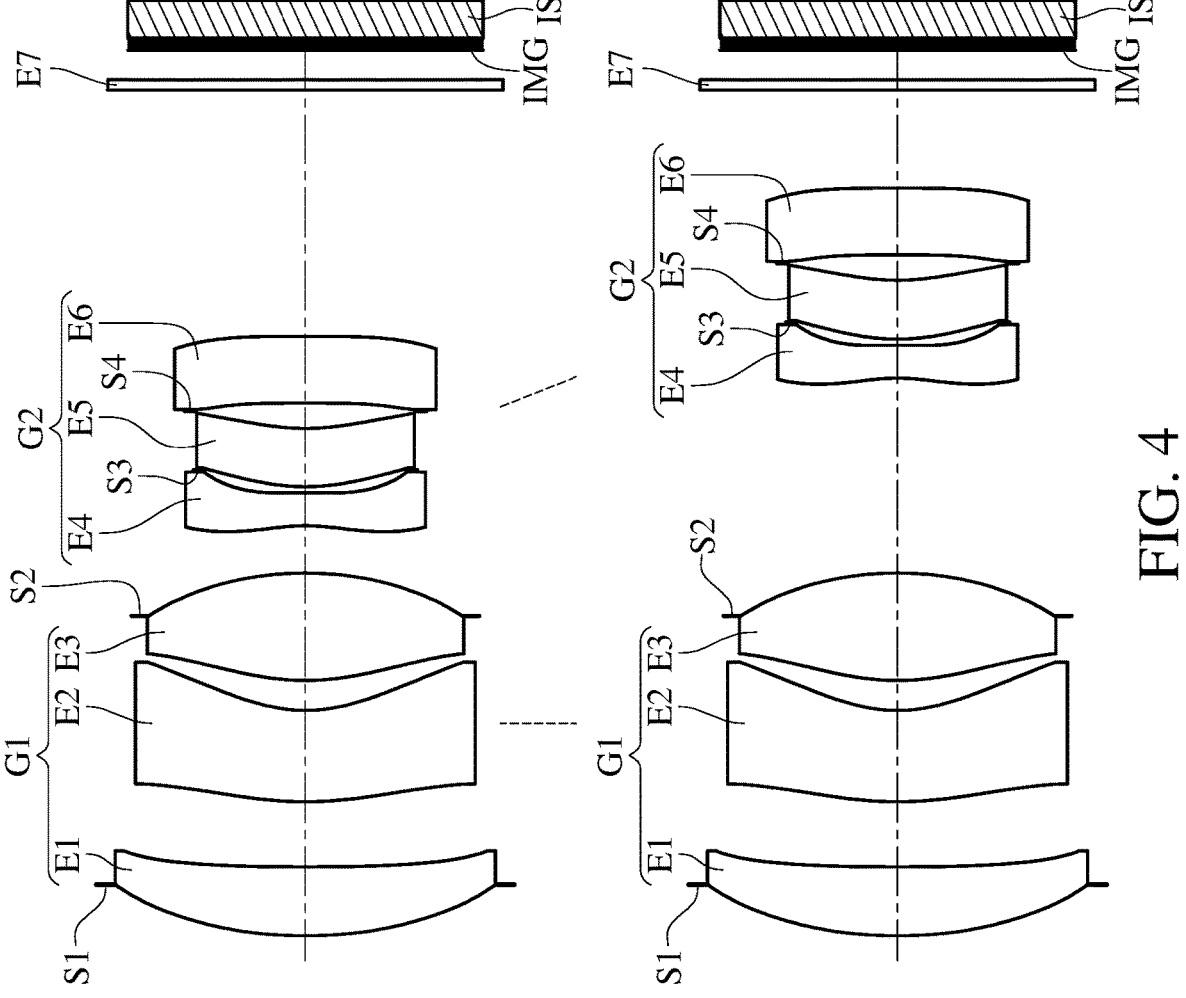
FIG. 4 is a schematic view of an image capturing unit respectively at the long focal length state and the short focal length state according to the 2nd embodiment of the present disclosure.
Figure 5:
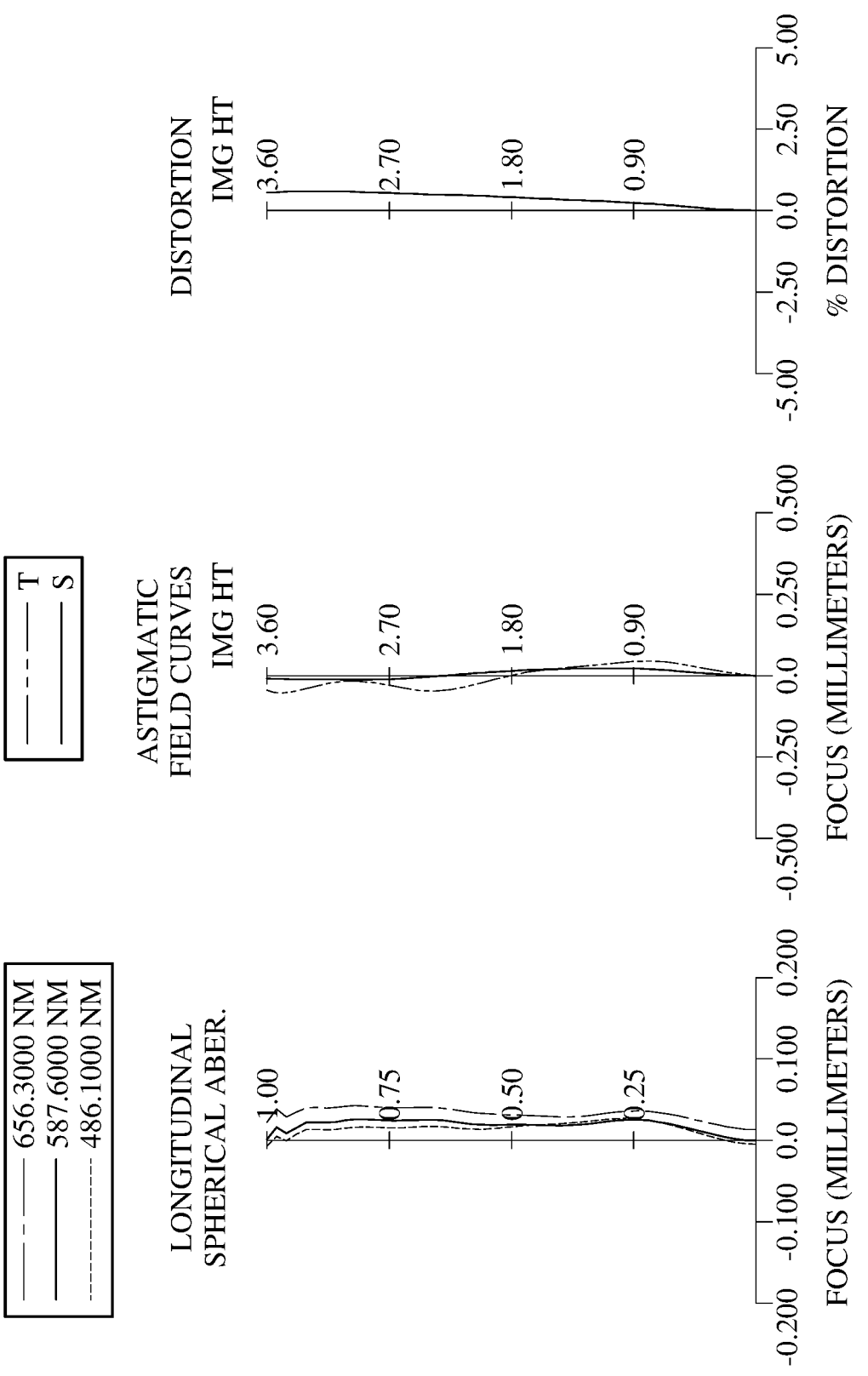
FIG. 5 shows spherical aberration curves, astigmatic field curves and a distortion curve of the image capturing unit at the long focal length state according to the 2nd embodiment.
Figure 6:
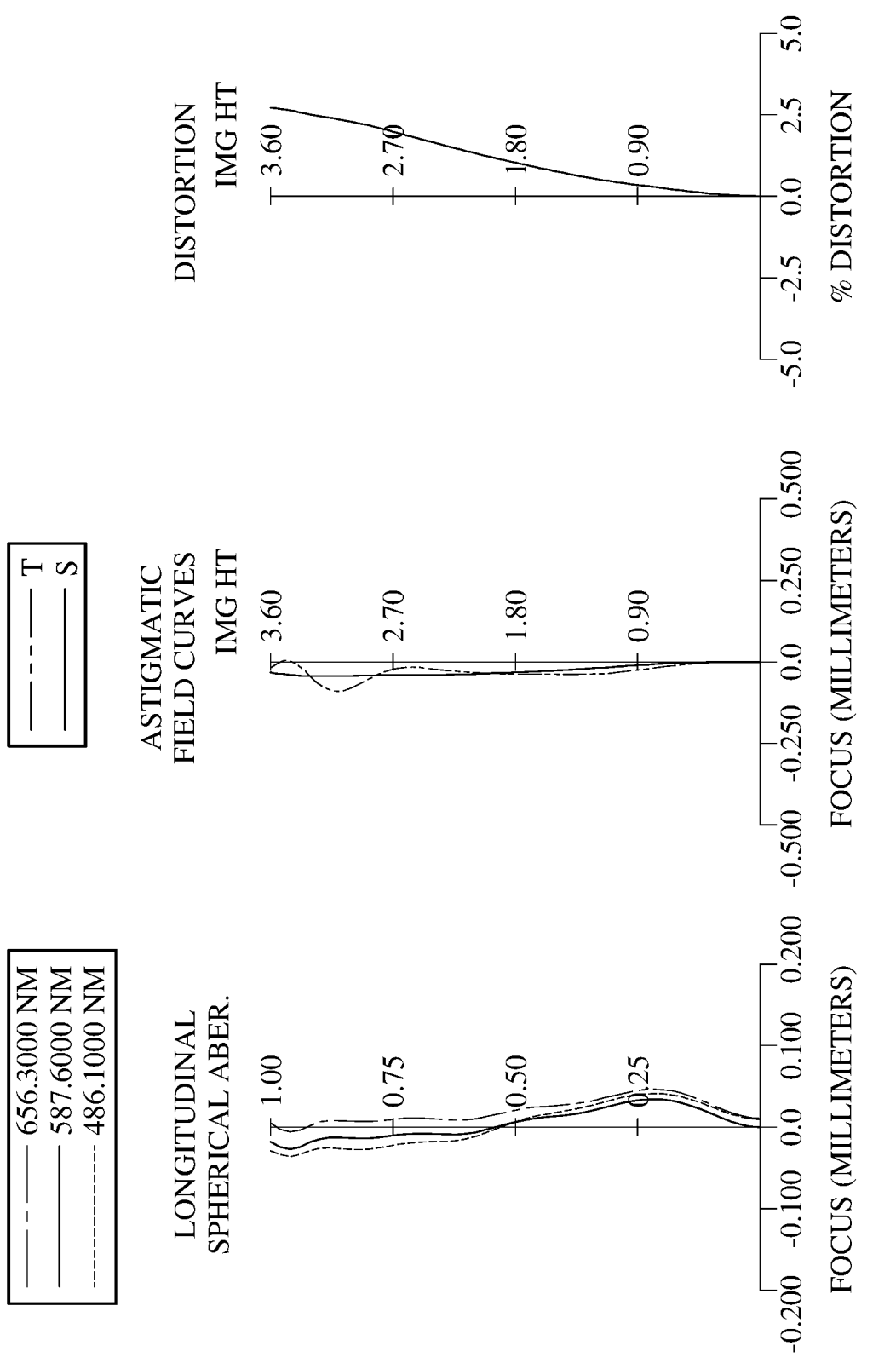
FIG. 6 shows spherical aberration curves, astigmatic field curves and a distortion curve of the image capturing unit at the short focal length state according to the 2nd embodiment.

FIG. 4 is a schematic view of an image capturing unit respectively at the long focal length state and the short focal length state according to the 2nd embodiment of the present disclosure. FIG. 5 shows, in order from left to right, spherical aberration curves, astigmatic field curves and a distortion curve of the image capturing unit at the long focal length state according to the 2nd embodiment. FIG. 6 shows, in order from left to right, spherical aberration curves, astigmatic field curves and a distortion curve of the image capturing unit at the short focal length state according to the 2nd embodiment. The upper part of FIG. 4 shows the optical photographing lens at the long focal length state, and the lower part of FIG. 4 shows the optical photographing lens at the short focal length state. In FIG. 4, the image capturing unit 2 includes the optical photographing lens (its reference numeral is omitted) of the present disclosure and an image sensor IS. The optical photographing lens includes, in order from an object side to an image side along an optical path, a light-folding element, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 4, the second lens group G2 moves along an optical axis relative to the first lens group G1 during the focal length adjusting process. Furthermore, through the focal length adjusting process, the optical photographing lens has a long focal length state as shown in the upper part of FIG. 4 and a short focal length state as shown in the lower part of FIG. 4. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

The light-folding element is a prism made of glass material and having an optical path folding function. The related illustration of the light-folding element can refer to the abovementioned description referring to FIG. 32 to FIG. 35, and will not be repeated herein. Also, for simplicity, the light-folding element and the deflection effect of the optical path in FIG. 4 are omitted.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. Each of the object-side surface and the image-side surface of the first lens element E1 has an optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The image-side surface of the fifth lens element E5 has at least one inflection point always located within an optically effective area thereof during the focal length adjusting process.

The sixth lens element E6 with positive refractive power has an object-side surface being convex in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has an optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 2nd embodiment are shown in Table 2A and Table 2B, and the aspheric surface data are shown in Table 2C below.

TABLE 2A

| 2nd Embodiment | | | | | | | |
|---|---|---|---|---|---|---|---|
| Surface # | | Curvature Radius | Thickness | Material | Index | Abbe # | Focal Length |
| 0 | Object | Plano | D0 | | | | |
| 1 | Light-folding element | Plano | 6.850 | Glass | 1.847 | 23.8 | — |
| 2 | | Plano | 2.185 | | | | |
| 3 | Stop | Plano | −1.040 | | | | |
| 4 | Lens 1 | 9.3002 (ASP) | 1.400 | Plastic | 1.545 | 56.1 | 17.85 |
| 5 | | 200.8032 (ASP) | 1.317 | | | | |
| 6 | Lens 2 | 8.1297 (ASP) | 1.858 | Plastic | 1.650 | 21.8 | −9.48 |
| 7 | | 3.1884 (ASP) | 0.611 | | | | |
| 8 | Lens 3 | 5.1896 (ASP) | 2.174 | Plastic | 1.544 | 56.0 | 5.74 |
| 9 | | −6.6794 (ASP) | −0.870 | | | | |
| 10 | Stop | Plano | D1 | | | | |
| 11 | Lens 4 | −3.8420 (ASP) | 0.669 | Plastic | 1.544 | 56.0 | −8.70 |
| 12 | | −21.6754 (ASP) | 0.456 | | | | |
| 13 | Stop | Plano | −0.334 | | | | |
| 14 | Lens 5 | 4.2242 (ASP) | 1.193 | Plastic | 1.686 | 18.4 | 39.74 |
| 15 | | 4.4243 (ASP) | 0.352 | | | | |
| 16 | Stop | Plano | 0.159 | | | | |
| 17 | Lens 6 | 205.7613 (ASP) | 1.351 | Plastic | 1.544 | 56.0 | 184.40 |
| 18 | | −195.3125 (ASP) | D2 | | | | |
| 19 | Filter | Plano | 0.210 | Glass | 1.517 | 64.2 | — |

TABLE 2A-continued

| | | 2nd Embodiment | | | | |
| Surface # | | Curvature Radius | Thickness | Material Index | Abbe # | Focal Length |
|---|---|---|---|---|---|---|
| 20 | | Plano | 0.593 | | | |
| 21 | Image | Plano | — | | | |

Note:
Reference wavelength is 587.6 nm (d-line).
An effective radius of the stop S1 (Surface 3) is 3.850 mm.
An effective radius of the stop S2 (Surface 10) is 3.196 mm.
An effective radius of the stop S3 (Surface 13) is 2.056 mm.
An effective radius of the stop S4 (Surface 16) is 2.223 mm.

TABLE 2B

| | Optical data at different states | |
|---|---|---|
| | Long focal length state | Short focal length state |
| f [mm] | 15.63 | 10.53 |
| Fno | 2.03 | 2.06 |
| HFOV [deg.] | 12.9 | 12.1 |
| D0 [mm] | ∞ | 47.264 |
| D1 [mm] | 1.826 | 4.826 |
| D2 [mm] | 5.000 | 2.000 |

The definitions of these parameters shown in Table 2B are the same as those stated in the 1st embodiment. In this embodiment, DO is an axial distance between an imaged object and the light-folding element, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 2B.

TABLE 2C

| | Aspheric Coefficients | | | |
|---|---|---|---|---|
| Surface # | 4 | 5 | 6 | 7 |
| k= | 0.00000E+00 | 0.00000E+00 | 0.00000E+00 | −9.23377E−01 |
| A4= | 3.06785499E−03 | 7.67584091E−03 | 3.28145170E−03 | 1.66299557E−03 |
| A6= | −1.23594612E−03 | −4.04007096E−03 | −5.69580221E−03 | −1.33625667E−02 |
| A8= | 3.87322032E−04 | 1.54354398E−03 | 2.80300140E−03 | 8.70731707E−03 |
| A10= | −8.20466494E−05 | −4.12319036E−04 | −9.87026105E−04 | −3.61067608E−03 |
| A12= | 1.17949986E−05 | 7.88855971E−05 | 2.70048405E−04 | 1.04809609E−03 |
| A14= | −1.14093214E−06 | −1.09375298E−05 | −5.85044926E−05 | −2.17553111E−04 |
| A16= | 7.20110592E−08 | 1.10339626E−06 | 9.93663317E−06 | 3.24689153E−05 |
| A18= | −2.67999483E−09 | −8.03581814E−08 | −1.28981170E−06 | −3.47746831E−06 |
| A20= | 3.64908426E−11 | 4.12445354E−09 | 1.23733161E−07 | 2.64518748E−07 |
| A22= | 1.22840950E−12 | −1.41747492E−10 | −8.40793917E−09 | −1.39529417E−08 |
| A24= | −5.91134066E−14 | 2.92924250E−12 | 3.80260778E−10 | 4.85622525E−10 |
| A26= | 7.46052755E−16 | −2.74942152E−14 | −1.02233643E−11 | −1.00097705E−11 |
| A28= | — | — | 1.23290364E−13 | 9.14899759E−14 |
| Surface # | 8 | 9 | 11 | 12 |
| k= | 0.00000E+00 | 0.00000E+00 | 0.00000E+00 | 0.00000E+00 |
| A4= | 7.35989082E−04 | 1.82621712E−03 | 6.33021659E−02 | 3.83656613E−02 |
| A6= | −7.11409417E−03 | −3.27494641E−03 | −1.91277854E−02 | 4.93947168E−02 |
| A8= | 3.78978140E−03 | 2.71134283E−03 | 5.64911815E−04 | −1.31280634E−01 |
| A10= | −1.20686891E−03 | −1.51068454E−03 | 8.24883064E−03 | 1.88638152E−01 |
| A12= | 2.20582159E−04 | 5.86648489E−04 | −9.14086673E−03 | −1.81592620E−01 |
| A14= | −1.14328750E−05 | −1.62411840E−04 | 5.73865340E−03 | 1.21970570E−01 |
| A16= | −4.90749957E−06 | 3.25126352E−05 | −2.38112180E−03 | −5.83518750E−02 |
| A18= | 1.43836092E−06 | −4.72763273E−06 | 6.79957086E−04 | 2.00545582E−02 |
| A20= | −1.98417497E−07 | 4.95285036E−07 | −1.34564813E−04 | −4.92630766E−03 |
| A22= | 1.64518169E−08 | −3.64471829E−08 | 1.81530988E−05 | 8.45541956E−04 |
| A24= | −8.38234675E−10 | 1.78720561E−09 | −1.59378435E−06 | −9.64368965E−05 |
| A26= | 2.44060231E−11 | −5.23884763E−11 | 8.21169523E−08 | 6.57116313E−06 |
| A28= | −3.14058481E−13 | 6.93671392E−13 | −1.88384720E−09 | −2.02481414E−07 |
| Surface # | 14 | 15 | 17 | 18 |
| k= | 0.00000E+00 | 0.00000E+00 | 0.00000E+00 | 0.00000E+00 |
| A4= | −2.88198437E−02 | −3.11139400E−02 | −1.63916850E−02 | −4.32539419E−03 |
| A6= | 5.30840985E−02 | 2.35755869E−02 | 1.21915286E−02 | −4.32496524E−03 |
| A8= | −1.02505103E−01 | −3.40383274E−02 | −1.95396803E−02 | 7.58788563E−03 |
| A10= | 1.39579066E−01 | 4.71514733E−02 | 2.67294862E−02 | −7.55647200E−03 |
| A12= | −1.31306350E−01 | −4.76632293E−02 | −2.54031480E−02 | 4.88657867E−03 |
| A14= | 8.64287226E−02 | 3.33265774E−02 | 1.64165350E−02 | −2.16438694E−03 |

TABLE 2C-continued

| Aspheric Coefficients | | | |
| --- | --- | --- | --- |
| A16= | −4.04180671E−02 | −1.62137464E−02 | −7.30217463E−03 | 6.74506491E−04 |
| A18= | 1.35184727E−02 | 5.53104393E−03 | 2.25316097E−03 | −1.49339707E−04 |
| A20= | −3.21418238E−03 | −1.31767340E−03 | −4.79145226E−04 | 2.33660615E−05 |
| A22= | 5.30800634E−04 | 2.14558223E−04 | 6.84103171E−05 | −2.52523806E−06 |
| A24= | −5.78928368E−05 | −2.27339969E−05 | −6.19472533E−06 | 1.79341490E−07 |
| A26= | 3.74956014E−06 | 1.41065155E−06 | 3.15852370E−07 | −7.53238433E−09 |
| A28= | −1.09181222E−07 | −3.88351474E−08 | −6.69390019E−09 | 1.41813519E−10 |

In the 2nd embodiment, the equation of the aspheric surface profiles of the aforementioned lens elements is the same as the equation of the 1st embodiment. Moreover, these parameters shown in Table 2D can be calculated from Table 2A to Table 2C as the following values and satisfy the following conditions:

TABLE 2D

| Schematic Parameters | | | |
| --- | --- | --- | --- |
| fL [mm] | 15.63 | |R5 + R6|/CT3 | 0.69 |
| FnoL | 2.03 | R1/f1 | 0.52 |
| HFOVL [deg.] | 12.9 | R3/CT2 | 4.38 |
| fS [mm] | 10.53 | R4/CT2 | 1.72 |
| FnoS | 2.06 | R5/CT3 | 2.39 |
| HFOVS [deg.] | 12.1 | R6/R7 | 1.74 |
| fG1 [mm] | 9.14 | f1/f2 | −1.88 |
| fG2 [mm] | −10.59 | f2/CT2 | −5.10 |
| (V1 + V3)/V2 | 5.15 | f3/CT3 | 2.64 |
| (CT1 + CT2 + CT3)/(T12 + T23) | 2.82 | fG2/(TG12L − TG12S) | 3.53 |
| (CT4 + CT5 + CT6)/(T45 + T56) | 5.08 | fG2/fG1 | −1.16 |
| |1 − TLL/TLS| | 0.00E+00 | fL/fS | 1.48 |
| TG1/TG2 | 1.91 | Y11M/ImgHM | 1.07 |
| (R5 − R6)/CT3 | 5.46 | Y11M/Y62M | 1.45 |

3rd Embodiment

Figure 7:
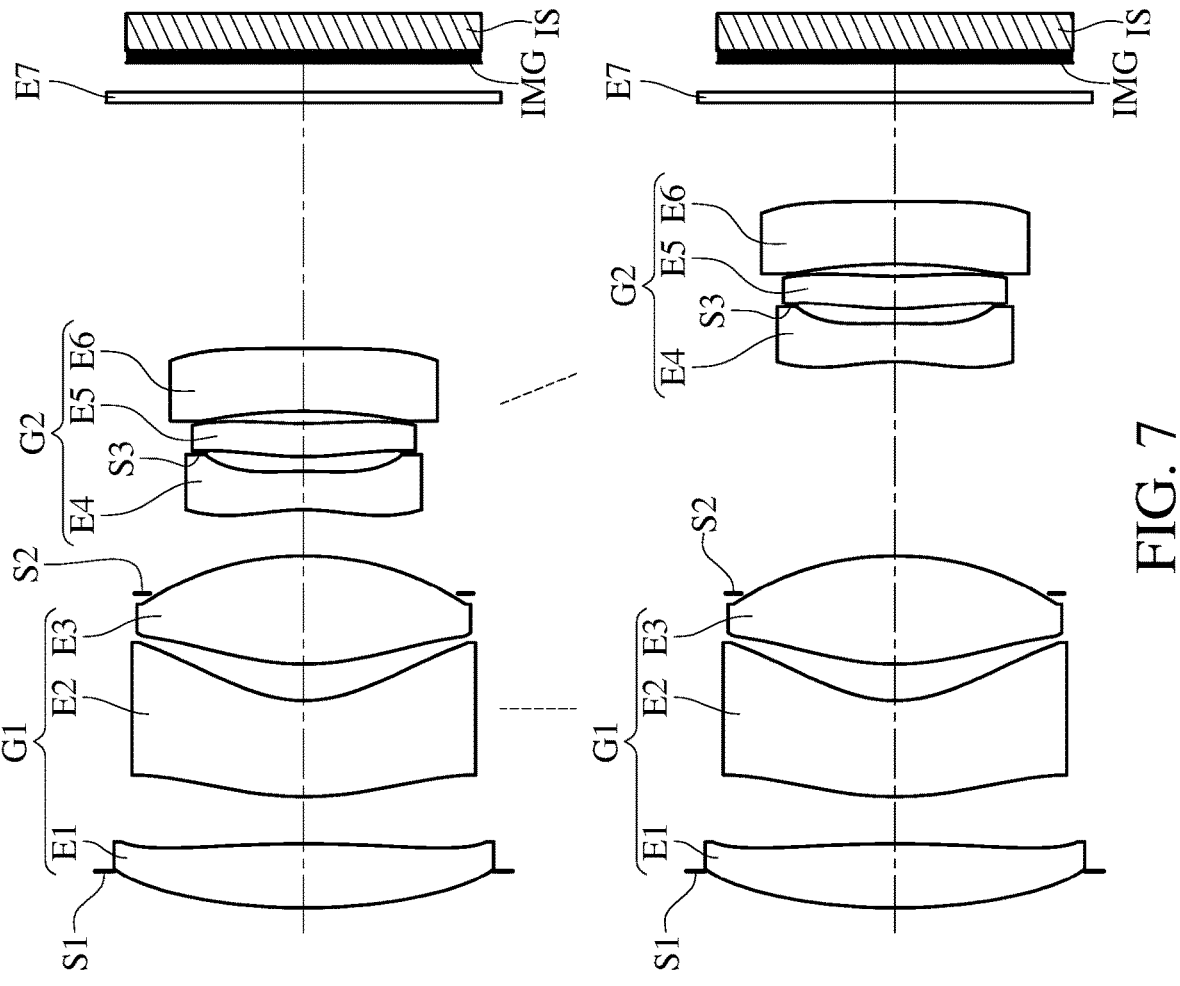
FIG. 7 is a schematic view of an image capturing unit respectively at the long focal length state and the short focal length state according to the 3rd embodiment of the present disclosure.
Figure 8:
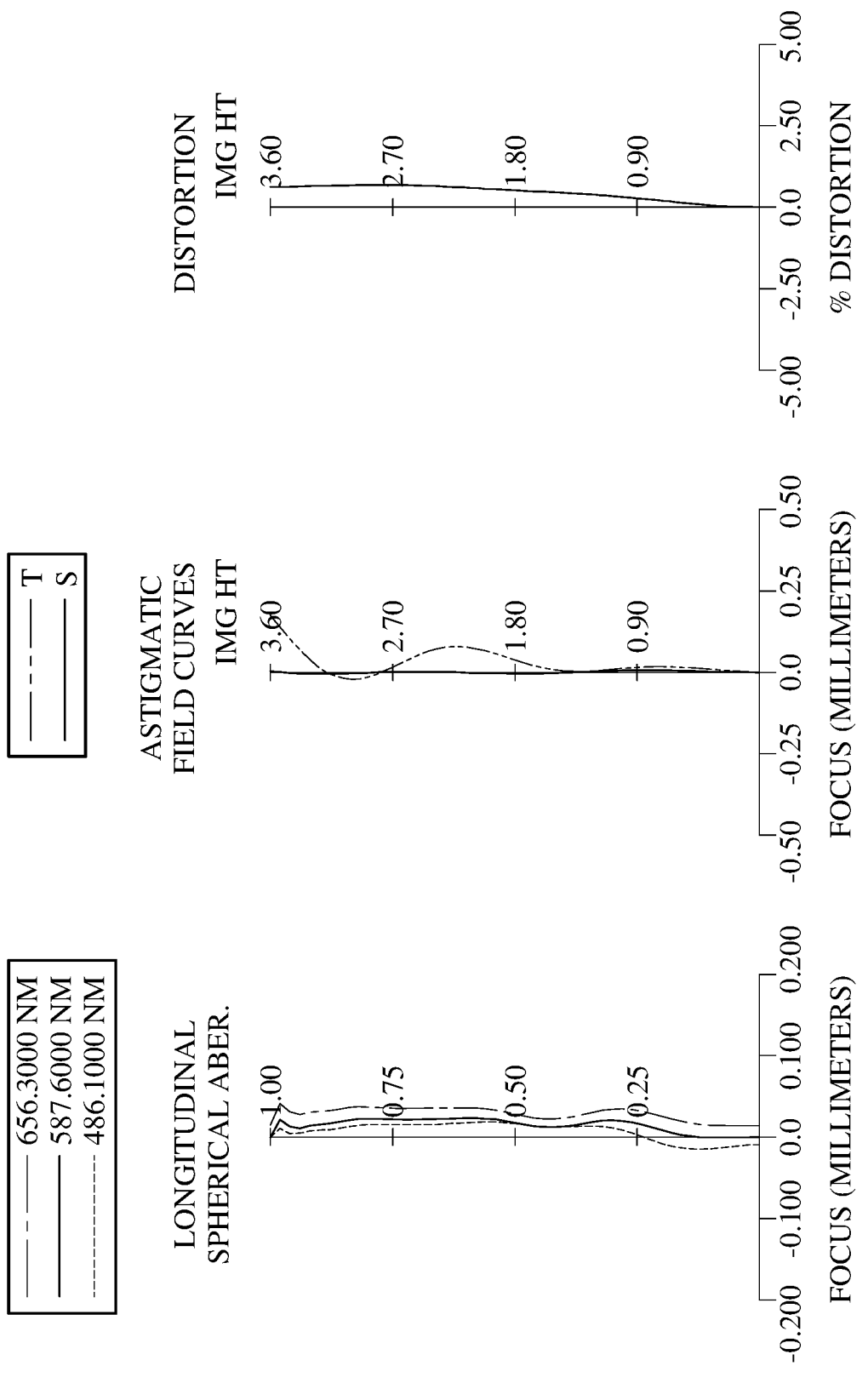
FIG. 8 shows spherical aberration curves, astigmatic field curves and a distortion curve of the image capturing unit at the long focal length state according to the 3rd embodiment.
Figure 9:
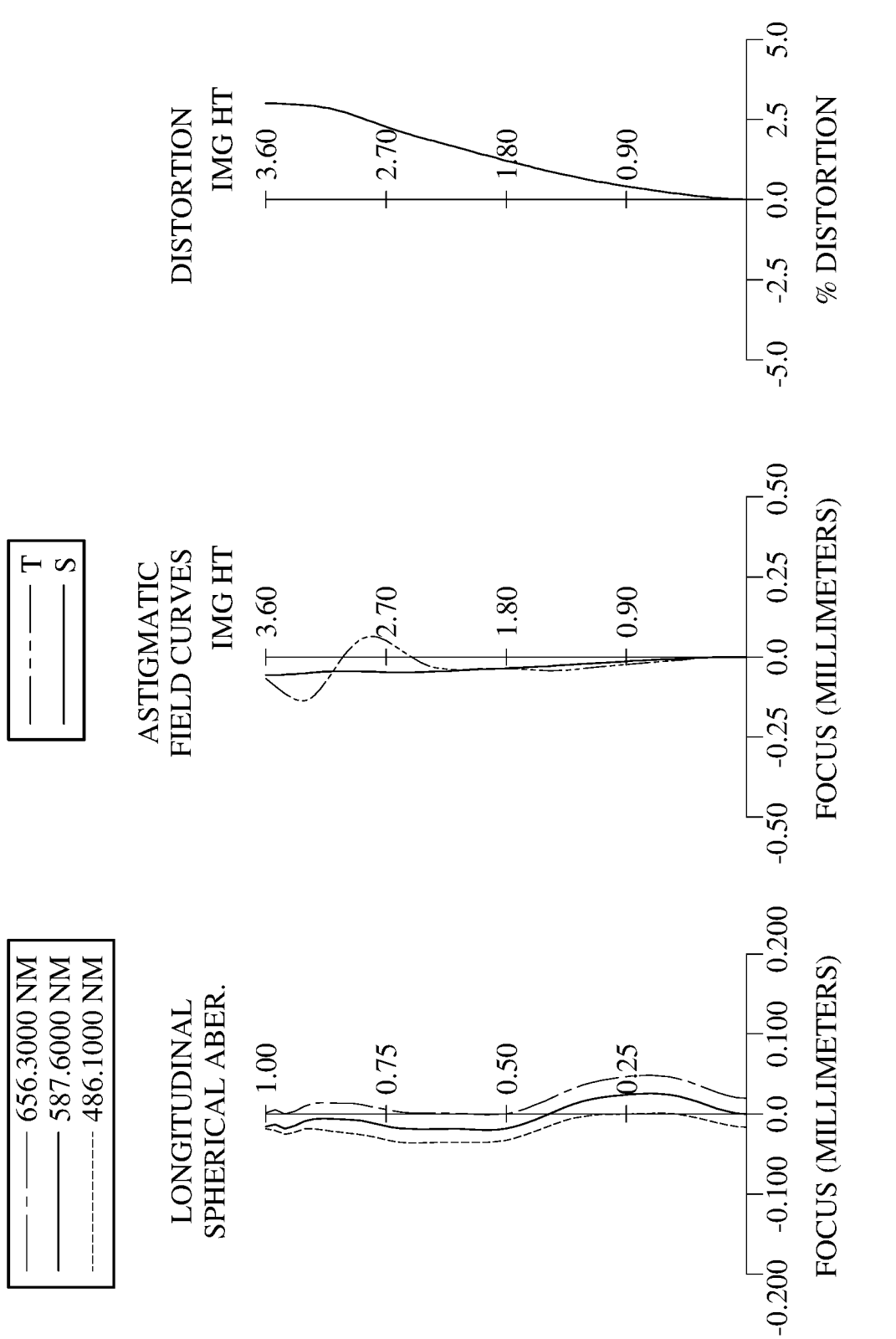
FIG. 9 shows spherical aberration curves, astigmatic field curves and a distortion curve of the image capturing unit at the short focal length state according to the 3rd embodiment.

FIG. 7 is a schematic view of an image capturing unit respectively at the long focal length state and the short focal length state according to the 3rd embodiment of the present disclosure. FIG. 8 shows, in order from left to right, spherical aberration curves, astigmatic field curves and a distortion curve of the image capturing unit at the long focal length state according to the 3rd embodiment. FIG. 9 shows, in order from left to right, spherical aberration curves, astigmatic field curves and a distortion curve of the image capturing unit at the short focal length state according to the 3rd embodiment. The upper part of FIG. 7 shows the optical photographing lens at the long focal length state, and the lower part of FIG. 7 shows the optical photographing lens at the short focal length state. In FIG. 7, the image capturing unit 3 includes the optical photographing lens (its reference numeral is omitted) of the present disclosure and an image sensor IS. The optical photographing lens includes, in order from an object side to an image side along an optical path, a light-folding element, a stop S1, a first lens element E1, a second lens element E2, a third lens element E3, a stop S2, a fourth lens element E4, a stop S3, a fifth lens element E5, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 7, the second lens group G2 moves along an optical axis relative to the first lens group G1 during the focal length adjusting process. Furthermore, through the focal length adjusting process, the optical photographing lens has a long focal length state as shown in the upper part of FIG. 7 and a short focal length state as shown in the lower part of FIG. 7. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

The light-folding element is a prism made of glass material and having an optical path folding function. The related illustration of the light-folding element can refer to the abovementioned description referring to FIG. 32 to FIG. 35, and will not be repeated herein. Also, for simplicity, the light-folding element and the deflection effect of the optical path in FIG. 7 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point always located within an optically effective area thereof during the focal length adjusting process. The image-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has an optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 3rd embodiment are shown in Table 3A and Table 3B, and the aspheric surface data are shown in Table 3C below.

TABLE 3A

| 3rd Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Light-folding element | Plano | | 6.850 | Glass | 1.847 | 23.8 | — |
| 2 | | Plano | | 1.901 | | | | |
| 3 | Stop | Plano | | −0.756 | | | | |
| 4 | Lens 1 | 14.4518 | (ASP) | 1.312 | Plastic | 1.545 | 56.1 | 14.83 |
| 5 | | −17.7601 | (ASP) | 0.954 | | | | |
| 6 | Lens 2 | 6.9755 | (ASP) | 1.948 | Plastic | 1.639 | 23.5 | −8.58 |
| 7 | | 2.7342 | (ASP) | 0.739 | | | | |
| 8 | Lens 3 | 5.2813 | (ASP) | 2.212 | Plastic | 1.544 | 56.0 | 5.60 |
| 9 | | −6.1294 | (ASP) | −0.777 | | | | |
| 10 | Stop | Plano | | D1 | | | | |
| 11 | Lens 4 | −4.1776 | (ASP) | 0.779 | Plastic | 1.544 | 56.0 | −12.81 |
| 12 | | −11.1089 | (ASP) | 0.381 | | | | |
| 13 | Stop | Plano | | −0.081 | | | | |
| 14 | Lens 5 | 6.8752 | (ASP) | 0.670 | Plastic | 1.661 | 20.4 | 32.31 |
| 15 | | 9.7493 | (ASP) | 0.248 | | | | |
| 16 | Lens 6 | −11.1300 | (ASP) | 1.271 | Plastic | 1.544 | 56.0 | −22.12 |
| 17 | | −153.8462 | (ASP) | D2 | | | | |

TABLE 3A-continued

| | | | | 3rd Embodiment | | | | |
|---|---|---|---|---|---|---|---|---|
| Surface # | | Curvature Radius | Thickness | Material | Index | Abbe # | Focal Length |
| 18 | Filter | Plano | 0.210 | Glass | 1.517 | 64.2 | — |
| 19 | | Plano | 0.598 | | | | |
| 20 | Image | Plano | — | | | | |

Note:
Reference wavelength is 587.6 nm (d-line).
An effective radius of the stop S1 (Surface 3) is 3.850 mm.
An effective radius of the stop S2 (Surface 10) is 3.123 mm.
An effective radius of the stop S3 (Surface 13) is 2.000 mm.

TABLE 3B

| Optical data at different states | | |
|---|---|---|
| | Long focal length state | Short focal length state |
| f [mm] | 14.90 | 9.98 |
| Fno | 1.95 | 2.00 |
| HFOV [deg.] | 13.5 | 12.4 |
| D0 [mm] | ∞ | 42.050 |
| D1 [mm] | 1.711 | 4.711 |
| D2 [mm] | 5.000 | 2.000 |

The definitions of these parameters shown in Table 3B are the same as those stated in the 1st embodiment. In this embodiment, D0 is an axial distance between an imaged object and the light-folding element, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 3B.

TABLE 3C

| | | | Aspheric Coefficients | | |
|---|---|---|---|---|
| Surface # | 4 | 5 | 6 | 7 |
| k= | 0.00000E+00 | 0.00000E+00 | 0.00000E+00 | −1.00000E+00 |
| A4= | 4.14156425E−03 | 1.18487312E−02 | 6.03228545E−03 | 2.21191959E−03 |
| A6= | −1.62308724E−03 | −5.99183468E−03 | −7.05146612E−03 | −1.33130580E−02 |
| A8= | 3.77496086E−04 | 1.87517856E−03 | 2.48522204E−03 | 6.73890948E−03 |
| A10= | −3.22915196E−05 | −3.50614919E−04 | −5.00361800E−04 | −1.89732810E−03 |
| A12= | −7.09841885E−06 | 3.40602108E−05 | 5.20115549E−05 | 3.00792856E−04 |
| A14= | 2.88270332E−06 | 5.20264629E−07 | 6.93550794E−07 | −1.27152364E−05 |
| A16= | −4.87946682E−07 | −6.66335669E−07 | −1.11028744E−06 | −5.79859001E−06 |
| A18= | 4.99157706E−08 | 1.00104947E−07 | 1.75869890E−07 | 1.54158172E−06 |
| A20= | −3.26747114E−09 | −8.12108262E−09 | −1.43851518E−08 | −1.96788348E−07 |
| A22= | 1.34202163E−10 | 3.91156105E−10 | 6.17880268E−10 | 1.48686869E−08 |
| A24= | −3.15876409E−12 | −1.05425208E−11 | −8.08162589E−12 | −6.57299632E−10 |
| A26= | 3.25753855E−14 | 1.23026994E−13 | −3.41016190E−13 | 1.49162613E−11 |
| A28= | — | — | 1.07092452E−14 | −1.14957596E−13 |

| Surface # | 8 | 9 | 11 | 12 |
|---|---|---|---|---|
| k= | 0.00000E+00 | 0.00000E+00 | 0.00000E+00 | 0.00000E+00 |
| A4= | 1.30011936E−03 | 2.04016236E−03 | 5.29251988E−02 | 5.90030399E−02 |
| A6= | −5.16692726E−03 | −2.52053035E−03 | −1.77623495E−02 | −1.12584843E−02 |
| A8= | 1.27580350E−03 | 1.37218914E−03 | 6.68702925E−03 | −5.14308650E−02 |
| A10= | 2.57907500E−04 | −5.29476594E−04 | −1.95926418E−03 | 1.17563263E−01 |
| A12= | −2.93007671E−04 | 1.65655171E−04 | 9.68679220E−04 | −1.36018590E−01 |
| A14= | 1.09755143E−04 | −4.36450533E−05 | −8.73916732E−04 | 1.04933396E−01 |
| A16= | −2.53075112E−05 | 9.31913390E−06 | 5.43306610E−04 | −5.83337941E−02 |
| A18= | 3.94607293E−06 | −1.52453066E−06 | −2.07802959E−04 | 2.37897540E−02 |
| A20= | −4.21102579E−07 | 1.82456310E−07 | 5.08536758E−05 | −7.03523534E−03 |
| A22= | 3.00678373E−08 | −1.53000542E−08 | −8.06182999E−06 | 1.46109249E−03 |
| A24= | −1.35814628E−09 | 8.47245585E−10 | 8.04643845E−07 | −2.01175627E−04 |
| A26= | 3.44940646E−11 | −2.77592397E−11 | −4.60908564E−08 | 1.64365797E−05 |
| A28= | −3.64257546E−13 | 4.07025857E−13 | 1.15756445E−09 | −6.01855976E−07 |

| Surface # | 14 | 15 | 16 | 17 |
|---|---|---|---|---|
| k= | 0.00000E+00 | 0.00000E+00 | 0.00000E+00 | 0.00000E+00 |
| A4= | 5.18882106E−03 | 3.83718835E−03 | 1.75090633E−02 | 4.86635357E−03 |
| A6= | −3.65161052E−02 | −2.60508830E−02 | −9.44527204E−03 | −1.63617671E−02 |
| A8= | 2.63437282E−02 | −5.32688015E−02 | −7.84038417E−02 | 2.12534342E−02 |
| A10= | −2.93819160E−02 | 1.48811187E−01 | 1.74400455E−01 | −1.79509137E−02 |
| A12= | 6.24320698E−02 | −1.57123410E−01 | −1.81832788E−01 | 1.02677894E−02 |
| A14= | −7.89072229E−02 | 9.72405991E−02 | 1.16613430E−01 | −4.13394050E−03 |

TABLE 3C-continued

| | Aspheric Coefficients | | | |
|---|---|---|---|---|
| A16= | 5.88465145E-02 | -3.93151737E-02 | -5.01200357E-02 | 1.19390979E-03 |
| A18= | -2.81331267E-02 | 1.07546466E-02 | 1.49035088E-02 | -2.48305298E-04 |
| A20= | 8.95237347E-03 | -1.98986632E-03 | -3.07889469E-03 | 3.68347755E-05 |
| A22= | -1.89750551E-03 | 2.41597154E-04 | 4.33845715E-04 | -3.79813738E-06 |
| A24= | 2.58271222E-04 | -1.79001271E-05 | -3.97540012E-05 | 2.58420021E-07 |
| A26= | -2.04726114E-05 | 6.87384793E-07 | 2.13373542E-06 | -1.04226885E-08 |
| A28= | 7.19604019E-07 | -8.48927543E-09 | -5.08598546E-08 | 1.88600594E-10 |

In the 3rd embodiment, the equation of the aspheric surface profiles of the aforementioned lens elements is the same as the equation of the 1st embodiment.

Moreover, these parameters shown in Table 3D can be calculated from Table 3A to Table 3C as the following values and satisfy the following conditions:

TABLE 3D

| | Schematic Parameters | | |
|---|---|---|---|
| fL [mm] | 14.90 | \|R5 + R6\|/CT3 | 0.38 |
| FnoL | 1.95 | R1/f1 | 0.97 |
| HFOVL [deg.] | 13.5 | R3/CT2 | 3.58 |
| fS [mm] | 9.98 | R4/CT2 | 1.40 |
| FnoS | 2.00 | R5/CT3 | 2.39 |
| HFOVS [deg.] | 12.4 | R6/R7 | 1.47 |
| fG1 [mm] | 8.67 | f1/f2 | -1.73 |
| fG2 [mm] | -10.46 | f2/CT2 | -4.40 |
| (V1 + V3)/V2 | 4.77 | f3/CT3 | 2.53 |
| (CT1 + CT2 + CT3)/(T12 + T23) | 3.23 | fG2/(TG12L - TG12S) | 3.49 |
| (CT4 + CT5 + CT6)/(T45 + T56) | 4.96 | fG2/fG1 | -1.21 |
| \|1 - TLL/TLS\| | 0.00E+00 | fL/fS | 1.49 |
| TG1/TG2 | 2.19 | Y11M/ImgHM | 1.06 |
| (R5 - R6)/CT3 | 5.16 | Y11M/Y62M | 1.42 |

4th Embodiment

Figure 10:
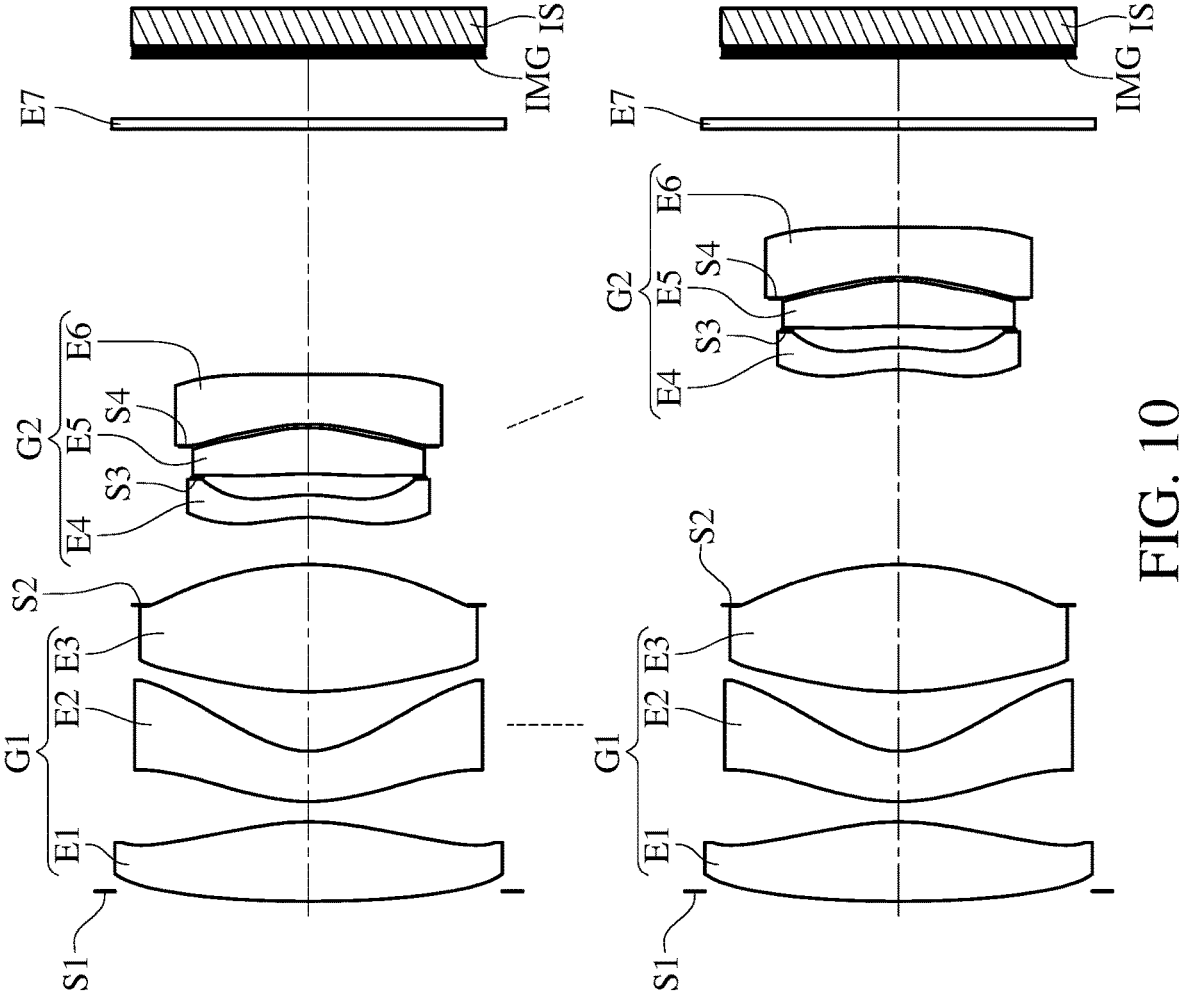
FIG. 10 is a schematic view of an image capturing unit respectively at the long focal length state and the short focal length state according to the 4th embodiment of the present disclosure.
Figure 11:
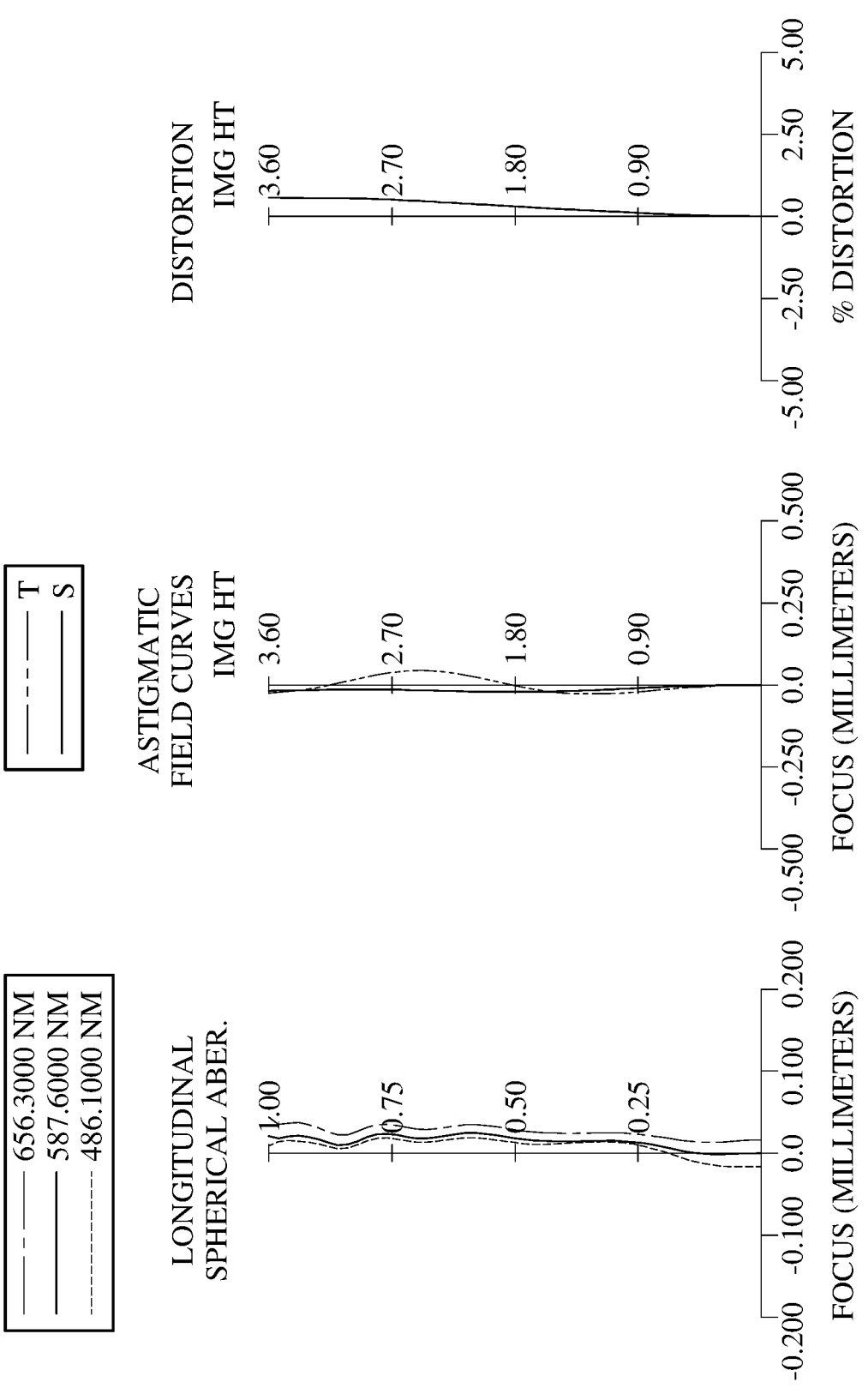
FIG. 11 shows spherical aberration curves, astigmatic field curves and a distortion curve of the image capturing unit at the long focal length state according to the 4th embodiment.
Figure 12:
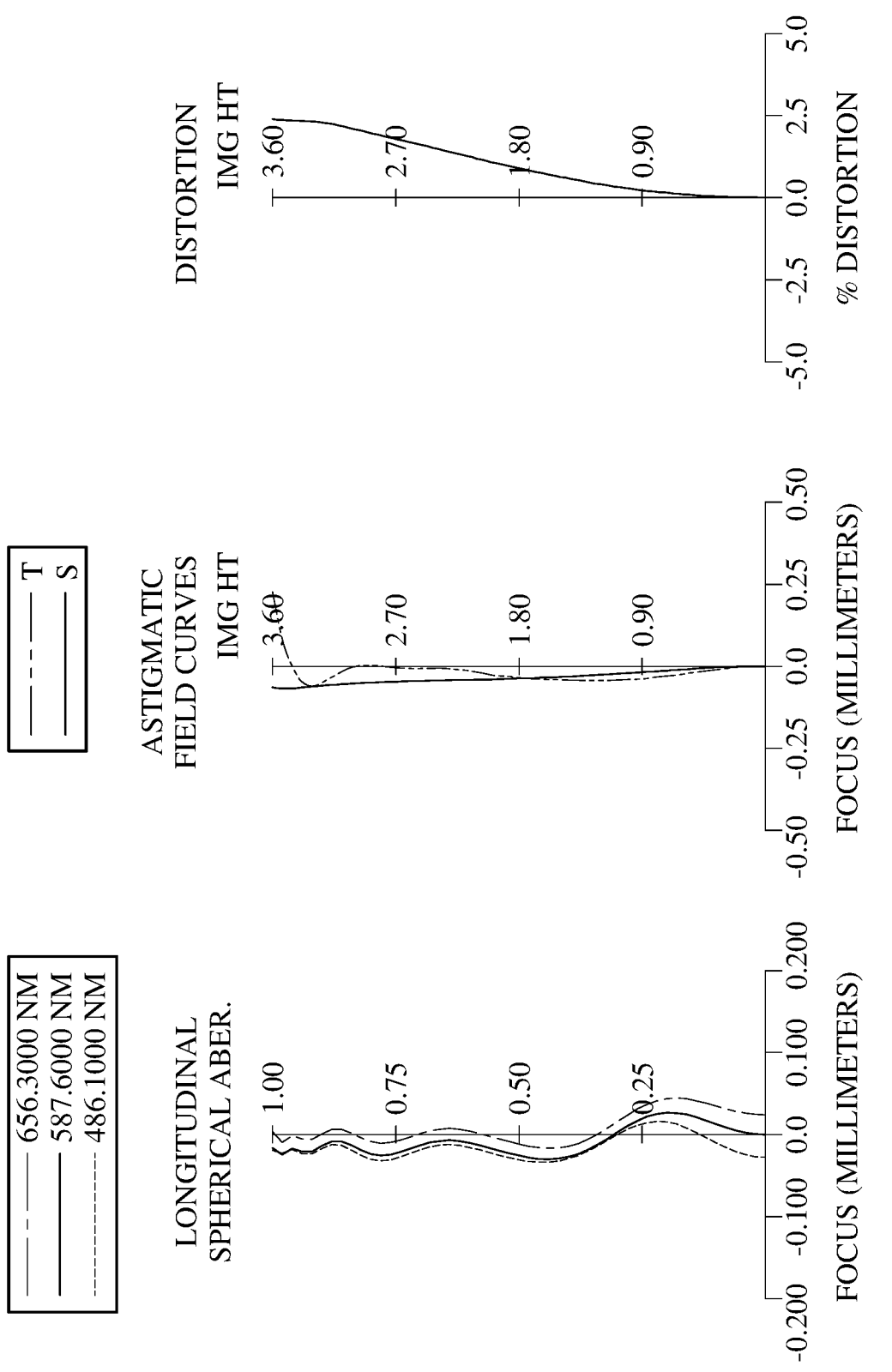
FIG. 12 shows spherical aberration curves, astigmatic field curves and a distortion curve of the image capturing unit at the short focal length state according to the 4th embodiment.

FIG. 10 is a schematic view of an image capturing unit respectively at the long focal length state and the short focal length state according to the 4th embodiment of the present disclosure. FIG. 11 shows, in order from left to right, spherical aberration curves, astigmatic field curves and a distortion curve of the image capturing unit at the long focal length state according to the 4th embodiment. FIG. 12 shows, in order from left to right, spherical aberration curves, astigmatic field curves and a distortion curve of the image capturing unit at the short focal length state according to the 4th embodiment. The upper part of FIG. 10 shows the optical photographing lens at the long focal length state, and the lower part of FIG. 10 shows the optical photographing lens at the short focal length state. In FIG. 10, the image capturing unit 4 includes the optical photographing lens (its reference numeral is omitted) of the present disclosure and an image sensor IS. The optical photographing lens includes, in order from an object side to an image side along an optical path, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 10, the second lens group G2 moves along an optical axis relative to the first lens group G1 during the focal length adjusting process. Furthermore, through the focal length adjusting process, the optical photographing lens has a long focal length state as shown in the upper part of FIG. 10 and a short focal length state as shown in the lower part of FIG. 10. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

In this embodiment, the optical photographing lens can further include a light-folding element which can be a prism or a mirror having an optical path folding function and can be located at an object side of the first lens element E1. The arrangement and related illustration of the light-folding element can refer to the abovementioned description referring to FIG. 32 to FIG. 35, and will not be repeated herein. Also, for simplicity, the light-folding element and the deflection effect of the optical path in FIG. 10 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of glass material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of glass material and has the object-side surface and the image-side surface being both aspheric. The image-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being convex in a paraxial region thereof. The fourth lens element E4 is made of glass material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with positive refractive power has an object-side surface being concave in a paraxial region thereof and an image-side surface being convex in a paraxial region thereof. The fifth lens element E5 is made of glass material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both aspheric. The object-side surface of the sixth lens element E6 has at least one inflection point always located within an optically effective area thereof during the focal length adjusting process. The image-side surface of the sixth lens element E6 has at least one inflection point always located within an optically effective area thereof during the focal length adjusting process. The image-side surface of the sixth lens element E6 has the optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 4th embodiment are shown in Table 4A and Table 4B, and the aspheric surface data are shown in Table 4C below.

TABLE 4A

| | | | | 4th Embodiment | | | | |
|---|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.200 | | | | |
| 2 | Lens 1 | 29.9980 | (ASP) | 1.624 | Plastic | 1.545 | 56.1 | 8.41 |
| 3 | | −5.3038 | (ASP) | 0.410 | | | | |
| 4 | Lens 2 | 3.6731 | (ASP) | 1.029 | Glass | 1.650 | 31.1 | −6.20 |
| 5 | | 1.7087 | (ASP) | 1.205 | | | | |
| 6 | Lens 3 | 7.0509 | (ASP) | 2.600 | Glass | 1.540 | 85.5 | 6.52 |
| 7 | | −6.1257 | (ASP) | −0.837 | | | | |
| 8 | Stop | Plano | | D1 | | | | |
| 9 | Lens 4 | −2.9104 | (ASP) | 0.456 | Glass | 1.730 | 93.0 | −123.46 |
| 10 | | −3.2064 | (ASP) | 0.353 | | | | |
| 11 | Stop | Plano | | 0.074 | | | | |
| 12 | Lens 5 | −9.1520 | (ASP) | 0.933 | Glass | 1.520 | 41.6 | 12.52 |
| 13 | | −3.9371 | (ASP) | −0.378 | | | | |
| 14 | Stop | Plano | | 0.452 | | | | |
| 15 | Lens 6 | −4.3096 | (ASP) | 1.012 | Glass | 1.630 | 67.2 | −6.74 |
| 16 | | 311.9673 | (ASP) | D2 | | | | |
| 17 | Filter | Plano | | 0.210 | Glass | 1.517 | 64.2 | — |

TABLE 4A-continued

| | 4th Embodiment | | | | | |
|---|---|---|---|---|---|---|
| Surface # | Curvature Radius | Thickness | Material | Index | Abbe # | Focal Length |
| 18 | Plano | 1.236 | | | | |
| 19 Image | Plano | — | | | | |

Note:
Reference wavelength is 587.6 nm (d-line).
An effective radius of the stop S1 (Surface 1) is 3.944 mm.
An effective radius of the stop S2 (Surface 8) is 3.248 mm.
An effective radius of the stop S3 (Surface 11) is 2.159 mm.
An effective radius of the stop S4 (Surface 14) is 2.379 mm.

TABLE 4B

| | Optical data at different states | |
|---|---|---|
| | Long focal length state | Short focal length state |
| f [mm] | 15.00 | 10.42 |
| Fno | 1.93 | 2.00 |
| HFOV [deg.] | 13.4 | 12.3 |
| D0 [mm] | ∞ | 48.616 |
| D1 [mm] | 1.798 | 4.798 |
| D2 [mm] | 5.000 | 2.000 |

The definitions of these parameters shown in Table 4B are the same as those stated in the 1st embodiment. In this embodiment, DO is an axial distance between an imaged object and the stop S1, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 4B.

TABLE 4C

| | Aspheric Coefficients | | | |
|---|---|---|---|---|
| Surface # | 2 | 3 | 4 | 5 |
| k= | 0.00000E+00 | 0.00000E+00 | −1.00000E+00 | −1.00000E+00 |
| A4= | 1.91079206E−03 | 1.16851548E−02 | −1.48362800E−02 | −4.31744174E−02 |
| A6= | −4.95565155E−04 | −2.46209737E−03 | 3.43546592E−05 | 7.34402915E−03 |
| A8= | 9.37842176E−05 | 7.24869384E−04 | 1.10410851E−03 | 3.69062121E−04 |
| A10= | −8.11696605E−06 | −1.50959663E−04 | −3.52852179E−04 | −6.79656959E−04 |
| A12= | 9.75631052E−07 | 2.03647610E−05 | 4.42322278E−05 | 1.63415958E−04 |
| A14= | −3.61507868E−07 | −1.70068327E−06 | −2.03606586E−07 | −7.04168703E−06 |
| A16= | 7.56802898E−08 | 6.30230684E−08 | −5.89955524E−07 | −4.91026107E−06 |
| A18= | −8.48918042E−09 | 3.98808539E−09 | 5.91732671E−08 | 1.37170039E−06 |
| A20= | 5.55318680E−10 | −7.44292859E−10 | 4.89139039E−10 | −1.88761787E−07 |
| A22= | −2.13271066E−11 | 4.94259990E−11 | −5.25943666E−10 | 1.58143408E−08 |
| A24= | 4.44875031E−13 | −1.64913193E−12 | 4.45397207E−11 | −8.17323818E−10 |
| A26= | −3.85870003E−15 | 2.27826405E−14 | −1.67367364E−12 | 2.40356375E−11 |
| A28= | — | — | 2.49313037E−14 | −3.08358372E−13 |

| Surface # | 6 | 7 | 9 | 10 |
|---|---|---|---|---|
| k= | 0.00000E+00 | 0.00000E+00 | 0.00000E+00 | 0.00000E+00 |
| A4= | −3.39509928E−03 | 1.08156389E−03 | 8.56873453E−02 | 9.63660510E−02 |
| A6= | 2.54902500E−04 | −1.89129929E−03 | −2.54856925E−02 | −2.33733901E−02 |
| A8= | −3.99696949E−04 | 1.49227920E−03 | 1.15971119E−02 | 8.29344275E−03 |
| A10= | 4.74276546E−04 | −7.07456469E−04 | −4.52879439E−03 | −1.32760723E−03 |
| A12= | −2.69951312E−04 | 2.23270056E−04 | −1.17952768E−04 | −2.23526146E−03 |
| A14= | 9.18054522E−05 | −4.88956096E−05 | 1.55990952E−03 | 2.38771512E−03 |
| A16= | −2.06859006E−05 | 7.60007582E−06 | −1.06641873E−03 | −1.16092447E−03 |
| A18= | 3.21850729E−06 | −8.50752219E−07 | 3.95173146E−04 | 3.20146104E−04 |
| A20= | −3.48044274E−07 | 6.96325993E−08 | −9.22294435E−05 | −5.00694751E−05 |
| A22= | 2.56614441E−08 | −4.23177920E−09 | 1.39341570E−05 | 3.85313196E−06 |
| A24= | −1.22806730E−09 | 1.89495473E−10 | −1.32712870E−06 | −5.74696774E−08 |
| A26= | 3.43239936E−11 | −5.70685197E−12 | 7.26422555E−08 | −6.38488424E−09 |
| A28= | −4.24618230E−13 | 8.51784142E−14 | −1.74568710E−09 | — |

| Surface # | 12 | 13 | 15 | 16 |
|---|---|---|---|---|
| k= | 0.00000E+00 | 0.00000E+00 | 0.00000E+00 | 0.00000E+00 |
| A4= | 3.02229618E−02 | −6.31592771E−02 | −4.92627278E−02 | −3.76651165E−03 |
| A6= | −1.36867675E−02 | 1.59006049E−01 | 1.27946353E−01 | −7.22784922E−04 |
| A8= | 4.06111364E−03 | −1.98575387E−01 | −1.53752579E−01 | 4.49659141E−03 |
| A10= | 5.97132479E−03 | 1.96985456E−01 | 1.42626699E−01 | −6.67529807E−03 |
| A12= | −1.02455348E−02 | −1.53793255E−01 | −1.05693848E−01 | 5.16285806E−03 |

TABLE 4C-continued

| | | Aspheric Coefficients | | |
|---|---|---|---|
| A14= | 7.84494845E−03 | 9.01997795E−02 | 6.00535294E−02 | −2.49986282E−03 |
| A16= | −3.62025297E−03 | −3.84861065E−02 | −2.51254730E−02 | 8.10627002E−04 |
| A18= | 1.06465997E−03 | 1.17161205E−02 | 7.53391124E−03 | −1.81018179E−04 |
| A20= | −2.00030464E−04 | −2.50304234E−03 | −1.58546029E−03 | 2.79928442E−05 |
| A22= | 2.31728180E−05 | 3.65998503E−04 | 2.27885860E−04 | −2.95291440E−06 |
| A24= | −1.50108652E−06 | −3.48961685E−05 | −2.12972380E−05 | 2.03364165E−07 |
| A26= | 4.12536793E−08 | 1.95690887E−06 | 1.16728218E−06 | −8.26759338E−09 |
| A28= | — | −4.90210712E−08 | −2.85104899E−08 | 1.50969342E−10 |

In the 4th embodiment, the equation of the aspheric surface profiles of the aforementioned lens elements is the same as the equation of the 1st embodiment. Moreover, these parameters shown in Table 4D can be calculated from Table 4A to Table 4C as the following values and satisfy the following conditions:

TABLE 4D

| | | Schematic Parameters | |
|---|---|---|---|
| fL [mm] | 15.00 | |R5 + R6|/CT3 | 0.36 |
| FnoL | 1.93 | R1/f1 | 3.57 |
| HFOVL [deg.] | 13.4 | R3/CT2 | 3.57 |
| fS [mm] | 10.42 | R4/CT2 | 1.66 |
| FnoS | 2.00 | R5/CT3 | 2.71 |
| HFOVS [deg.] | 12.3 | R6/R7 | 2.10 |
| fG1 [mm] | 8.80 | f1/f2 | −1.36 |
| fG2 [mm] | −11.64 | f2/CT2 | −6.02 |
| (V1 + V3)/V2 | 4.55 | f3/CT3 | 2.51 |
| (CT1 + CT2 + CT3)/ | 3.25 | fG2/(TG12L − TG12S) | 3.88 |
| (T12 + T23) | | | |
| (CT4 + CT5 + CT6)/ | 4.79 | fG2/fG1 | −1.32 |
| (T45 + T56) | | | |
| |1 − TLL/TLS| | 0.00E+00 | fL/fS | 1.44 |
| TG1/TG2 | 2.37 | Y11M/ImgHM | 1.09 |
| (R5 − R6)/CT3 | 5.07 | Y11M/Y62M | 1.45 |

5th Embodiment

Figure 13:
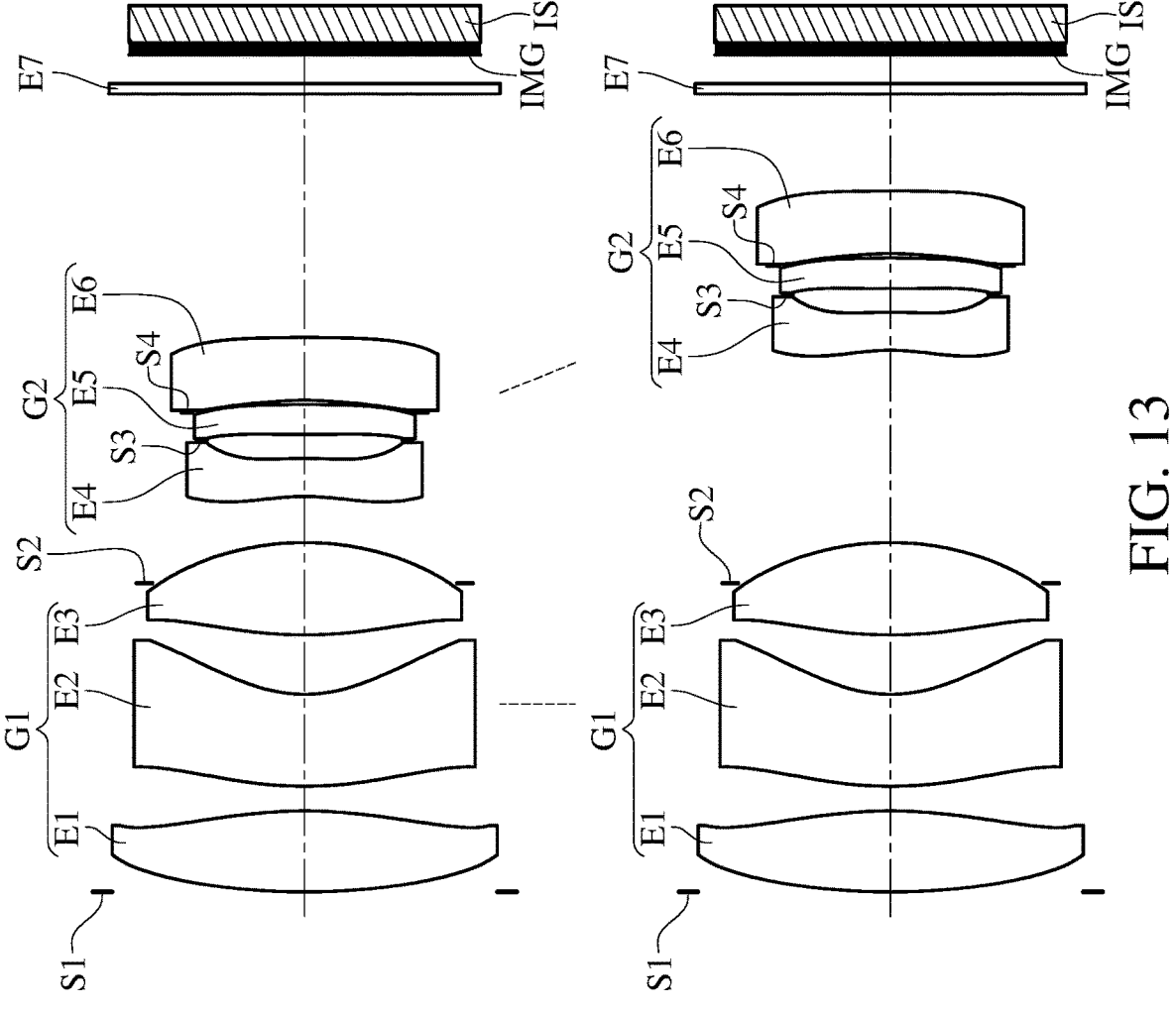
FIG. 13 is a schematic view of an image capturing unit respectively at the long focal length state and the short focal length state according to the 5th embodiment of the present disclosure.
Figure 14:
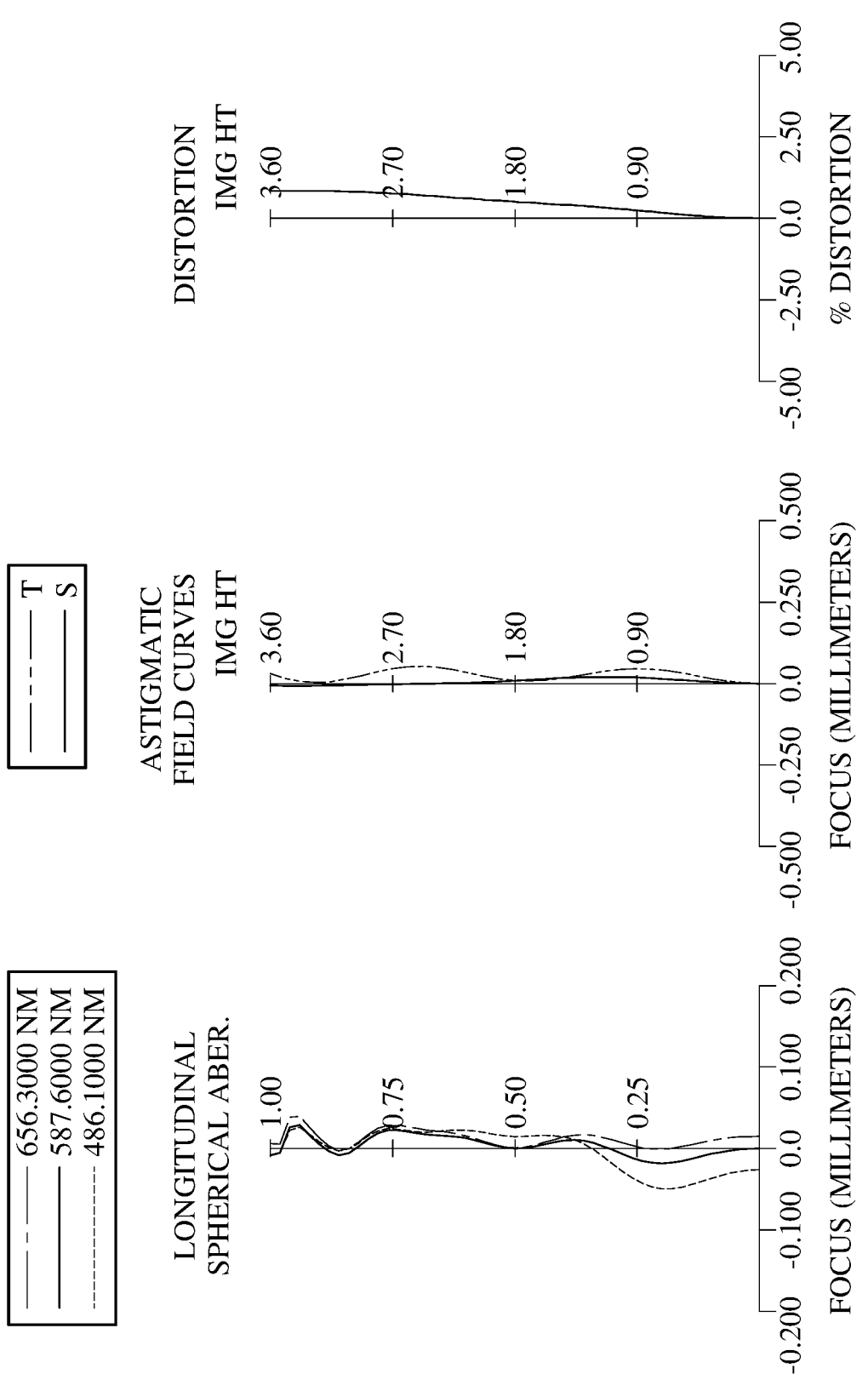
FIG. 14 shows spherical aberration curves, astigmatic field curves and a distortion curve of the image capturing unit at the long focal length state according to the 5th embodiment.
Figure 15:
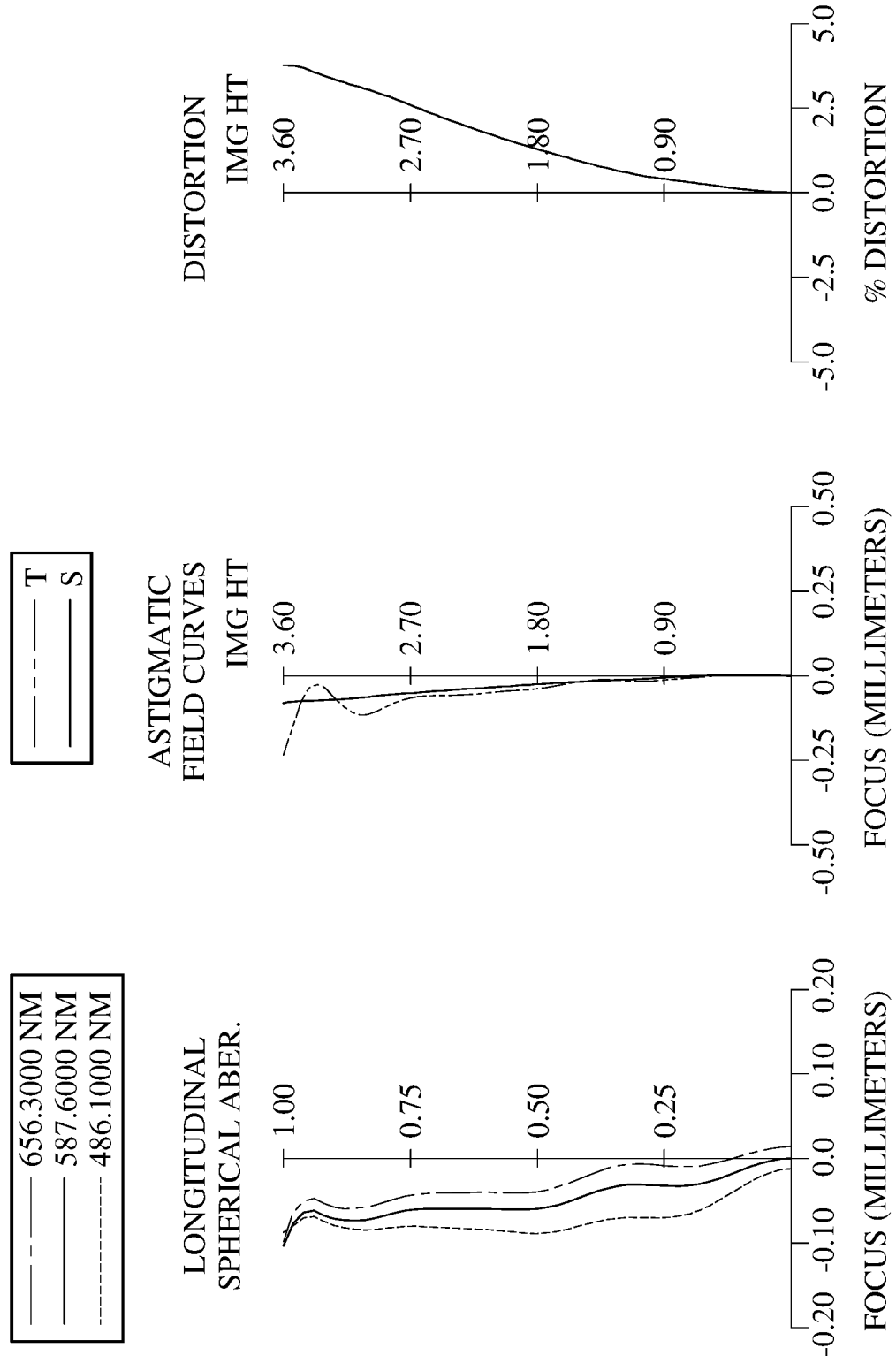
FIG. 15 shows spherical aberration curves, astigmatic field curves and a distortion curve of the image capturing unit at the short focal length state according to the 5th embodiment.

FIG. 13 is a schematic view of an image capturing unit respectively at the long focal length state and the short focal length state according to the 5th embodiment of the present disclosure. FIG. 14 shows, in order from left to right, spherical aberration curves, astigmatic field curves and a distortion curve of the image capturing unit at the long focal length state according to the 5th embodiment. FIG. 15 shows, in order from left to right, spherical aberration curves, astigmatic field curves and a distortion curve of the image capturing unit at the short focal length state according to the 5th embodiment. The upper part of FIG. 13 shows the optical photographing lens at the long focal length state, and the lower part of FIG. 13 shows the optical photographing lens at the short focal length state. In FIG. 13, the image capturing unit 5 includes the optical photographing lens (its reference numeral is omitted) of the present disclosure and an image sensor IS. The optical photographing lens includes, in order from an object side to an image side along an optical path, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 13, the second lens group G2 moves along an optical axis relative to the first lens group G1 during the focal length adjusting process. Furthermore, through the focal length adjusting process, the optical photographing lens has a long focal length state as shown in the upper part of FIG. 13 and a short focal length state as shown in the lower part of FIG. 13. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

In this embodiment, the optical photographing lens can further include a light-folding element which can be a prism or a mirror having an optical path folding function and can be located at an object side of the first lens element E1. The arrangement and related illustration of the light-folding element can refer to the abovementioned description referring to FIG. 32 to FIG. 35, and will not be repeated herein. Also, for simplicity, the light-folding element and the deflection effect of the optical path in FIG. 13 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point always located within an optically effective area thereof during the focal length adjusting process. The image-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has an optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 5th embodiment are shown in Table 5A and Table 5B, and the aspheric surface data are shown in Table 5C below.

TABLE 5A

| | | | | | | | |
|---|---|---|---|---|---|---|---|
| 5th Embodiment | | | | | | | |
| Surface # | | Curvature Radius | Thickness | Material | Index | Abbe # | Focal Length |
| 0 | Object | Plano | D0 | | | | |
| 1 | Stop | Plano | 0.000 | | | | |
| 2 | Lens 1 | 14.7609 (ASP) | 1.659 | Plastic | 1.545 | 56.1 | 9.74 |
| 3 | | −7.9581 (ASP) | 0.507 | | | | |
| 4 | Lens 2 | 8.9478 (ASP) | 1.892 | Plastic | 1.639 | 23.5 | −7.75 |
| 5 | | 2.9242 (ASP) | 1.216 | | | | |
| 6 | Lens 3 | 8.5616 (ASP) | 1.890 | Plastic | 1.544 | 56.0 | 6.82 |
| 7 | | −6.0448 (ASP) | −0.830 | | | | |
| 8 | Stop | Plano | D1 | | | | |
| 9 | Lens 4 | −4.2657 (ASP) | 0.778 | Plastic | 1.544 | 56.0 | −16.07 |
| 10 | | −8.8647 (ASP) | 0.368 | | | | |
| 11 | Stop | Plano | 0.120 | | | | |
| 12 | Lens 5 | 189.1107 (ASP) | 0.626 | Plastic | 1.669 | 19.5 | 12.53 |
| 13 | | −8.7616 (ASP) | −0.161 | | | | |
| 14 | Stop | Plano | 0.251 | | | | |
| 15 | Lens 6 | −4.4603 (ASP) | 1.282 | Plastic | 1.544 | 56.0 | −9.60 |
| 16 | | −33.7221 (ASP) | D2 | | | | |

TABLE 5A-continued

| | | | | 5th Embodiment | | | |
|---|---|---|---|---|---|---|---|
| Surface # | | Curvature Radius | Thickness | Material | Index | Abbe # | Focal Length |
| 17 | Filter | Plano | 0.210 | Glass | 1.517 | 64.2 | — |
| 18 | | Plano | 0.585 | | | | |
| 19 | Image | Plano | — | | | | |

Note:
Reference wavelength is 587.6 nm (d-line).
An effective radius of the stop S1 (Surface 1) is 3.944 mm.
An effective radius of the stop S2 (Surface 8) is 3.128 mm.
An effective radius of the stop S3 (Surface 11) is 2.010 mm.
An effective radius of the stop S4 (Surface 14) is 2.293 mm.

TABLE 5B

| | Optical data at different states | |
|---|---|---|
| | Long focal length state | Short focal length state |
| f [mm] | 15.21 | 10.41 |
| Fno | 1.93 | 2.02 |
| HFOV [deg.] | 13.2 | 11.9 |
| D0 [mm] | ∞ | 48.254 |
| D1 [mm] | 1.780 | 4.780 |
| D2 [mm] | 5.000 | 2.000 |

The definitions of these parameters shown in Table 5B are the same as those stated in the 1st embodiment. In this embodiment, DO is an axial distance between an imaged object and the stop S1, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 5B.

TABLE 5C

| | | | Aspheric Coefficients | |
|---|---|---|---|---|
| Surface # | 2 | 3 | 4 | 5 |
| k= | 0.00000E+00 | 0.00000E+00 | 0.00000E+00 | −1.00000E+00 |
| A4= | 1.58403763E−03 | 1.43974246E−02 | 9.10111513E−03 | −2.50902687E−03 |
| A6= | −3.75375089E−04 | −6.44018575E−03 | −7.10635944E−03 | −4.26445455E−03 |
| A8= | −2.84429007E−05 | 2.21358221E−03 | 2.60809211E−03 | 1.47562180E−03 |
| A10= | 5.50029882E−05 | −5.51524291E−04 | −6.76963325E−04 | −1.07785944E−04 |
| A12= | −2.03416972E−05 | 1.01730043E−04 | 1.30075504E−04 | −9.72677551E−05 |
| A14= | 4.33919409E−06 | −1.38579212E−05 | −1.83468550E−05 | 4.37748813E−05 |
| A16= | −6.05362311E−07 | 1.37541273E−06 | 1.82409946E−06 | −9.45202828E−06 |
| A18= | 5.69629419E−08 | −9.69810204E−08 | −1.15943982E−07 | 1.20554100E−06 |
| A20= | −3.58808956E−09 | 4.65989278E−09 | 3.23096958E−09 | −8.88046336E−08 |
| A22= | 1.45074497E−10 | −1.42012528E−10 | 1.28446291E−10 | 2.79463509E−09 |
| A24= | −3.40406708E−12 | 2.38685038E−12 | −1.53952025E−11 | 7.71210497E−11 |
| A26= | 3.52477912E−14 | −1.55242568E−14 | 5.51419000E−13 | −9.11759880E−12 |
| A28= | — | — | −7.22229894E−15 | 2.17461206E−13 |

| Surface # | 6 | 7 | 9 | 10 |
|---|---|---|---|---|
| k= | 0.00000E+00 | 0.00000E+00 | 0.00000E+00 | 0.00000E+00 |
| A4= | 3.42320664E−04 | −1.25476948E−04 | 4.63218140E−02 | 6.07174335E−02 |
| A6= | −2.29756548E−03 | 6.81173404E−04 | −1.13816086E−02 | −2.54251149E−02 |
| A8= | 1.16077877E−03 | −1.42066141E−03 | 1.00317285E−03 | 2.20096457E−02 |
| A10= | −5.09753784E−04 | 1.16137115E−03 | 3.45503068E−03 | −3.18700350E−02 |
| A12= | 1.71925762E−04 | −5.78415272E−04 | −3.94092287E−03 | 3.92786849E−02 |
| A14= | −3.94657620E−05 | 1.94080558E−04 | 2.49983253E−03 | −3.17302454E−02 |
| A16= | 5.46499261E−06 | −4.55509714E−05 | −1.06203320E−03 | 1.68195499E−02 |
| A18= | −2.74808471E−07 | 7.57569106E−06 | 3.13470143E−04 | −5.94230050E−03 |
| A20= | −4.59410605E−08 | −8.89300760E−07 | −6.42268191E−05 | 1.38713697E−03 |
| A22= | 1.04122429E−08 | 7.20532372E−08 | 8.92888553E−06 | −2.04331679E−04 |
| A24= | −9.24756100E−10 | −3.83245504E−09 | −8.00788689E−07 | 1.68311857E−05 |
| A26= | 4.09660724E−11 | 1.20335412E−10 | 4.16677659E−08 | −5.16991795E−07 |
| A28= | −7.43440459E−13 | −1.68875065E−12 | −9.52722631E−10 | −9.50524441E−09 |

| Surface # | 12 | 13 | 15 | 16 |
|---|---|---|---|---|
| k= | 0.00000E+00 | 0.00000E+00 | 0.00000E+00 | 0.00000E+00 |
| A4= | 2.70838792E−02 | 8.82394014E−02 | 1.04554800E−01 | 6.67789160E−03 |
| A6= | −2.93394137E−02 | −3.49745253E−02 | −3.92940494E−02 | −1.45990844E−02 |
| A8= | −5.72259528E−03 | −5.83226028E−02 | −3.44676205E−02 | 1.84465856E−02 |
| A10= | 2.60538850E−02 | 6.43769680E−02 | 2.01471138E−02 | −1.73481532E−02 |

TABLE 5C-continued

| | | Aspheric Coefficients | | |
|---|---|---|---|
| A12= | −2.12722470E−02 | −1.93859816E−02 | 2.26297159E−02 | 1.14995254E−02 |
| A14= | 9.79463627E−03 | −5.36120058E−03 | −2.96810287E−02 | −5.38665523E−03 |
| A16= | −2.95030983E−03 | 5.97985501E−03 | 1.50230372E−02 | 1.79034683E−03 |
| A18= | 6.01630893E−04 | −2.02123372E−03 | −4.17182820E−03 | −4.21772510E−04 |
| A20= | −8.12068470E−05 | 3.39454052E−04 | 6.42945778E−04 | 6.97356792E−05 |
| A22= | 6.61097429E−06 | −2.32740029E−05 | −4.12917918E−05 | −7.89776419E−06 |
| A24= | −2.46862227E−07 | −1.08085464E−06 | −2.23626761E−06 | 5.82776890E−07 |
| A26= | — | 2.72306170E−07 | 5.20237335E−07 | −2.52215655E−08 |
| A28= | — | −1.24456779E−08 | −2.38259052E−08 | 4.85405534E−10 |

In the 5th embodiment, the equation of the aspheric surface profiles of the aforementioned lens elements is the same as the equation of the 1st embodiment. Moreover, these parameters shown in Table 5D can be calculated from Table 5A to Table 5C as the following values and satisfy the following conditions:

TABLE 5D

| | | Schematic Parameters | |
|---|---|---|---|
| fL [mm] | 15.21 | |R5 + R6|/CT3 | 1.33 |
| FnoL | 1.93 | R1/f1 | 1.52 |
| HFOVL [deg.] | 13.2 | R3/CT2 | 4.73 |
| fS [mm] | 10.41 | R4/CT2 | 1.55 |
| FnoS | 2.02 | R5/CT3 | 4.53 |
| HFOVS [deg.] | 11.9 | R6/R7 | 1.42 |
| fG1 [mm] | 8.86 | f1/f2 | −1.26 |
| fG2 [mm] | −11.17 | f2/CT2 | −4.10 |
| (V1 + V3)/V2 | 4.77 | f3/CT3 | 3.61 |
| (CT1 + CT2 + CT3)/ (T12 + T23) | 3.16 | fG2/(TG12L − TG12S) | 3.72 |
| (CT4 + CT5 + CT6)/ (T45 + T56) | 4.65 | fG2/fG1 | −1.26 |
| |1 − TLL/TLS| | 0.00E+00 | fL/fS | 1.46 |
| TG1/TG2 | 2.19 | Y11M/ImgHM | 1.09 |
| (R5 − R6)/CT3 | 7.73 | Y11M/Y62M | 1.44 |

6th Embodiment

Figure 16:
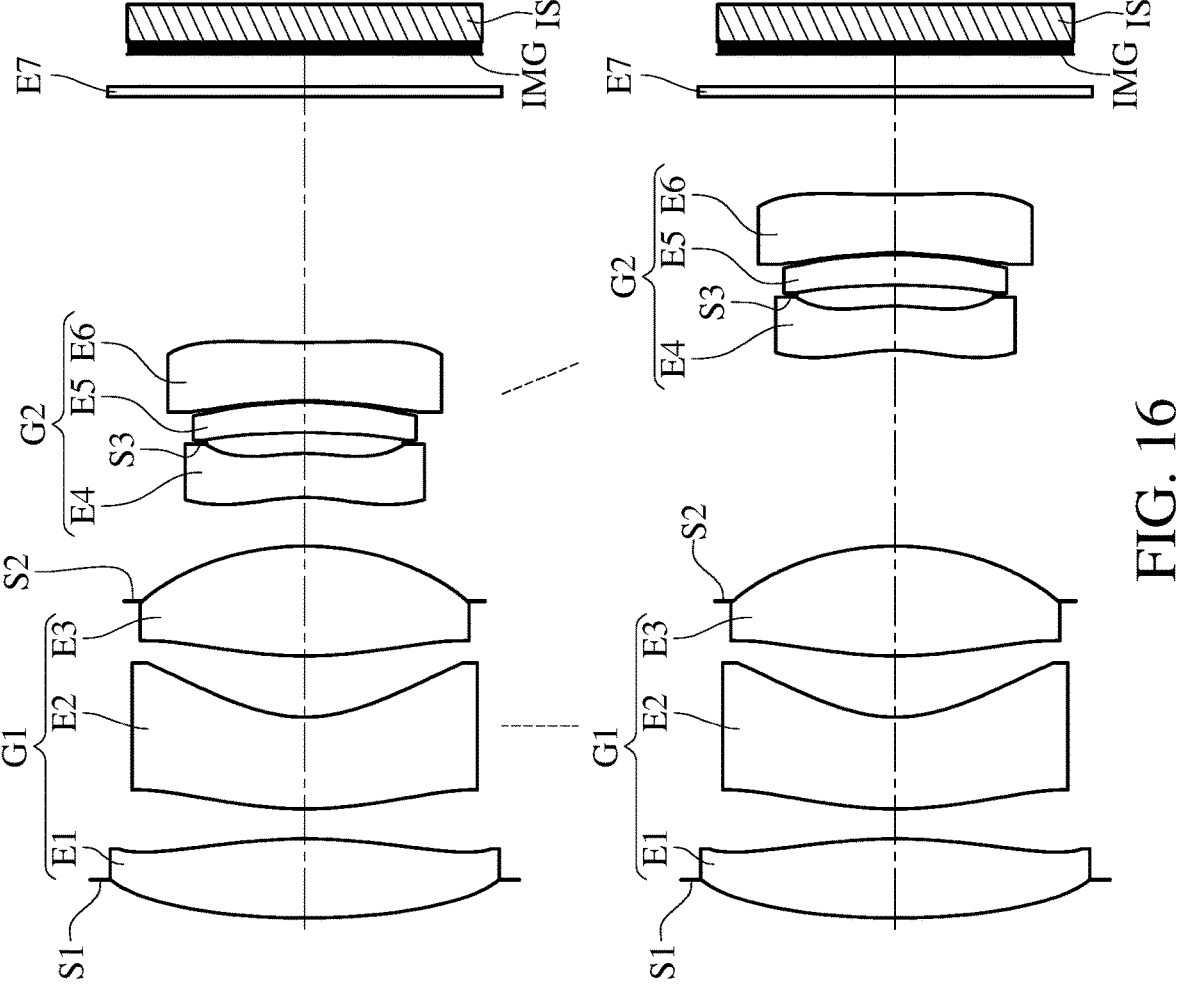
FIG. 16 is a schematic view of an image capturing unit respectively at the long focal length state and the short focal length state according to the 6th embodiment of the present disclosure.
Figure 17:
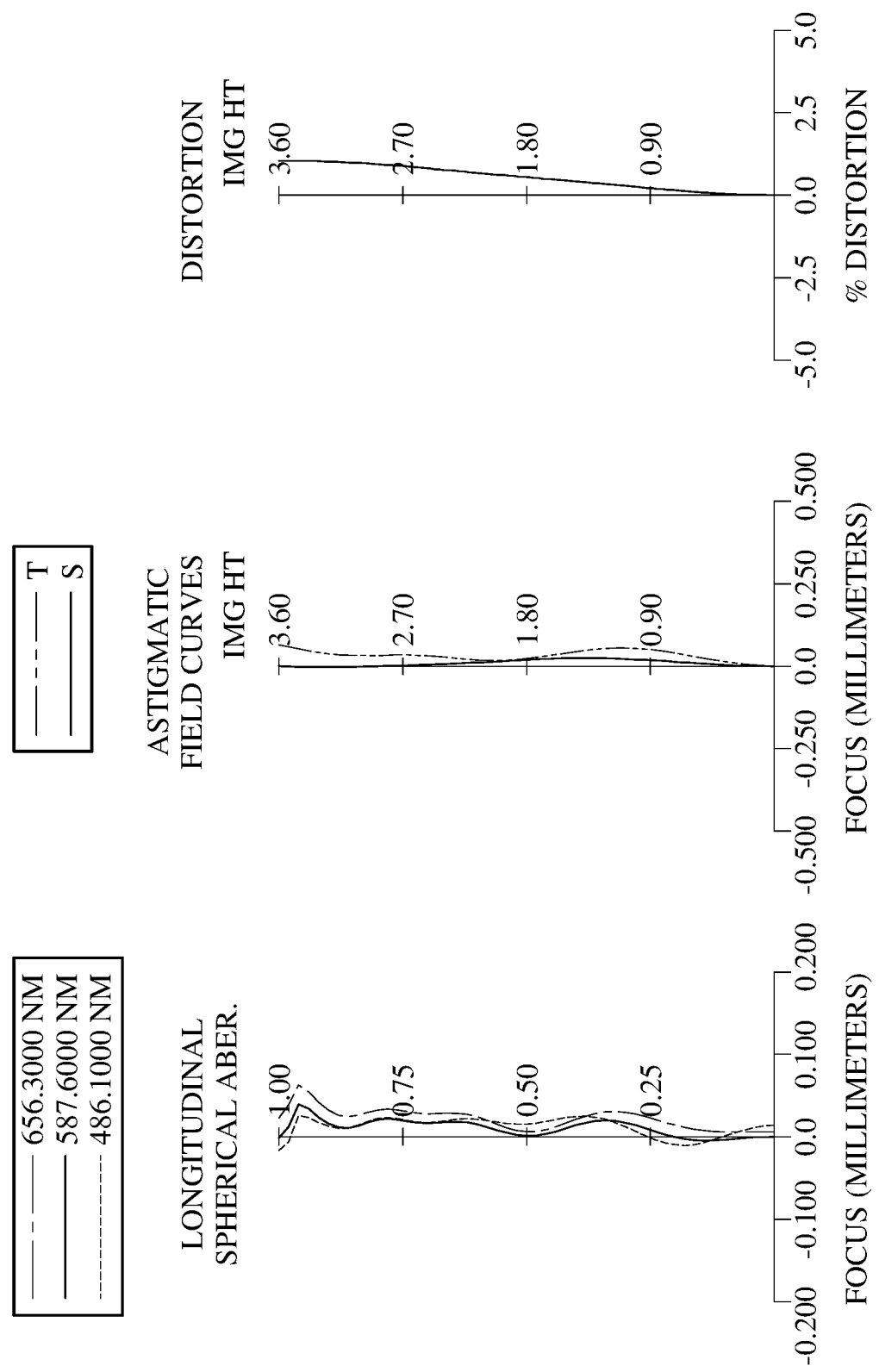
FIG. 17 shows spherical aberration curves, astigmatic field curves and a distortion curve of the image capturing unit at the long focal length state according to the 6th embodiment.
Figure 18:
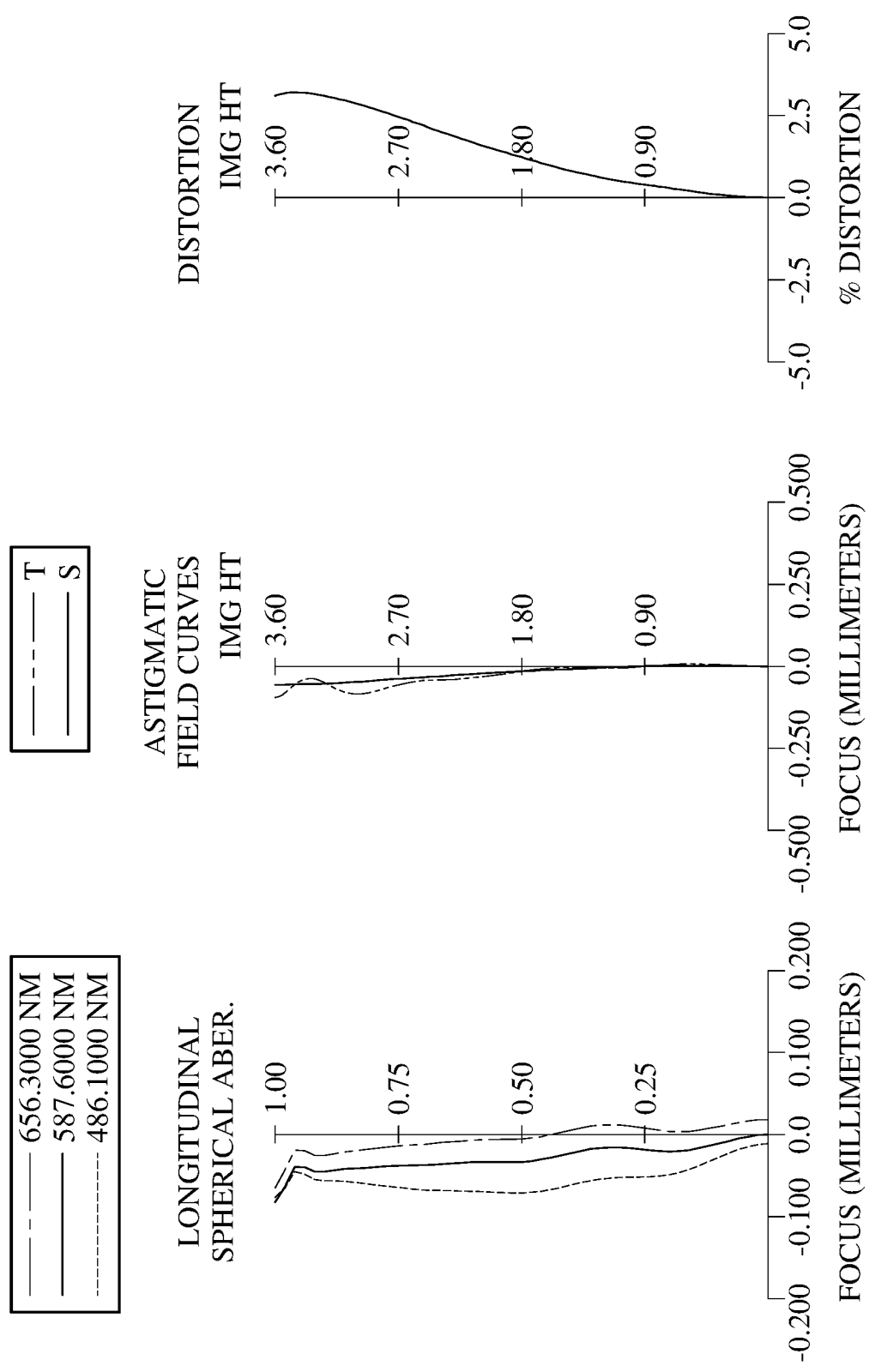
FIG. 18 shows spherical aberration curves, astigmatic field curves and a distortion curve of the image capturing unit at the short focal length state according to the 6th embodiment.

FIG. 16 is a schematic view of an image capturing unit respectively at the long focal length state and the short focal length state according to the 6th embodiment of the present disclosure. FIG. 17 shows, in order from left to right, spherical aberration curves, astigmatic field curves and a distortion curve of the image capturing unit at the long focal length state according to the 6th embodiment. FIG. 18 shows, in order from left to right, spherical aberration curves, astigmatic field curves and a distortion curve of the image capturing unit at the short focal length state according to the 6th embodiment. The upper part of FIG. 16 shows the optical photographing lens at the long focal length state, and the lower part of FIG. 16 shows the optical photographing lens at the short focal length state. In FIG. 16, the image capturing unit 6 includes the optical photographing lens (its reference numeral is omitted) of the present disclosure and an image sensor IS. The optical photographing lens includes, in order from an object side to an image side along an optical path, a stop S1, a first lens element E1, a second lens element E2, a third lens element E3, a stop S2, a fourth lens element E4, a stop S3, a fifth lens element E5, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 16, the second lens group G2 moves along an optical axis relative to the first lens group G1 during the focal length adjusting process. Furthermore, through the focal length adjusting process, the optical photographing lens has a long focal length state as shown in the upper part of FIG. 16 and a short focal length state as shown in the lower part of FIG. 16. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

In this embodiment, the optical photographing lens can further include a light-folding element which can be a prism or a mirror having an optical path folding function and can be located at an object side of the first lens element E1. The arrangement and related illustration of the light-folding element can refer to the abovementioned description referring to FIG. 32 to FIG. 35, and will not be repeated herein. Also, for simplicity, the light-folding element and the deflection effect of the optical path in FIG. 16 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. The image-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process. The image-side surface of the fourth lens element E4 has at least one inflection point always located within an optically effective area thereof during the focal length adjusting process.

The fifth lens element E5 with positive refractive power has an object-side surface being concave in a paraxial region thereof and an image-side surface being convex in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being concave in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has at least one inflection point always located within an optically effective area thereof during the focal length adjusting process. The image-side surface of the sixth lens element E6 has the optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 6th embodiment are shown in Table 6A and Table 6B, and the aspheric surface data are shown in Table 6C below.

TABLE 6A

| 6th Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | −0.778 | | | | |
| 2 | Lens 1 | 16.6967 | (ASP) | 1.612 | Plastic | 1.545 | 56.1 | 10.80 |
| 3 | | −8.7851 | (ASP) | 0.603 | | | | |
| 4 | Lens 2 | 8.8105 | (ASP) | 1.877 | Plastic | 1.639 | 23.5 | −8.59 |
| 5 | | 3.1001 | (ASP) | 1.241 | | | | |
| 6 | Lens 3 | 8.7624 | (ASP) | 2.232 | Plastic | 1.544 | 56.0 | 6.78 |
| 7 | | −5.7944 | (ASP) | −1.122 | | | | |
| 8 | Stop | Plano | | D1 | | | | |
| 9 | Lens 4 | −3.7832 | (ASP) | 0.897 | Plastic | 1.544 | 56.0 | 396.49 |
| 10 | | −4.0286 | (ASP) | 0.203 | | | | |
| 11 | Stop | Plano | | 0.227 | | | | |
| 12 | Lens 5 | −8.3925 | (ASP) | 0.616 | Plastic | 1.660 | 20.4 | 23.33 |
| 13 | | −5.5905 | (ASP) | 0.037 | | | | |
| 14 | Lens 6 | −4.8153 | (ASP) | 1.179 | Plastic | 1.544 | 56.0 | −7.57 |
| 15 | | 30.8913 | (ASP) | D2 | | | | |

TABLE 6A-continued

| | | 6th Embodiment | | | | | |
|---|---|---|---|---|---|---|---|
| Surface # | | Curvature Radius | Thickness | Material | Index | Abbe # | Focal Length |
| 16 | Filter | Plano | 0.210 | Glass | 1.517 | 64.2 | — |
| 17 | | Plano | 0.655 | | | | |
| 18 | Image | Plano | — | | | | |

Note:
Reference wavelength is 587.6 nm (d-line).
An effective radius of the stop S1 (Surface 1) is 3.950 mm.
An effective radius of the stop S2 (Surface 8) is 3.324 mm.
An effective radius of the stop S3 (Surface 11) is 2.010 mm.

TABLE 6B

| | Optical data at different states | |
|---|---|---|
| | Long focal length state | Short focal length state |
| f [mm] | 15.29 | 10.16 |
| Fno | 1.94 | 1.98 |
| HFOV [deg.] | 13.1 | 12.2 |
| D0 [mm] | ∞ | 48.086 |
| D1 [mm] | 2.108 | 5.108 |
| D2 [mm] | 5.000 | 2.000 |

The definitions of these parameters shown in Table 6B are the same as those stated in the 1st embodiment. In this embodiment, DO is an axial distance between an imaged object and the stop S1, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 6B.

TABLE 6C

| | | Aspheric Coefficients | | |
|---|---|---|---|---|
| Surface # | 2 | 3 | 4 | 5 |
| k= | 0.00000E+00 | 0.00000E+00 | 0.00000E+00 | −9.50920E−01 |
| A4= | 1.67115516E−03 | 1.04875361E−02 | 4.62096746E−03 | −5.47669106E−03 |
| A6= | −2.62532220E−04 | −3.73345150E−03 | −4.07472087E−03 | −2.57737657E−03 |
| A8= | 3.66442335E−06 | 1.24529789E−03 | 1.51018875E−03 | 1.56023175E−03 |
| A10= | 2.30682141E−05 | −3.24334382E−04 | −4.23398558E−04 | −6.46665986E−04 |
| A12= | −9.51533332E−06 | 6.38759658E−05 | 9.17793306E−05 | 2.39194945E−04 |
| A14= | 2.12436968E−06 | −9.23595262E−06 | −1.50292685E−05 | −7.38086745E−05 |
| A16= | −3.01401657E−07 | 9.60134162E−07 | 1.83173175E−06 | 1.73150571E−05 |
| A18= | 2.83045944E−08 | −7.01085479E−08 | −1.67962152E−07 | −2.95709563E−06 |
| A20= | −1.75750416E−09 | 3.46705911E−09 | 1.20085743E−08 | 3.59493791E−07 |
| A22= | 6.95380358E−11 | −1.08719881E−10 | −6.92370215E−10 | −3.02791833E−08 |
| A24= | −1.59119466E−12 | 1.89431189E−12 | 3.10982364E−11 | 1.68022590E−09 |
| A26= | 1.60595966E−14 | −1.30953021E−14 | −9.32554340E−13 | −5.52920986E−11 |
| A28= | — | — | 1.32424256E−14 | 8.17944525E−13 |

| Surface # | 6 | 7 | 9 | 10 |
|---|---|---|---|---|
| k= | 0.00000E+00 | 0.00000E+00 | 0.00000E+00 | 0.00000E+00 |
| A4= | −1.44670914E−03 | −5.69712603E−04 | 4.83236347E−02 | 8.23195229E−02 |
| A6= | −1.86180445E−03 | 7.48030863E−04 | −8.52899204E−03 | −1.78038904E−02 |
| A8= | 1.53946168E−03 | −1.03564552E−03 | −1.19725090E−03 | −6.90170387E−03 |
| A10= | −9.47276907E−04 | 7.36076484E−04 | 3.40517661E−03 | 1.73645353E−02 |
| A12= | 4.23809818E−04 | −3.22725939E−04 | −2.74837653E−03 | −2.22204633E−02 |
| A14= | −1.33657623E−04 | 9.47103456E−05 | 1.46063386E−03 | 2.28793097E−02 |
| A16= | 2.96972725E−05 | −1.93556270E−05 | −5.49396117E−04 | −1.72371188E−02 |
| A18= | −4.66693815E−06 | 2.79688246E−06 | 1.46528424E−04 | 8.96719604E−03 |
| A20= | 5.16094336E−07 | −2.84943481E−07 | −2.72770233E−05 | −3.16338975E−03 |
| A22= | −3.93181524E−08 | 2.00232593E−08 | 3.44095711E−06 | 7.42540209E−04 |
| A24= | 1.96634834E−09 | −9.23309187E−10 | −2.78768440E−07 | −1.11049741E−04 |
| A26= | −5.81638689E−11 | 2.51269620E−11 | 1.30198289E−08 | 9.57589193E−06 |
| A28= | 7.71988251E−13 | −3.05575671E−13 | −2.65137952E−10 | −3.62393414E−07 |

| Surface # | 12 | 13 | 14 | 15 |
|---|---|---|---|---|
| k= | 0.00000E+00 | 0.00000E+00 | 0.00000E+00 | 0.00000E+00 |
| A4= | 3.85966819E−02 | −2.14410458E−02 | −2.82626945E−02 | −8.61327029E−05 |
| A6= | −7.59049728E−03 | 3.05432318E−01 | 3.66207033E−01 | −2.73528867E−03 |
| A8= | −3.34168087E−02 | −5.65835130E−01 | −6.64525056E−01 | 2.10816261E−03 |
| A10= | 4.17142949E−02 | 5.25742612E−01 | 6.17582808E−01 | −2.04894504E−03 |
| A12= | −2.49940359E−02 | −2.88586687E−01 | −3.43206263E−01 | 1.47670425E−03 |

TABLE 6C-continued

| | | Aspheric Coefficients | | |
|---|---|---|---|
| A14= | 8.77263322E–03 | 9.45263610E–02 | 1.15995213E–01 | –7.30451212E–04 |
| A16= | –1.76965418E–03 | –1.51678493E–02 | –2.07038004E–02 | 2.48768669E–04 |
| A18= | 1.48657023E–04 | –9.81261442E–04 | –1.21883764E–04 | –5.87151612E–05 |
| A20= | 1.34805934E–05 | 1.09177966E–03 | 1.04445815E–03 | 9.57020203E–06 |
| A22= | –4.08740163E–06 | –2.58918520E–04 | –2.68878063E–04 | –1.05589638E–06 |
| A24= | 2.65326999E–07 | 3.23115413E–05 | 3.47875272E–05 | 7.52209185E–08 |
| A26= | — | –2.16814000E–06 | –2.39621032E–06 | –3.12047801E–09 |
| A28= | — | 6.18839777E–08 | 7.00634202E–08 | 5.72391238E–11 |

In the 6th embodiment, the equation of the aspheric surface profiles of the aforementioned lens elements is the same as the equation of the 1st embodiment. Moreover, these parameters shown in Table 6D can be calculated from Table 6A to Table 6C as the following values and satisfy the following conditions:

TABLE 6D

| | Schematic Parameters | | |
|---|---|---|---|
| fL [mm] | 15.29 | |R5 + R6|/CT3 | 1.33 |
| FnoL | 1.94 | R1/f1 | 1.55 |
| HFOVL [deg.] | 13.1 | R3/CT2 | 4.69 |
| fS [mm] | 10.16 | R4/CT2 | 1.65 |
| FnoS | 1.98 | R5/CT3 | 3.93 |
| HFOVS [deg.] | 12.2 | R6/R7 | 1.53 |
| fG1 [mm] | 8.83 | f1/f2 | –1.26 |
| fG2 [mm] | –10.27 | f2/CT2 | –4.58 |
| (V1 + V3)/V2 | 4.77 | f3/CT3 | 3.04 |
| (CT1 + CT2 + CT3)/ (T12 + T23) | 3.10 | fG2/(TG12L – TG12S) | 3.42 |
| (CT4 + CT5 + CT6)/ (T45 + T56) | 5.76 | fG2/fG1 | –1.16 |
| |1 – TLL/TLS| | 0.00E+00 | fL/fS | 1.51 |
| TG1/TG2 | 2.39 | Y11M/ImgHM | 1.09 |
| (R5 – R6)/CT3 | 6.52 | Y11M/Y62M | 1.42 |

7th Embodiment

Figure 19:
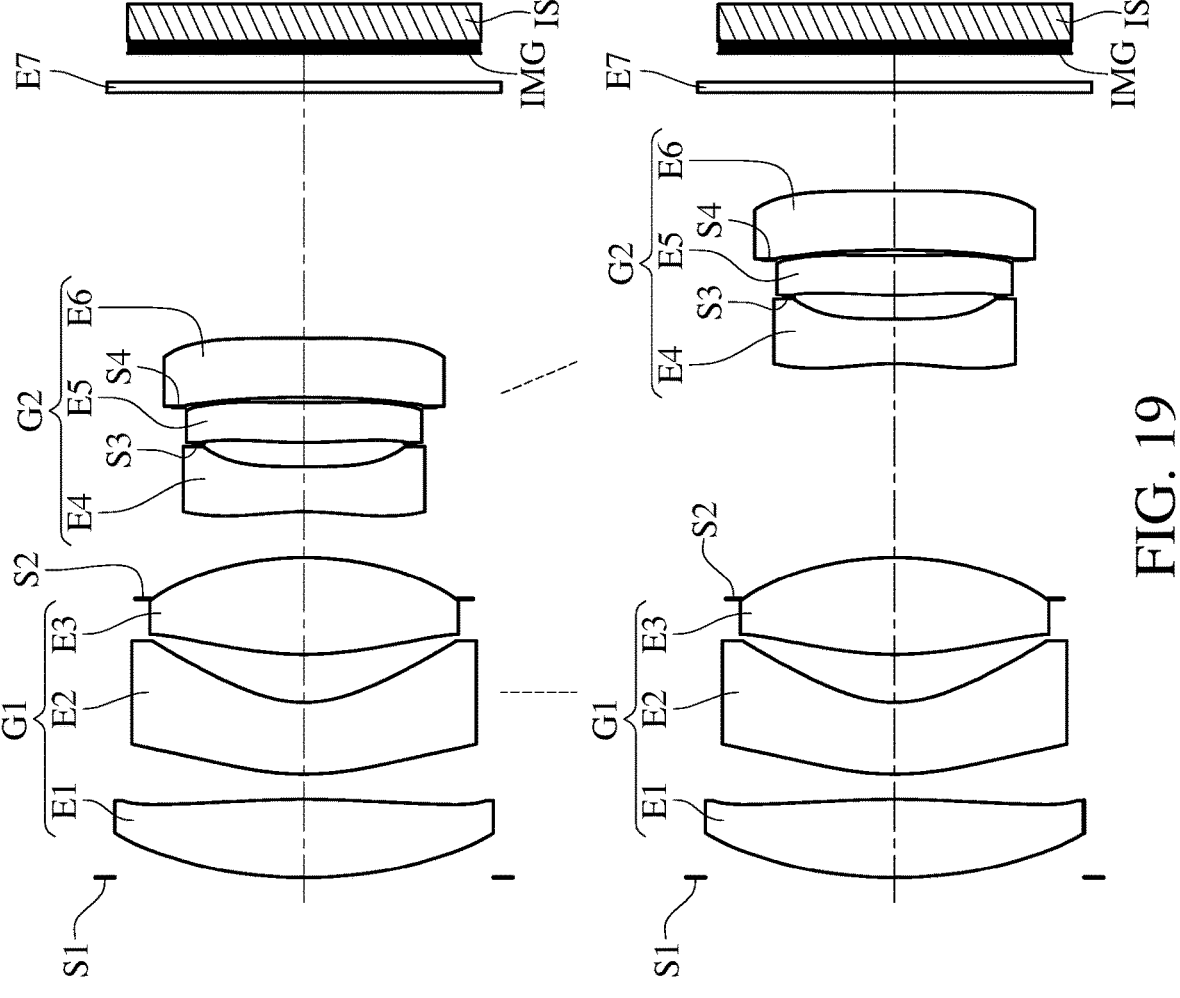
FIG. 19 is a schematic view of an image capturing unit respectively at the long focal length state and the short focal length state according to the 7th embodiment of the present disclosure.

FIG. 19 is a schematic view of an image capturing unit respectively at the long focal length state and the short focal length state according to the 7th embodiment of the present disclosure. FIG. 20 shows, in order from left to right, spherical aberration curves, astigmatic field curves and a distortion curve of the image capturing unit at the long focal length state according to the 7th embodiment. FIG. 21 shows, in order from left to right, spherical aberration curves, astigmatic field curves and a distortion curve of the image capturing unit at the short focal length state according to the 7th embodiment. The upper part of FIG. 19 shows the optical photographing lens at the long focal length state, and the lower part of FIG. 19 shows the optical photographing lens at the short focal length state. In FIG. 19, the image capturing unit 7 includes the optical photographing lens (its reference numeral is omitted) of the present disclosure and an image sensor IS. The optical photographing lens includes, in order from an object side to an image side along an optical path, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 19, the second lens group G2 moves along an optical axis relative to the first lens group G1 during the focal length adjusting process. Furthermore, through the focal length adjusting process, the optical photographing lens has a long focal length state as shown in the upper part of FIG. 19 and a short focal length state as shown in the lower part of FIG. 19. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

In this embodiment, the optical photographing lens can further include a light-folding element which can be a prism or a mirror having an optical path folding function and can be located at an object side of the first lens element E1. The arrangement and related illustration of the light-folding element can refer to the abovementioned description referring to FIG. 32 to FIG. 35, and will not be repeated herein. Also, for simplicity, the light-folding element and the deflection effect of the optical path in FIG. 19 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The object-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with negative refractive power has an object-side surface being concave in a paraxial region thereof and an image-side surface being convex in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has an optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 7th embodiment are shown in Table 7A and Table 7B, and the aspheric surface data are shown in Table 7C below.

TABLE 7A

| 7th Embodiment | | | | | | | |
| --- | --- | --- | --- | --- | --- | --- | --- |
| Surface # | | Curvature Radius | Thickness | Material | Index | Abbe # | Focal Length |
| 0 | Object | Plano | D0 | | | | |
| 1 | Stop | Plano | 0.000 | | | | |
| 2 | Lens 1 | 9.5867 (ASP) | 1.604 | Plastic | 1.545 | 56.1 | 10.72 |
| 3 | | −14.0872 (ASP) | 0.513 | | | | |
| 4 | Lens 2 | 6.4098 (ASP) | 1.456 | Plastic | 1.639 | 23.5 | −8.23 |
| 5 | | 2.6321 (ASP) | 0.971 | | | | |
| 6 | Lens 3 | 7.1045 (ASP) | 1.978 | Plastic | 1.544 | 56.0 | 6.69 |
| 7 | | −6.7353 (ASP) | −0.852 | | | | |
| 8 | Stop | Plano | D1 | | | | |
| 9 | Lens 4 | −6.0414 (ASP) | 0.913 | Plastic | 1.544 | 56.0 | −10.02 |
| 10 | | 59.0331 (ASP) | 0.463 | | | | |
| 11 | Stop | Plano | 0.025 | | | | |
| 12 | Lens 5 | 10.8135 (ASP) | 0.810 | Plastic | 1.669 | 19.5 | 14.91 |
| 13 | | −124.9385 (ASP) | −0.084 | | | | |
| 14 | Stop | Plano | 0.197 | | | | |
| 15 | Lens 6 | −8.2354 (ASP) | 1.198 | Plastic | 1.544 | 56.0 | −16.96 |
| 16 | | −80.5406 (ASP) | D2 | | | | |

TABLE 7A-continued

| | | | | 7th Embodiment | | | | |
|---|---|---|---|---|---|---|---|
| Surface # | | Curvature Radius | Thickness | Material | Index | Abbe # | Focal Length |
| 17 | Filter | Plano | 0.210 | Glass | 1.517 | 64.2 | — |
| 18 | | Plano | 0.584 | | | | |
| 19 | Image | Plano | — | | | | |

Note:
Reference wavelength is 587.6 nm (d-line).
An effective radius of the stop S1 (Surface 1) is 3.850 mm.
An effective radius of the stop S2 (Surface 8) is 3.117 mm.
An effective radius of the stop S3 (Surface 11) is 2.050 mm.
An effective radius of the stop S4 (Surface 14) is 2.430 mm.

TABLE 7B

| | Optical data at different states | |
|---|---|---|
| | Long focal length state | Short focal length state |
| f [mm] | 15.23 | 10.35 |
| Fno | 1.98 | 2.06 |
| HFOV [deg.] | 13.2 | 12.1 |
| D0 [mm] | ∞ | 48.852 |
| D1 [mm] | 1.787 | 4.787 |
| D2 [mm] | 5.000 | 2.000 |

The definitions of these parameters shown in Table 7B are the same as those stated in the 1st embodiment. In this embodiment, DO is an axial distance between an imaged object and the stop S1, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 7B.

TABLE 7C

| | Aspheric Coefficients | | | |
|---|---|---|---|---|
| Surface # | 2 | 3 | 4 | 5 |
| k= | 0.00000E+00 | 0.00000E+00 | 0.00000E+00 | −1.00000E+00 |
| A4= | 1.94264973E−03 | 1.29533620E−02 | 5.99552303E−03 | −5.03066390E−03 |
| A6= | −7.96072495E−04 | −7.78054846E−03 | −9.17357021E−03 | −8.31026921E−03 |
| A8= | 2.38254870E−04 | 3.83568153E−03 | 5.09756616E−03 | 7.44602687E−03 |
| A10= | −2.45213248E−05 | −1.30616915E−03 | −1.80870454E−03 | −3.88549719E−03 |
| A12= | −8.57053607E−06 | 3.08920578E−04 | 4.16968164E−04 | 1.35525491E−03 |
| A14= | 3.94099623E−06 | −5.15135530E−05 | −5.95779982E−05 | −3.26118210E−04 |
| A16= | −7.73998666E−07 | 6.07856227E−06 | 3.99447028E−06 | 5.39363086E−05 |
| A18= | 9.07201789E−08 | −5.02758380E−07 | 2.31490979E−07 | −5.89460621E−06 |
| A20= | −6.71666509E−09 | 2.84097496E−08 | −8.22221565E−08 | 3.78915946E−07 |
| A22= | 3.08627457E−10 | −1.04115460E−09 | 8.76297481E−09 | −8.05418694E−09 |
| A24= | −8.05290266E−12 | 2.22192436E−11 | −5.04078783E−10 | −6.55261571E−10 |
| A26= | 9.13250083E−14 | −2.08698470E−13 | 1.56811273E−11 | 5.09747407E−11 |
| A28= | — | — | −2.07704336E−13 | −1.09018967E−12 |

| Surface # | 6 | 7 | 9 | 10 |
|---|---|---|---|---|
| k= | 0.00000E+00 | 0.00000E+00 | 0.00000E+00 | 0.00000E+00 |
| A4= | −1.04627726E−03 | −3.48221664E−04 | 2.77818917E−02 | 2.60644380E−02 |
| A6= | −3.70470685E−03 | −4.84678302E−04 | −9.91451628E−03 | −1.28484212E−02 |
| A8= | 3.10654532E−03 | 2.02486226E−04 | 9.51536183E−03 | 1.55417571E−02 |
| A10= | −1.58523231E−03 | 4.00703296E−05 | −7.30684264E−03 | −1.20864360E−02 |
| A12= | 5.23515305E−04 | −8.75813110E−05 | 3.24399520E−03 | 6.61367370E−03 |
| A14= | −1.11929528E−04 | 4.63429970E−05 | −5.35562369E−04 | −2.82987260E−03 |
| A16= | 1.44186122E−05 | −1.38801185E−05 | −2.22729236E−04 | 1.10258856E−03 |
| A18= | −7.65867209E−07 | 2.67622417E−06 | 1.66368488E−04 | −3.91984970E−04 |
| A20= | −6.88829264E−08 | −3.44323359E−07 | −5.03860989E−05 | 1.06494186E−04 |
| A22= | 1.58235293E−08 | 2.94308718E−08 | 8.89500322E−06 | −1.87664636E−05 |
| A24= | −1.23726067E−09 | −1.60439191E−09 | −9.49394016E−07 | 1.86110386E−06 |
| A26= | 4.62007214E−11 | 5.04214923E−11 | 5.70283191E−08 | −7.85240934E−08 |
| A28= | −6.75480338E−13 | −6.93719685E−13 | −1.48569892E−09 | — |

| Surface # | 12 | 13 | 15 | 16 |
|---|---|---|---|---|
| k= | 0.00000E+00 | 0.00000E+00 | 0.00000E+00 | 0.00000E+00 |
| A4= | −9.66303625E−04 | 6.20411798E−02 | 8.40702601E−02 | 1.14991185E−02 |
| A6= | −3.13981364E−02 | −7.55229484E−02 | −6.71494636E−02 | −2.54724522E−02 |
| A8= | 4.11208950E−02 | 2.30483884E−03 | −3.98536212E−02 | 3.11232047E−02 |
| A10= | −3.56131920E−02 | 1.03782073E−01 | 1.72144146E−01 | −2.63171118E−02 |

TABLE 7C-continued

| | Aspheric Coefficients | | | |
|---|---|---|---|---|
| A12= | 2.16126699E−02 | −1.55094469E−01 | −2.22386739E−01 | 1.52758275E−02 |
| A14= | −9.00560689E−03 | 1.22832182E−01 | 1.66247752E−01 | −6.19977937E−03 |
| A16= | 2.56618412E−03 | −6.12068137E−02 | −8.01658677E−02 | 1.78358814E−03 |
| A18= | −5.00857760E−04 | 2.02403111E−02 | 2.59327152E−02 | −3.65252354E−04 |
| A20= | 6.55979031E−05 | −4.51595407E−03 | −5.69179804E−03 | 5.28407829E−05 |
| A22= | −5.29218538E−06 | 6.73564709E−04 | 8.37736715E−04 | −5.27357343E−06 |
| A24= | 1.99739868E−07 | −6.44730171E−05 | −7.92745818E−05 | 3.45282428E−07 |
| A26= | — | 3.58564549E−06 | 4.36371810E−06 | −1.33439531E−08 |
| A28= | — | −8.81654073E−08 | −1.06289767E−07 | 2.30682621E−10 |

In the 7th embodiment, the equation of the aspheric surface profiles of the aforementioned lens elements is the same as the equation of the 1st embodiment. Moreover, these parameters shown in Table 7D can be calculated from Table 7A to Table 7C as the following values and satisfy the following conditions:

TABLE 7D

| | Schematic Parameters | | |
|---|---|---|---|
| fL [mm] | 15.23 | \|R5 + R6\|/CT3 | 0.19 |
| FnoL | 1.98 | R1/f1 | 0.89 |
| HFOVL [deg.] | 13.2 | R3/CT2 | 4.40 |
| fS [mm] | 10.35 | R4/CT2 | 1.81 |
| FnoS | 2.06 | R5/CT3 | 3.59 |
| HFOVS [deg.] | 12.1 | R6/R7 | 1.11 |
| fG1 [mm] | 8.86 | f1/f2 | −1.30 |
| fG2 [mm] | −10.93 | f2/CT2 | −5.65 |
| (V1 + V3)/V2 | 4.77 | f3/CT3 | 3.38 |
| (CT1 + CT2 + CT3)/ | 3.39 | fG2/(TG12L − TG12S) | 3.64 |
| (T12 + T23) | | | |
| (CT4 + CT5 + CT6)/ | 4.86 | fG2/fG1 | −1.23 |
| (T45 + T56) | | | |
| \|1 − TLL/TLS\| | 0.00E+00 | fL/fS | 1.47 |
| TG1/TG2 | 1.85 | Y11M/ImgHM | 1.07 |
| (R5 − R6)/CT3 | 7.00 | Y11M/Y62M | 1.35 |

8th Embodiment

FIG. 22 is a schematic view of an image capturing unit respectively at the long focal length state and the short focal length state according to the 8th embodiment of the present disclosure. FIG. 23 shows, in order from left to right, spherical aberration curves, astigmatic field curves and a distortion curve of the image capturing unit at the long focal length state according to the 8th embodiment. FIG. 24 shows, in order from left to right, spherical aberration curves, astigmatic field curves and a distortion curve of the image capturing unit at the short focal length state according to the 8th embodiment. The upper part of FIG. 22 shows the optical photographing lens at the long focal length state, and the lower part of FIG. 22 shows the optical photographing lens at the short focal length state. In FIG. 22, the image capturing unit 8 includes the optical photographing lens (its reference numeral is omitted) of the present disclosure and an image sensor IS. The optical photographing lens includes, in order from an object side to an image side along an optical path, a stop S1, a first lens element E1, a second lens element E2, a third lens element E3, a stop S2, a fourth lens element E4, a stop S3, a fifth lens element E5, a stop S4, a sixth lens element E6, a filter E7 and an image surface IMG. Further, the optical photographing lens includes, in order from the object side to the image side along the optical path, a first lens group G1 and a second lens group G2. The first lens group G1 includes the first lens element E1, the second lens element E2 and the third lens element E3, and the second lens group G2 includes the fourth lens element E4, the fifth lens element E5 and the sixth lens element E6. Moreover, the first lens group G1 has positive refractive power, and the second lens group G2 has negative refractive power. The optical photographing lens includes six lens elements (E1, E2, E3, E4, E5 and E6) with no additional lens element disposed between each of the adjacent six lens elements.

The focal length of the optical photographing lens is variable by changing an axial distance between the two lens groups (G1 and G2) during a focal length adjusting process. It can also be considered that the optical photographing lens performs the focal length adjusting process to change the inner state thereof according to an object distance for correspondingly varying the focal length of the optical photographing lens. As shown in FIG. 22, the second lens group G2 moves along an optical axis relative to the first lens group G1 during the focal length adjusting process. Furthermore, through the focal length adjusting process, the optical photographing lens has a long focal length state as shown in the upper part of FIG. 22 and a short focal length state as shown in the lower part of FIG. 22. The long focal length state refers to a state of the optical photographing lens when having the longest focal length, and the short focal length state refers to a state of the optical photographing lens when having the shortest focal length.

When the focal length of the optical photographing lens is gradually reduced during the focal length adjusting process, the second lens group G2 moves toward the image side along the optical axis relative to the first lens group G1. Conversely, when the focal length of the optical photographing lens is gradually increased during the focal length adjusting process, the second lens group G2 moves toward the object side along the optical axis relative to the first lens group G1. From another point of view, when the object distance is gradually reduced during the focal length adjusting process, the second lens group G2 moves towards the image side along the optical axis relative to the first lens group G1. Conversely, when the object distance is gradually increased during the focal length adjusting process, the second lens group G2 moves towards the object side along the optical axis relative to the first lens group G1. It is noted that there is no relative motion between lens elements of any of the two lens groups in the focal length adjusting process.

In this embodiment, the optical photographing lens can further include a light-folding element which can be a prism or a mirror having an optical path folding function and can be located at an object side of the first lens element E1. The arrangement and related illustration of the light-folding element can refer to the abovementioned description referring to FIG. 32 to FIG. 35, and will not be repeated herein. Also, for simplicity, the light-folding element and the deflection effect of the optical path in FIG. 22 are omitted.

The first lens element E1 with positive refractive power has an object-side surface being convex in a paraxial region thereof and an image-side surface being convex in a paraxial region thereof. The first lens element E1 is made of plastic material and has the object-side surface and the image-side surface being both aspheric. The image-side surface of the first lens element E1 has at least one inflection point always located within an optically effective area thereof during the focal length adjusting process. Each of the object-side surface and the image-side surface of the first lens element E1 has the optically effective area always in a non-circular-symmetrical shape during the focal length adjusting process. In this embodiment, the said non-circular-symmetrical shape can be similar to the shape illustrated in FIG. 31. However, the present disclosure is not limited thereto, and other non-circular-symmetrical shapes in different types may be applied based on actual requirements.

The second lens element E2 with negative refractive power has an object-side surface being convex in a paraxial region thereof and an image-side surface being concave in a paraxial region thereof. The second lens element E2 is made of plastic material and has the object-side surface and the image-side surface being both aspheric. The object-side surface of the second lens element E2 has at least one inflection point always located within an optically effective area thereof during the focal length adjusting process. Each of the object-side surface and the image-side surface of the second lens element E2 has the optically effective area always in a non-circular-symmetrical shape during the focal length adjusting process.

The third lens element E3 with positive refractive power has an object-side surface being convex in a paraxial region thereof and an image-side surface being convex in a paraxial region thereof. The third lens element E3 is made of plastic material and has the object-side surface and the image-side surface being both aspheric. The image-side surface of the third lens element E3 has at least one inflection point always located within an optically effective area thereof during the focal length adjusting process. Each of the object-side surface and the image-side surface of the third lens element E3 has the optically effective area always in a non-circular-symmetrical shape during the focal length adjusting process.

The fourth lens element E4 with negative refractive power has an object-side surface being concave in a paraxial region thereof and an image-side surface being concave in a paraxial region thereof. The fourth lens element E4 is made of plastic material and has the object-side surface and the image-side surface being both aspheric. The object-side surface of the fourth lens element E4 has at least one inflection point always located within an optically effective area thereof during the focal length adjusting process.

The fifth lens element E5 with positive refractive power has an object-side surface being convex in a paraxial region thereof and an image-side surface being concave in a paraxial region thereof. The fifth lens element E5 is made of plastic material and has the object-side surface and the image-side surface being both aspheric. The object-side surface of the fifth lens element E5 has at least one inflection point always located within an optically effective area thereof during the focal length adjusting process. The image-side surface of the fifth lens element E5 has at least one inflection point always located within an optically effective area thereof during the focal length adjusting process.

The sixth lens element E6 with positive refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has at least one inflection point always located within an optically effective area thereof during the focal length adjusting process. The image-side surface of the sixth lens element E6 has at least one inflection point always located within an optically effective area thereof during the focal length adjusting process. The image-side surface of the sixth lens element E6 has the optically effective area always in a non-circular-symmetrical shape during the focal length adjusting process.

The filter E7 is made of glass material and located between the sixth lens element E6 and the image surface IMG, and will not affect the focal length of the optical photographing lens. The image sensor IS is disposed on or near the image surface IMG.

The detailed optical data of the 8th embodiment are shown in Table 8A and Table 8B, and the aspheric surface data are shown in Table 8C below.

TABLE 8A

| 8th Embodiment | | | | | | | |
|---|---|---|---|---|---|---|---|
| Surface # | | Curvature Radius | | Thickness | Material | Index | Abbe # | Focal Length |
| 0 | Object | Plano | | D0 | | | | |
| 1 | Stop | Plano | | 0.000 | | | | |
| 2 | Lens 1 | 7.5389 | (ASP) | 1.963 | Plastic | 1.545 | 56.1 | 13.39 |
| 3 | | −207.0887 | (ASP) | 0.746 | | | | |
| 4 | Lens 2 | 7.2234 | (ASP) | 0.996 | Plastic | 1.639 | 23.5 | −9.85 |
| 5 | | 3.1814 | (ASP) | 0.758 | | | | |
| 6 | Lens 3 | 6.6686 | (ASP) | 2.308 | Plastic | 1.544 | 56.0 | 6.54 |
| 7 | | −6.7072 | (ASP) | −0.786 | | | | |
| 8 | Stop | Plano | | D1 | | | | |
| 9 | Lens 4 | −9.4471 | (ASP) | 0.500 | Plastic | 1.544 | 56.0 | −6.93 |
| 10 | | 6.3856 | (ASP) | 0.621 | | | | |
| 11 | Stop | Plano | | −0.323 | | | | |
| 12 | Lens 5 | 3.8284 | (ASP) | 0.702 | Plastic | 1.669 | 19.5 | 60.68 |
| 13 | | 3.9163 | (ASP) | 0.612 | | | | |
| 14 | Stop | Plano | | 0.044 | | | | |
| 15 | Lens 6 | 4.7234 | (ASP) | 0.997 | Plastic | 1.544 | 56.0 | 25.89 |
| 16 | | 6.5782 | (ASP) | D2 | | | | |

TABLE 8A-continued

| | | 8th Embodiment | | | | | |
|---|---|---|---|---|---|---|---|
| Surface # | | Curvature Radius | Thickness | Material | Index | Abbe # | Focal Length |
| 17 | Filter | Plano | 0.210 | Glass | 1.517 | 64.2 | — |
| 18 | | Plano | 0.827 | | | | |
| 19 | Image | Plano | — | | | | |

Note:
Reference wavelength is 587.6 nm (d-line).
An effective radius of the stop S1 (Surface 1) is 3.850 mm.
An effective radius of the stop S2 (Surface 8) is 3.215 mm.
An effective radius of the stop S3 (Surface 11) is 2.042 mm.
An effective radius of the stop S4 (Surface 14) is 2.366 mm.

TABLE 8B

| | Optical data at different states | |
|---|---|---|
| | Long focal length state | Short focal length state |
| f [mm] | 15.21 | 9.97 |
| Fno | 1.98 | 2.01 |
| HFOV [deg.] | 13.3 | 12.3 |
| D0 [mm] | ∞ | 47.257 |
| D1 [mm] | 1.661 | 4.661 |
| D2 [mm] | 5.000 | 2.000 |

The definitions of these parameters shown in Table 8B are the same as those stated in the 1st embodiment. In this embodiment, DO is an axial distance between an imaged object and the stop S1, D1 is an axial distance between the stop S2 and the object-side surface of the fourth lens element E4, and D2 is an axial distance between the image-side surface of the sixth lens element E6 and the filter E7. Moreover, besides the long focal length state and the short focal length state, the optical photographing lens of this embodiment can further have other states with other focal lengths ranging from the long focal length state and the short focal length state, and the focusing state of the optical photographing lens can correspond to various object distances. The present disclosure is not limited to the disclosed states in Table 8B.

TABLE 8C

| | Aspheric Coefficients | | | |
|---|---|---|---|---|
| Surface # | 2 | 3 | 4 | 5 |
| k= | 0.00000E+00 | 0.00000E+00 | 0.00000E+00 | −1.00000E+00 |
| A4= | −6.75042218E−04 | −4.42644696E−03 | −1.87782239E−02 | −2.50860787E−02 |
| A6= | 2.29682059E−04 | 3.02459188E−03 | 8.04187121E−03 | 1.21008122E−02 |
| A8= | −1.06828695E−04 | −1.23828751E−03 | −3.23099105E−03 | −6.48655322E−03 |
| A10= | 4.13966803E−05 | 3.68769466E−04 | 9.82193714E−04 | 2.85210102E−03 |
| A12= | −1.29989334E−05 | −7.85549632E−05 | −1.90431296E−04 | −8.74987115E−04 |
| A14= | 3.02944019E−06 | 1.19395554E−05 | 1.66033442E−05 | 1.78428050E−04 |
| A16= | −4.95717991E−07 | −1.33533873E−06 | 1.28407563E−06 | −2.45358149E−05 |
| A18= | 5.50628107E−08 | 1.13849072E−07 | −5.38346014E−07 | 2.41371686E−06 |
| A20= | −4.03064314E−09 | −7.37890513E−09 | 6.85552908E−08 | −1.90747081E−07 |
| A22= | 1.85572728E−10 | 3.40090159E−10 | −4.79513444E−09 | 1.34133588E−08 |
| A24= | −4.86549945E−12 | −9.67607538E−12 | 1.94282553E−10 | −7.74051170E−10 |
| A26= | 5.53975219E−14 | 1.24851914E−13 | −4.22125477E−12 | 2.88441885E−11 |
| A28= | — | — | 3.71104393E−14 | −4.81706099E−13 |

| Surface # | 6 | 7 | 9 | 10 |
|---|---|---|---|---|
| k= | 0.00000E+00 | 0.00000E+00 | 0.00000E+00 | 0.00000E+00 |
| A4= | −7.47987789E−03 | −1.04444043E−03 | 2.88835768E−02 | 3.12223044E−02 |
| A6= | 2.31113606E−03 | 9.30813919E−04 | −8.08833603E−03 | −2.75115214E−02 |
| A8= | −8.67842179E−04 | −8.94855795E−04 | 3.30931413E−03 | 3.18278284E−02 |
| A10= | 6.31465757E−05 | 5.26200853E−04 | −2.55731072E−03 | −2.54137371E−02 |
| A12= | 1.60651203E−04 | −1.88844770E−04 | 2.29021539E−03 | 1.27154068E−02 |
| A14= | −9.47890976E−05 | 4.25175196E−05 | −1.59353425E−03 | −3.51203854E−03 |
| A16= | 2.68344317E−05 | −5.91978588E−06 | 7.86683857E−04 | 1.36783589E−04 |
| A18= | −4.56112922E−06 | 4.47518307E−07 | −2.71885976E−04 | 2.77135063E−04 |
| A20= | 4.95217655E−07 | −3.99628175E−09 | 6.52562150E−05 | −1.08386661E−04 |
| A22= | −3.46126836E−08 | −2.63767539E−09 | −1.06442939E−05 | 1.99531607E−05 |
| A24= | 1.50432378E−09 | 2.57370567E−10 | 1.12424763E−06 | −1.90217302E−06 |
| A26= | −3.68149507E−11 | −1.08001466E−11 | −6.92684038E−08 | 7.53941660E−08 |
| A28= | 3.84152658E−13 | 1.79940735E−13 | 1.88849124E−09 | — |

| Surface # | 12 | 13 | 15 | 16 |
|---|---|---|---|---|
| k= | 0.00000E+00 | 0.00000E+00 | 0.00000E+00 | 0.00000E+00 |
| A4= | −5.37203779E−03 | −1.35219470E−02 | −2.38037095E−02 | −1.56762669E−02 |
| A6= | −2.63333237E−02 | −2.79710226E−02 | −3.31942002E−03 | −5.48958970E−03 |
| A8= | 3.33544320E−02 | 4.40424530E−02 | −4.12770498E−03 | 7.47109569E−03 |
| A10= | −2.59356692E−02 | −4.66396147E−02 | 1.39226811E−02 | −6.63793672E−03 |

TABLE 8C-continued

| | | Aspheric Coefficients | | |
|---|---|---|---|---|
| A12= | 1.32050676E-02 | 3.70166507E-02 | -1.65722286E-02 | 4.26095235E-03 |
| A14= | -4.39487425E-03 | -2.25221717E-02 | 1.17365006E-02 | -1.98370269E-03 |
| A16= | 8.97171780E-04 | 1.04771756E-02 | -5.51788809E-03 | 6.69411931E-04 |
| A18= | -8.74793171E-05 | -3.66132073E-03 | 1.78998392E-03 | -1.62637704E-04 |
| A20= | -2.72144450E-06 | 9.36076898E-04 | -4.03385133E-04 | 2.80351372E-05 |
| A22= | 1.46197688E-06 | -1.68581321E-04 | 6.20769387E-05 | -3.33614132E-06 |
| A24= | -9.86604208E-08 | 2.01392531E-05 | -6.22383571E-06 | 2.60253338E-07 |
| A26= | — | -1.42652965E-06 | 3.66375268E-07 | -1.19718561E-08 |
| A28= | — | 4.52088174E-08 | -9.60438214E-09 | 2.46189385E-10 |

In the 8th embodiment, the equation of the aspheric surface profiles of the aforementioned lens elements is the same as the equation of the 1st embodiment.

Moreover, these parameters shown in Table 8D can be calculated from Table 8A to Table 8C as the following values and satisfy the following conditions:

TABLE 8D

| | | Schematic Parameters | |
|---|---|---|---|
| fL [mm] | 15.21 | |R5 + R6|/CT3 | 0.02 |
| FnoL | 1.98 | R1/fl | 0.56 |
| HFOVL [deg.] | 13.3 | R3/CT2 | 7.25 |
| fS [mm] | 9.97 | R4/CT2 | 3.19 |
| FnoS | 2.01 | R5/CT3 | 2.89 |
| HFOVS [deg.] | 12.3 | R6/R7 | 0.71 |
| fG1 [mm] | 8.76 | fl/f2 | -1.36 |
| fG2 [mm] | -9.92 | f2/CT2 | -9.89 |
| (V1 + V3)/V2 | 4.77 | f3/CT3 | 2.84 |
| (CT1 + CT2 + CT3)/ | 3.50 | fG2/(TG12L – TG12S) | 3.31 |
| (T12 + T23) | | | |
| (CT4 + CT5 + CT6)/ | 2.31 | fG2/fG1 | -1.13 |
| (T45 + T56) | | | |
| |1 – TLL/TLS| | 0.00E+00 | fL/fS | 1.53 |
| TG1/TG2 | 2.15 | Y11M/ImgHM | 1.07 |
| (R5 – R6)/CT3 | 5.80 | Y11M/Y62M | 1.42 |

9th Embodiment

FIG. 25 is one perspective view of an electronic device according to the 9th embodiment of the present disclosure. FIG. 26 is another perspective view of the electronic device in FIG. 25. FIG. 27 is a cross-sectional view of two image capturing units of the electronic device in FIG. 25.

In this embodiment, an electronic device 200 is a smartphone including an image capturing unit 100, an image capturing unit 100a, an image capturing unit 100b, an image capturing unit 100c, an image capturing unit 100d, an image capturing unit 100e, a flash module 201, a display unit 202, a focus assist module, an image signal processor and an image software processor.

In this embodiment, the image capturing unit 100 is a camera module including a lens unit, a driving device, an image sensor and an image stabilizer. The lens unit includes the optical photographing lens disclosed in the 1st embodiment, a barrel and a holder member. However, the lens unit may alternatively be provided with the optical photographing lens disclosed in other embodiments, and the present disclosure is not limited thereto. In addition, the image capturing unit 100 is a telephoto image capturing unit configured with a light-folding element LF, and the light-folding element LF is disposed on an object side of the first lens element. Therefore, it is favorable for adjusting light travelling direction and folding optical axis, so that the total track length of the image capturing unit 100 and the thickness of the electronic device 200 are not restricted by each other. The imaging light converges in the lens unit of the image capturing unit 100 to generate an image with the driving device utilized for image zooming or focusing on the image sensor, and the generated image is then digitally transmitted to other electronic component for further processing. In this embodiment, the light-folding element LF is a prism, but the present disclosure is not limited thereto. In other embodiments, the light-folding element can be a mirror.

The driving device can have functionality such as focal length adjustment, and different driving configurations can be obtained through the usages of screws, voice coil motors (VCM) such as spring type or ball type, micro electro-mechanical systems (MEMS), piezoelectric systems, or shape memory alloy materials. The driving device is favorable for obtaining a better imaging position of the lens unit, so that a clear image of the imaged object can be captured by the lens unit with different object distances. The image sensor (for example, CCD or CMOS), which can feature high photosensitivity and low noise, is disposed on the image surface of the optical photographing lens to provide higher image quality.

The image stabilizer, such as an accelerometer, a gyro sensor and a Hall Effect sensor, is configured to work with the driving device to provide optical image stabilization (OIS). The driving device working with the image stabilizer is favorable for compensating for pan and tilt of the lens unit to reduce blurring associated with motion during exposure. In some cases, the compensation can be provided by electronic image stabilization (EIS) with image processing software, thereby improving image quality while in motion or low-light conditions.

The image capturing units 100, 100a, 100b are disposed on the same side of the electronic device 200, and the image capturing units 100c, 100d, 100e and the display unit 202 are disposed on the opposite side of the electronic device 200, and the display unit 202 can be a user interface, such that each of the image capturing units 100c, 100d and 100d can be a front-facing camera of the electronic device 200 for taking selfies, but the present disclosure is not limited thereto. Each of the image capturing units 100a, 100b, 100c, 100d, 100e can include the optical photographing lens of the present disclosure and have a configuration similar to that of the image capturing unit 100, so the details in this regard will not be provided again. The image capturing unit 100a includes an optical lens assembly and an image sensor (their reference numerals are omitted). As shown in FIG. 27, the optical lens assembly of the image capturing unit 100a has an optical axis OA, and a movement direction DLG of lens groups of the image capturing unit 100 is perpendicular to the optical axis OA; furthermore, the movement direction DLG of lens groups of the image capturing unit 100 is also perpendicular to an optical axis of the image capturing unit 100b. Therefore, it is favorable for adjusting space arrangement so as to reduce the restriction of the electronic device.

The image capturing unit 100 is a telephoto image capturing unit configured with a light-folding element, the image capturing unit 100a is a telephoto image capturing unit, and the image capturing unit 100b is a wide angle image capturing unit. Half of a maximum field of view of the image capturing unit 100a ranges from 15 degrees to 30 degrees, and half of a maximum field of view of the image capturing unit 100b ranges from 30 degrees to 60 degrees. Moreover, half of a maximum field of view of the image capturing unit 100b ranges from 35 degrees to 50 degrees. The image capturing units 100, 100a, 100b have different fields of view, such that the application range of the electronic device 200 can be enlarged. The abovementioned electronic device 200 has the three image capturing units 100, 100a, 100b on the same side, but the present disclosure is not limited thereto. In other configurations, the electronic device may have at least two image capturing units disposed on the same side or have at least three image capturing units disposed on the same side.

The image capturing unit 100c is a wide angle image capturing unit, the image capturing unit 100d is an ultra-wide-angle image capturing unit, and the image capturing unit 100e is a ToF (time of flight) image capturing unit, wherein the image capturing unit 100e can determine depth information of the imaged object. The image capturing units 100c, 100d, 100e and the display unit 202 are disposed on the same side of the electronic device 200, such that the image capturing units 100c, 100d, 100e can be front-facing cameras of the electronic device 200 for taking selfies, but the present disclosure is not limited thereto.

The electronic device 200 includes multiple image capturing units 100, 100a, 100b, 100c, 100d, 100e, but the present disclosure is not limited to the number and arrangement of image capturing units.

When a user captures images of an object, the light rays converge in the image capturing units 100, 100a or 100b to generate an image(s), and the flash module 201 is activated for light supplement. The focus assist module detects the object distance of the imaged object to achieve fast auto focusing. The image signal processor is configured to optimize the captured image to improve image quality. The light beam emitted from the focus assist module can be either conventional infrared or laser. In addition, the light rays may converge in the image capturing units 100c, 100d or 100e to generate an image(s). The display unit 202 can be a touch screen, and the user is able to interact with the display unit 202 and the image software processor having multiple functions to capture images and complete image processing. Alternatively, the user may capture images via a physical button. The image processed by the image software processor can be displayed on the display unit 202.

10th Embodiment

FIG. 28 is a perspective view of an electronic device according to the 10th embodiment of the present disclosure.

In this embodiment, an electronic device 300 is a smartphone including an image capturing unit 100f, an image capturing unit 100g, an image capturing unit 100h, an image capturing unit 100i, an image capturing unit 100j, an image capturing unit 100k, an image capturing unit 100m, an image capturing unit 100n, an image capturing unit 100p, a flash module 301, a focus assist module, an image signal processor, a display unit and an image software processor (not shown). The image capturing units 100f, 100g, 100h, 100i, 100j, 100k, 100m, 100n, 100p are disposed on the same side of the electronic device 300, and the display unit is disposed on the opposite side of the electronic device 300. Each of the image capturing units 100f, 100g, 100h, 100i, 100j, 100k, 100m, 100n, 100p can include the optical photographing lens of the present disclosure and can have a configuration similar to that of the image capturing unit 100 as disclosed in the 9th embodiment, so the details in this regard will not be provided again.

The image capturing units 100f, 100g are telephoto image capturing units configured with light-folding elements, the image capturing units 100h, 100i are telephoto image capturing units, the image capturing units 100j, 100k are wide angle image capturing units, the image capturing units 100m, 100n are ultra-wide-angle image capturing units, and the image capturing unit 100p is a ToF image capturing unit. The image capturing units 100f, 100g with light-folding elements may each have a configuration, for example, similar to that as shown in FIG. 32, FIG. 33, FIG. 34 or FIG. 35, and a description in this regard will not be provided again. Moreover, the image capturing unit 100p can determine depth information of the imaged object. In this embodiment, the image capturing units 100f, 100g, 100h, 100i, 100j, 100k, 100m, 100n, 100p have different fields of view, such that the electronic device 300 has various magnification ratios so as to meet the requirement of optical zoom functionality. The electronic device 300 includes multiple image capturing units 100f, 100g, 100h, 100i, 100j, 100k, 100m, 100n, 100p, but the present disclosure is not limited to the number and arrangement of image capturing units. When a user captures images of an object, light rays converge in the image capturing unit 100f, 100g, 100h, 100i, 100j, 100k, 100m, 100n, or 100p to generate images, and the flash module 301 is activated for light supplement. Further, the subsequent processes are performed in a manner similar to the abovementioned embodiment, so the details in this regard will not be provided again.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical photographing lens of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-8D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing lens comprising two lens groups, the two lens groups comprising six lens elements, the two lens groups being, in order from an object side to an image side along an optical path, a first lens group and a second lens group, the six lens elements being, in order from the object side to the image side along the optical path, a first lens element, a second lens element, a third lens element, a fourth lens element, a fifth lens element and a sixth lens element, a total number of lens elements of the optical photographing lens is six, and each of the six lens elements having an object-side surface facing toward the object side and an image-side surface facing toward the image side;

wherein a focal length adjusting process is performed by changing an axial distance between the two lens groups so as to vary a focal length of the optical photographing lens, the optical photographing lens has a long focal length state and a short focal length state during the focal length adjusting process, the second lens group moves along an optical axis relative to the first lens group during the focal length adjusting process, and at least one lens surface of at least one lens element of the optical photographing lens has at least one inflection point always located within an optically effective area of the at least one lens surface during the focal length adjusting process;

wherein the first lens group comprises the first lens element, the second lens element and the third lens element, the second lens group comprises the fourth lens element, the fifth lens element and the sixth lens element, the first lens element has positive refractive power, the second lens element has negative refractive power, and the third lens element has positive refractive power;

wherein a focal length of the second lens element is f2, a focal length of the third lens element is f3, a central thickness of the second lens element is CT2, a central thickness of the third lens element is CT3, a central thickness of the fourth lens element is CT4, a central thickness of the fifth lens element is CT5, a central thickness of the sixth lens element is CT6, an axial distance between the fourth lens element and the fifth lens element is T45, an axial distance between the fifth lens element and the sixth lens element is T56, and the following conditions are satisfied:

$$-12.0 < f2/CT2 < -1.00; \text{ and}$$

$$1.6 < (CT4 + CT5 + CT6)/(T45 + T56) < 15.$$

2. The optical photographing lens of claim 1, wherein the focal length of the second lens element is f2, a central thickness of the first lens element is CT1, the central thickness of the second lens element is CT2, the central thickness of the third lens element is CT3, the central thickness of the fourth lens element is CT4, the central thickness of the fifth lens element is CT5, the central thickness of the sixth lens element is CT6, an axial distance between the first lens element and the second lens element is T12, an axial distance between the second lens element and the third lens element is T23, the axial distance between the fourth lens element and the fifth lens element is T45, the axial distance between the fifth lens element and the sixth lens element is T56, and the following conditions are satisfied:

$$-10.0 < f2/CT2 < -2.00;$$

$$0.50 < (CT1 + CT2 + CT3)/(T12 + T23) < 6.8; \text{ and}$$

$$2.3 < (CT4 + CT5 + CT6)/(T45 + T56) < 11.$$

3. The optical photographing lens of claim 1, wherein the focal length of the second lens element is f2, the central thickness of the second lens element is CT2, the central thickness of the third lens element is CT3, the central thickness of the fourth lens element is CT4, the central thickness of the fifth lens element is CT5, the central thickness of the sixth lens element is CT6, the axial distance between the fourth lens element and the fifth lens element is T45, the axial distance between the fifth lens element and the sixth lens element is T56, a curvature radius of the object-side surface of the third lens element is R5, an axial distance between the object-side surface of the first lens element and the image-side surface of the third lens element is TG1, an axial distance between the object-side surface of the fourth lens element and the image-side surface of the sixth lens element is TG2, and the following conditions are satisfied:

$$-6.02 \leq f2/CT2 \leq -4.10;$$

$$4.51 \leq (CT4 + CT5 + CT6)/(T45 + T56) \leq 5.76;$$

$$2.39 \leq R5/CT3 \leq 4.53; \text{ and}$$

$$1.85 \leq TG1/TG2 \leq 2.39.$$

4. The optical photographing lens of claim 1, wherein a curvature radius of the object-side surface of the third lens element is R5, a curvature radius of the image-side surface of the third lens element is R6, the central thickness of the third lens element is CT3, and the following condition is satisfied:

$$1.0 < (R5 - R6)/CT3 < 10.$$

5. The optical photographing lens of claim 1, wherein a focal length of the first lens element is f1, the focal length of the second lens element is f2, a maximum distance between an optically effective area of the object-side surface of the first lens element and the optical axis during the focal length adjusting process is Y11M, a maximum distance between an optically effective area of the image-side surface of the sixth lens element and the optical axis during the focal length adjusting process is Y62M, and the following conditions are satisfied:

$$-2.3 < f1/f2 < -0.95; \text{ and}$$

$$0.50 < Y11M/Y62M < 2.0.$$

6. The optical photographing lens of claim 1, wherein the object-side surface of the second lens element is convex in a paraxial region thereof, and the image-side surface of the second lens element is concave in a paraxial region thereof;

wherein a curvature radius of the object-side surface of the second lens element is R3, the central thickness of the second lens element is CT2, and the following condition is satisfied:

$$1.0 < R3/CT2 < 10.$$

7. The optical photographing lens of claim 1, wherein the second lens group moves towards the image side along the optical axis relative to the first lens group when the focal length of the optical photographing lens is gradually reduced during the focal length adjusting process;

wherein a focal length of the optical photographing lens at the long focal length state is fL, a focal length of the optical photographing lens at the short focal length state is fS, and the following condition is satisfied:

$$1.20 < fL/fS < 2.30.$$

8. The optical photographing lens of claim 1, wherein the optical photographing lens has a plurality of states during the focal length adjusting process, an optically effective area of at least one lens surface of at least one lens element of the optical photographing lens is in a non-circular-symmetrical shape at least one state of the optical photographing lens, and at least one lens surface of at least one lens element of the second lens group has at least one inflection point always located within an optically effective area of the at least one lens surface during the focal length adjusting process.

9. An image capturing unit, comprising:

the optical photographing lens of claim 1; and an image sensor disposed on an image surface of the optical photographing lens.

10. An electronic device, comprising at least two image capturing units located on a same side of the electronic device, and the at least two image capturing units comprising:

a first image capturing unit, comprising the optical photographing lens of claim 1 and an image sensor disposed on an image surface of the optical photographing lens; and a second image capturing unit, comprising an optical lens assembly and an image sensor disposed on an image surface of the optical lens assembly;

wherein half of a maximum field of view of the second image capturing unit ranges from 30 degrees to 60 degrees.

11. An optical photographing lens comprising two lens groups, the two lens groups comprising six lens elements, the two lens groups being, in order from an object side to an image side along an optical path, a first lens group and a second lens group, the six lens elements being, in order from the object side to the image side along the optical path, a first lens element, a second lens element, a third lens element, a fourth lens element, a fifth lens element and a sixth lens element, a total number of lens elements of the optical photographing lens is six, and each of the six lens elements having an object-side surface facing toward the object side and an image-side surface facing toward the image side;

wherein a focal length adjusting process is performed by changing an axial distance between the two lens groups so as to vary a focal length of the optical photographing lens, the optical photographing lens has a long focal length state and a short focal length state during the focal length adjusting process, the second lens group moves along an optical axis relative to the first lens group during the focal length adjusting process, and at least one lens surface of at least one lens element of the optical photographing lens has at least one inflection point always located within an optically effective area of the at least one lens surface during the focal length adjusting process;

wherein the first lens group comprises the first lens element, the second lens element and the third lens element, the second lens group comprises the fourth lens element, the fifth lens element and the sixth lens element, the first lens element has positive refractive power, the second lens element has negative refractive power, and the object-side surface of the third lens element is convex in a paraxial region thereof;

wherein a focal length of the second lens element is f2, a central thickness of the second lens element is CT2, a central thickness of the third lens element is CT3, a curvature radius of the object-side surface of the third lens element is R5, and the following conditions are satisfied:

$$-12.0 < f2/CT2 < -1.00; \text{ and}$$

$$0 < R5/CT3 < 12.0.$$

12. The optical photographing lens of claim 11, wherein the focal length of the second lens element is f2, the central thickness of the second lens element is CT2, the central thickness of the third lens element is CT3, the curvature radius of the object-side surface of the third lens element is R5, and the following conditions are satisfied:

$$-10.0 < f2/CT2 < -2.00; \text{ and}$$

$$1.00 < R5/CT3 < 9.50.$$

13. The optical photographing lens of claim 11, wherein the image-side surface of the second lens element is concave in a paraxial region thereof;

wherein a curvature radius of the image-side surface of the second lens element is R4, the central thickness of the second lens element is CT2, and the following condition is satisfied:

$$0 < R4/CT2 < 3.7.$$

14. The optical photographing lens of claim 11, wherein a maximum distance between an optically effective area of the object-side surface of the first lens element and the optical axis during the focal length adjusting process is Y11M, a maximum distance between an optically effective area of the image-side surface of the sixth lens element and the optical axis during the focal length adjusting process is Y62M, and the following condition is satisfied:

$$0.50 < Y11M/Y62M < 2.0.$$

15. The optical photographing lens of claim 14, wherein the third lens element has positive refractive power;

wherein a focal length of the third lens element is f3, the central thickness of the third lens element is CT3, and the following condition is satisfied:

$$1.0 < f3/CT3 < 6.5.$$

16. The optical photographing lens of claim 14, wherein the third lens element has positive refractive power, the image-side surface of the third lens element is convex in a paraxial region thereof, and the object-side surface of the fourth lens element is concave in a paraxial region thereof;

wherein a curvature radius of the image-side surface of the third lens element is R6, a curvature radius of the object-side surface of the fourth lens element is R7, and the following condition is satisfied:

$$0.65 < R6/R7 < 3.0.$$

17. The optical photographing lens of claim 11, wherein at least one lens element of the optical photographing lens is made of plastic material, the optical photographing lens performs the focal length adjusting process according to an object distance so as to correspondingly vary the focal length of the optical photographing lens;

wherein the second lens group moves towards the image side along the optical axis relative to the first lens group when the object distance is gradually reduced during the focal length adjusting process;

wherein an axial distance between the object-side surface of the first lens element and an image surface when the optical photographing lens is at the long focal length state is TLL, an axial distance between the object-side surface of the first lens element and the image surface when the optical photographing lens is at the short focal length state is TLS, and the following condition is satisfied:

$$|1 - TLL/TLS| < 1.0E - 2.$$

18. The optical photographing lens of claim 11, wherein the first lens group has positive refractive power, and the second lens group has negative refractive power;

wherein a composite focal length of the first lens element, the second lens element and the third lens element is fG1, a composite focal length of the fourth lens element, the fifth lens element and the sixth lens element is fG2, a maximum distance between an optically effective area of the object-side surface of the first lens element and the optical axis during the focal length adjusting process is Y11M, a maximum image height of the optical photographing lens during the focal length adjusting process is ImgHM, and the following conditions are satisfied:

$$-1.50 < fG2/fG1 < -1.00; \text{ and}$$

$$0.70 < Y11M/ImgHM < 1.4.$$

19. An optical photographing lens comprising two lens groups, the two lens groups comprising six lens elements, the two lens groups being, in order from an object side to an image side along an optical path, a first lens group and a second lens group, the six lens elements being, in order from the object side to the image side along the optical path, a first lens element, a second lens element, a third lens element, a fourth lens element, a fifth lens element and a sixth lens element, a total number of lens elements of the optical photographing lens is six, and each of the six lens elements having an object-side surface facing toward the object side and an image-side surface facing toward the image side;

wherein a focal length adjusting process is performed by changing an axial distance between the two lens groups so as to vary a focal length of the optical photographing lens, the optical photographing lens has a long focal length state and a short focal length state during the focal length adjusting process, the second lens group moves along an optical axis relative to the first lens group during the focal length adjusting process, and at least one lens surface of at least one lens element of the optical photographing lens has at least one inflection point always located within an optically effective area of the at least one lens surface during the focal length adjusting process;

wherein the first lens group comprises the first lens element, the second lens element and the third lens element, the second lens group comprises the fourth lens element, the fifth lens element and the sixth lens element, the first lens element has positive refractive power, and the second lens element has negative refractive power;

wherein a focal length of the second lens element is f2, a central thickness of the second lens element is CT2, an axial distance between the object-side surface of the first lens element and the image-side surface of the third lens element is TG1, an axial distance between the object-side surface of the fourth lens element and the image-side surface of the sixth lens element is TG2, a composite focal length of the first lens element, the second lens element and the third lens element is fG1, a composite focal length of the fourth lens element, the fifth lens element and the sixth lens element is fG2, and the following conditions are satisfied:

$$-12.0 < f2/CT2 < -1.00; \text{ and}$$

$$1.4 < TG1/TG2 < 4.0.$$

20. The optical photographing lens of claim 19, wherein the focal length of the second lens element is f2, the central thickness of the second lens element is CT2, the axial distance between the object-side surface of the first lens element and the image-side surface of the third lens element is TG1, the axial distance between the object-side surface of the fourth lens element and the image-side surface of the sixth lens element is TG2, and the following conditions are satisfied:

$$-10.0 < f2/CT2 < -2.00; \text{ and}$$

$$1.6 < TG1/TG2 < 3.0.$$

21. The optical photographing lens of claim 19, wherein a curvature radius of the object-side surface of the third lens element is R5, a curvature radius of the image-side surface of the third lens element is R6, a central thickness of the third lens element is CT3, and the following condition is satisfied:

$$|R5 + R6|/CT3 < 2.3.$$

22. The optical photographing lens of claim 19, wherein a maximum distance between an optically effective area of the object-side surface of the first lens element and the optical axis during the focal length adjusting process is Y11M, a maximum distance between an optically effective area of the image-side surface of the sixth lens element and the optical axis during the focal length adjusting process is Y62M, and the following condition is satisfied:

$$0.50 < Y11M/Y62M < 2.0.$$

23. The optical photographing lens of claim 22, wherein an Abbe number of the first lens element is V1, an Abbe number of the second lens element is V2, an Abbe number of the third lens element is V3, half of a maximum field of view of the optical photographing lens at the long focal length state is HFOVL, an f-number of the optical photographing lens at the long focal length state is FnoL, and the following conditions are satisfied:

$$4.0 < (V1 + V3)/V2 < 6.0;$$

$$9.0[deg.] < HFOVL < 16.0[deg.]; \text{ and}$$

$$1.6, FnoL < 2.2.$$

24. The optical photographing lens of claim 22, wherein the object-side surface of the first lens element is convex in a paraxial region thereof;

wherein a curvature radius of the object-side surface of the first lens element is R1, a focal length of the first lens element is f1, and the following condition is satisfied:

$$0.50 < R1/f1 < 5.0.$$

25. The optical photographing lens of claim 19, further comprising a light-folding element;

wherein the composite focal length of the fourth lens element, the fifth lens element and the sixth lens element is fG2, an axial distance between the image-side surface of the third lens element and the object-side surface of the fourth lens element when the optical photographing lens is at the long focal length state is TG12L, an axial distance between the image-side surface of the third lens element and the object-side surface of the fourth lens element when the optical photographing lens is at the short focal length state is TG12S, and the following condition is satisfied:

$$1.0 < fG2/(TG12L - TG12S) < 6.0.$$

\* \* \* \* \*